US011636086B1

(12) United States Patent
Goodnow et al.

(10) Patent No.: US 11,636,086 B1
(45) Date of Patent: Apr. 25, 2023

(54) MULTI-DATABASE SUBSETTING

(71) Applicant: Tonic AI, Inc., San Francisco, CA (US)

(72) Inventors: John Kristopher Goodnow, Portland, OR (US); Andrew C. Colombi, San Francisco, CA (US); Adam Jacob Kamor, Atlanta, GA (US)

(73) Assignee: Tonic AI, Inc., San Francisco, CA (US)

( * ) Notice: Subject to any disclaimer, the term of this patent is extended or adjusted under 35 U.S.C. 154(b) by 0 days.

(21) Appl. No.: 17/706,278

(22) Filed: Mar. 28, 2022

Related U.S. Application Data

(60) Provisional application No. 63/291,600, filed on Dec. 20, 2021, provisional application No. 63/167,500, filed on Mar. 29, 2021.

(51) Int. Cl.
*G06F 16/22* (2019.01)
*G06F 16/242* (2019.01)
*G06F 16/25* (2019.01)
*G06F 16/28* (2019.01)

(52) U.S. Cl.
CPC ...... *G06F 16/2282* (2019.01); *G06F 16/2445* (2019.01); *G06F 16/256* (2019.01); *G06F 16/288* (2019.01)

(58) Field of Classification Search
CPC ............. G06F 16/2282; G06F 16/2445; G06F 16/256; G06F 16/288
See application file for complete search history.

(56) References Cited

U.S. PATENT DOCUMENTS 6,381,600 B1 * 4/2002 Lau ..................... G06F 16/284
8,935,234 B2 1/2015 Pattabhi
2009/0259618 A1 * 10/2009 Shi ..................... G06F 16/2282
2018/0150495 A1 * 5/2018 Hoff ..................... G06F 16/9024
2019/0227997 A1 * 7/2019 Balzer ................... G06F 16/211
2019/0392047 A1 * 12/2019 Sorenson, III ........ G06F 16/172
2021/0200728 A1 * 7/2021 Horesh ............... G06F 16/9024

OTHER PUBLICATIONS

"Honey, I shrunk the (Postgres) database", https://www.tonic.ai/blog/condenser-a-database-subsetting-tool, Aug. 7, 2018.
Bolchini et al., "A methodology for a very small data base design". Information Systems, 32(1), 61-82, 2007.
Khurana et al., "Opaque Query Extraction" Technical Report TR-2021-02 (Mar. 2021), Database Systems Lab, ndian Institute of Science, Bangalore 560012, India, http://dsl.cds.iisc.ac.in.
Ralf Wisser, "Database Subsetting With Jailer", Database Zone. Aug. 20, 2019, https://dzone.com/articles/database-subsetting-with-jailer-a-tutorial.

* cited by examiner

*Primary Examiner* — James Trujillo
*Assistant Examiner* — Michal Bogacki
(74) *Attorney, Agent, or Firm* — Van Pelt, Yi & James LLP

(57) ABSTRACT

Multi-database subsetting includes receiving a set of source tables. It further includes sorting the set of source tables based at least in part on dependency relationships among tables in the set of source tables. It further includes determining a traversal order based at least in part on the sorting of the set of source tables. It further includes executing the traversal order. Executing the traversal order includes visiting a table in the source set of tables according to the determined traversal order and issuing a query to extract a subset of data from the table being visited.

24 Claims, 47 Drawing Sheets

| TONIC ↺ ↻ | Workspace: [My Workspace ▼] ✎ 🗎 🗗 🗑 ⇥ ⇤ ⊕ New Workspace | $fx$ Generate Data | ⓘ ≡ |
|---|---|---|---|

Workspaces
My Workspace

Foreign Key Relationships

Manage

View Foreign Key Relationships   Add Foreign Key Relationships

🛡 Privacy Hub

| Column name search | 🔍 Advanced |
|---|---|

🗄 Database View

🔳 Table View   🗑 Bulk Delete

| | Foreign Key [Sort ◆] | Primary Key [Sorting by Column Name (Asc) ◆] |
|---|---|---|
🔑 Foreign Keys
| | retail_sales.Customer_Key | customers.Customer_Key |
⚔ Jobs
| | retail_sales.Date_Key | date.Date_Key |
⇄ Schema Changes
| | vendors.[Manager_Start_Date_Key,Manager_End_Date_Key] | wo_date.[Date_Key,Date_Key] |
⛙ Subsetting
| | wholesale_orders.[Order_Date_Key,Shipped_Date_Key] | wo_date.[Date_Key,Date_Key] |
▦ Post-Job Actions
| | retail_sales.Product_Key | products.Product_Key |
| | wholesale_orders.Product_Key | products.Product_Key |
| | retail_sales.Store_Key | stores.Store_Key |

⊕ Collapse

TONIC

Workspaces
My Workspace

Manage
- Privacy Hub
- Database View
- Table View
- Foreign Keys
- Jobs
- Schema Changes
- Subsetting
- Post-Job Actions Workspace: My Workspace ▼ | ✎ 🗐 🗂 ⬒ ⬈ ⬉ ⊕ New Workspace | ƒx Generate Data | ☉ ≡

Foreign Key Relationships

View Foreign Key Relationships | Add Foreign Key Relationships

Column name search | 🔍 Advanced

Select Foreign Key(s) | Sorting by Column Name (Asc) ▼

> Annual_Income (3)
> Annual_Shrinkage (1)
> Birth_Date (3)
> Category (1)
> Cost_Price (1)
> Customer_Address (1)
> Customer_Key (3)
> Customer_Since (3)
> Date (2)
> Date_Key (2)
> Department_Description (1)
> Email (3)
> Ext_Demographic_Data (2)
> First_Name (3)
> First_Open_Date (1)
> Floor_Plan_Type (1)

Select Primary Key

Primary Key ▼

Create New Foreign Key

⊕ Create 0 Foreign Keys

Foreign Key Preview

None

⊕ Collapse

| | Workspace: | My Workspace ▼ | | | | | | ⊕ New Workspace | | *fx* Generate Data | |
|---|---|---|---|---|---|---|---|---|---|---|---|
| Workspaces | | | | | | | | | | ● Preview | |
| My Workspace | Model | Table: products | | | | Masked Mode ▼ | | | | | |
| Manage | Create a replacement by clicking a column header | ⚲ Product Key | abc Product_Name | | abc SKU_Number | abc Department_Description | abc Category | 123 Sale_Price | 123 Cost |
| ● Privacy Hub | | 1 | Nike WAS #11 Smith Jer... | | MS #1 | Fan Shop | Apparel | 99.99 | |
| | | 2 | Nike WAS #11 Smith Jer... | | MS #2 | Fan Shop | Apparel | 99.99 | |
| ⛓ Database View | | 3 | Nike GSW #30 Curry Jers... | | MS #3 | Fan Shop | Apparel | 99.99 | |
| | | 4 | Nike LAL #2 Ball Jersey | | MS #4 | Fan Shop | Apparel | 99.99 | |
| ▦ Table View | | 5 | Nike HOU #13 Harden Je... | | MS #5 | Fan Shop | Apparel | 99.99 | |
| | | 6 | Nike NE #12 Brady Jersey | | MS #6 | Fan Shop | Apparel | 99.99 | |
| ⚿ Foreign Keys | | 7 | Nike DAL #4 Prescott Jer... | | MS #7 | Fan Shop | Apparel | 99.99 | |
| | | 8 | Nike SEA #3 Wilson Jersey | | MS #8 | Fan Shop | Apparel | 99.99 | |
| ⚒ Jobs | | 9 | Nike SF #42 Lott Jersey | | MS #9 | Fan Shop | Apparel | 99.99 | |
| | | 10 | Nike GSW #35 Durant Jer... | | MS #10 | Fan Shop | Apparel | 99.99 | |
| ⇄ Schema Changes | | 11 | Nike LAL #23 LeBron Jer... | | MS #11 | Fan Shop | Apparel | 99.99 | |
| | | 12 | Puma NYY #99 Judge Je... | | MS #12 | Fan Shop | Apparel | 99.99 | |
| ▽ Subsetting | | 13 | Nike FCB #10 Messi Jers... | | MS #13 | Fan Shop | Apparel | 99.99 | |
| | | 14 | Adidas RMD #7 Ronaldo ... | | MS #14 | Fan Shop | Apparel | 99.99 | |
| ▦ Post-Job Actions | | 15 | Adidas PIT #87 Crosby J... | | MS #15 | Fan Shop | Apparel | 99.99 | |
| | | 16 | Nike GSW Showtime Hoo... | | MS #16 | Fan Shop | Apparel | 99.99 | |
| | | 17 | Nike SF 49ers Jacket | | MS #17 | Fan Shop | Apparel | 99.99 | |
| | | 18 | Majestic SF Giants Hoodie | | MS #18 | Fan Shop | Apparel | 99.99 | |
| | | 19 | Nike Legend T-Shirt | | MS #19 | Clothing | Apparel | 39.04 | |
| | | 20 | Under Armour T-Shirt | | MS #20 | Clothing | Apparel | 41.91 | |
| | | 21 | Nike Track Pants | | MS #21 | Clothing | Apparel | 36.22 | |
| | | 22 | Jordan Dri-FIT Tank | | MS #22 | Clothing | Apparel | 36.58 | |
| | | 23 | Nike Pro T-Shirt | | MS #23 | Clothing | Apparel | 37.18 | |
| | | 24 | Jordan Air T-Shirt | | MS #24 | Clothing | Apparel | 40.86 | |
| | | 25 | Patagonia Long Sleeve | | MS #25 | Clothing | Apparel | 33.45 | |
| | | 26 | Adidas Originals T-Shirt | | MS #26 | Clothing | Apparel | 42.55 | |
| | | 27 | Nike Layup Shorts | | MS #27 | Clothing | Apparel | 37.56 | |
| | | 28 | Adidas Hockey Shorts | | MS #28 | Clothing | Apparel | 41.29 | |
| | | 29 | Nike Pro Tights | | MS #29 | Clothing | Apparel | 47.17 | |
| | | 30 | Under Armour Joggers | | MS #30 | Clothing | Apparel | 41.28 | |
| | | 31 | Speedo Women's Swimsuit | | MS #31 | Clothing | Apparel | 36.76 | |
| | | 32 | Nike Ski Wear | | MS #32 | Clothing | Apparel | 33.24 | |
| | | 33 | Adidas Ski Wear | | MS #33 | Clothing | Apparel | 44.67 | |
| | | 34 | Adidas Stripe Shorts | | MS #34 | Clothing | Apparel | 38.47 | |
| | | 35 | Nike Derby Dyes | | MS #35 | Clothing | Apparel | 79.31 | |
| ⊕ Collapse | | | | | | | | | |

| TONIC | Workspace: [My Workspace ▼] ✏ ⧉ ⊡ 🗑 →] ⬆ ⊕ New Workspace | ƒx Generate Data | ⊙ ≡ |
|---|---|---|---|

Workspaces
My Workspace

Manage

Foreign Key Relationships
View Foreign Key Relationships  Add Foreign Key Relationships 🛡 Privacy Hub

| Column name search | 🔍 Advanced |
|---|---|

🖧 Database View
▦ Table View

🗑 Bulk Delete

🔑 Foreign Keys
⚒ Jobs
⇄ Schema Changes
⊽ Subsetting
🗒 Post-Job Actions

| Foreign Key [Sort ◆] | Primary Key [Sorting by Column Name (Asc) ◆] |
|---|---|
| 🔗 retail_sales.Customer_Key | customers.Customer_Key |
| 🔗 retail_sales.Date_Key | date.Date_Key |
| 🔗 vendors.[Manager_Start_Date_Key,Manager_End_Date_Key] | wo_date.[Date_Key,Date_Key] |
| 🔗 wholesale_orders.[Order_Date_Key,Shipped_Date_Key] | wo_date.[Date_Key,Date_Key] |
| 🔗 retail_sales.Product_Key | products.Product_Key |
| 🔗 wholesale_orders.Product_Key | products.Product_Key |
| 🔗 retail_sales.Store_Key | stores.Store_Key |

⊕ Collapse

FIG. 13A

TONIC ↶ ↷ | Workspace: [My Workspace ▼] ✏️ 📄 📋 ↴ ↥ 📦 ⊕ New Workspace | *fx* Generate Data | ⊙ ≡

Workspaces
My Workspace

Manage

🖐 Privacy Hub

Foreign Key Relationships
View Foreign Key Relationships    Add Foreign Key Relationships

🗄 Database View
▦ Table View
🔑 Foreign Keys
⚒ Jobs
⇄ Schema Changes
▽ Subsetting
▤ Post-Job Actions

| Column name search | | 🔍 Advanced |

Select Foreign Key(s) [Sorting by Column Name (Asc) ▾]

Select Primary Key

> Annual_Income (3)
> Annual_Shrinkage (1)
> Birth_Date (2)
  ☑ customers_legacy.Birth_Date
  ☐ marketing.Birth_Date
> Category (1)
> Cost_Price (1)
> Customer_Address (1)
> Customer_Key (3)
> Customer_Since (3)
> Date (2)
> Date_Key (2)
> Department_Description (1)
> Email (3)
> Ext_Demographic_Data (2)
> First_Name (3)

[public.customers.Birth_Date ▾]

Create New Foreign Key
⊕ Create 1 Foreign Key 👆

Foreign Key Preview
customers_legacy.Birth_Date 🗄

⊕ Collapse

FIG. 13B

| TONIC | ↶ ↷ | Workspace: [My Workspace ▼] | ✏ | 🗗 | 🖨 | → | ↑ | ⊕ New Workspace | *fx* Generate Data | ⊙ | ☰ |

Workspaces
My Workspace

Foreign Key Relationships

Manage

● Privacy Hub     View Foreign Key Relationships    Add Foreign Key Relationships ⛭ Database View     | Column name search |     🔍 Advanced ▦ Table View     🗑 Bulk Delete 🔑 Foreign Keys     ☐▸ Foreign Key [Sort ◆]           Primary Key [Sorting by Column Name (Asc) ◆]

⚒ Jobs

⇄ Schema Changes     ☐ customers_legacy.Birth_Date          customers.Birth_Date   🗑

▽ Subsetting     🔗 retail_sales.Customer_Key          customers.Customer_Key

▤ Post-Job Actions     🔗 retail_sales.Date_Key          date.Date_Key

🔗 vendors.[Manager_Start_Date_Key,Manager_End_Date_Key]     wo_date.[Date_Key,Date_Key]

🔗 wholesale_orders.[Order_Date_Key,Shipped_Date_Key]     wo_date.[Date_Key,Date_Key]

🔗 retail_sales.Product_Key          products.Product_Key

🔗 wholesale_orders.Product_Key          products.Product_Key

🔗 retail_sales.Store_Key          stores.Store_Key

⊕ Collapse

| TONIC ↶ ↷ | Workspace: [My Workspace ▾] ✎ 🗇 ↦ ↥ ⊕ New Workspace | ƒx Generate Data \| ⊙ ≡ |
|---|---|---|
| Workspaces<br>My Workspace | Foreign Key Relationships | |
| Manage | View Foreign Key Relationships   Add Foreign Key Relationships | |
| 🛡 Privacy Hub | Column name search | 🔍 Advanced |
| 🗄 Database View | Select Foreign Key(s) [Sorting by Column Name (Asc) ▾] | Select Primary Key |
| 🎞 Table View | › Annual_Income (3) | |
| 🗝 Foreign Keys | › Annual_Shrinkage (1) | [Primary Key ▾] |
| ⚒ Jobs | ⌄ Birth_Date (2) | Create New Foreign Key |
| ⇄ Schema Changes | ☐ customers.Birth_Date | ⊕ Create 0 Foreign Keys |
| ⛛ Subsetting | ☐ marketing.Birth_Date | Foreign Key Preview |
| 🗐 Post-Job Actions | › Category (1) | None |
| | › Cost_Price (1) | |
| | › Customer_Address (1) | |
| | › Customer_Key (3) | |
| | › Customer_Since (3) | |
| | › Date (2) | |
| | › Date_Key (2) | |
| | › Department_Description (1) | |
| | › Email (3) | |
| | › Ext_Demographic_Data (2) | |
| | › First_Name (3) | |
| ⊕ Collapse | | |

FIG. 14

TONIC

Workspaces
My Workspace

Manage
- Privacy Hub
- Database View
- Table View
- Foreign Keys
- Jobs
- Schema Changes
- Subsetting
- Post-Job Actions Workspace: [My Workspace ▼] ✎ ⎘ ⎘ ⎘ ⮕ ⬆ ⊕ New Workspace     ƒx Generate Data | ⊙ ≡

Foreign Key Relationships
View Foreign Key Relationships     Add Foreign Key Relationships

[Column name search]                                            🔍 Advanced

Select Foreign Key(s) [Sorting by Frequency (Desc) ◆]       Select Primary Key

> Customer_Key (3)                                              [Primary Key ◆]
> First_Name (3)
> Last_Name (3)                                                 Create New Foreign Key
> Gender (3)                                                    ⊕ Create 0 Foreign Keys
> Email (3)
> Marital_Status (3)                                            Foreign Key Preview
> Number_Of_Children (3)                                        None
> Annual_Income (3)
> Occupation (3)
> Largest_Bill_Amount (3)
> Store_Membership_Card (3)
> Customer_Since (3)
> Last_Transaction (3)
> Birth_Date (2)
> Ext_Demographic_Data (2)
> Title (2)

⊕ Collapse

FIG. 15

TONIC

Workspace: My Workspace ▼ ✏ ⟲ ⎘ ➡ ⬆ ⊕ New Workspace    ƒx Generate Data | ⊙ ≡

Workspaces
My Workspace

Manage

Foreign Key Relationships

View Foreign Key Relationships   Add Foreign Key Relationships

- 🛡 Privacy Hub
- ⛃ Database View
- ▦ Table View
- 🔑 Foreign Keys
- ⚔ Jobs
- ⇅ Schema Changes
- ▽ Subsetting
- 🗒 Post-Job Actions Column name search                                                                                          🔍 Advanced

Select Foreign Key(s) Sorting by Frequency (Desc) ◆

Select Primary Key public.customers.Email ◆

🔍 Filter...

Found 100 of 100 columns matching ""

public.customers.Customer_Key
public.customers.Last_Name
public.customers.Gender
public.customers.Email
public.customers.Marital_Status
public.customers.Number_Of_Children
public.customers.Annual_Income
public.customers.Occupation
public.customers.Largest_Bill_Amount ∨ Customer_Key (3)
  ☐ customers.Customer_Key
  ☑ customers_legacy.Customer_Key
  ☑ marketing.Customer_Key
∨ First_Name (3)
  ☑ customers.First_Name
  ☑ customers_legacy.First_Name
  ☑ marketing.First_Name
> Last_Name (3)
> Gender (3)
> Marital_Status (3)
> Number_Of_Children (3)
> Annual_Income (3)
> Occupation (3)
> Largest_Bill_Amount (3)
> Store_Membership_Card (3)

⊙ Collapse

FIG. 16

TONIC

Workspaces ↶ ↷ | Workspace: [My Workspace ▼] | ✎ | ⬜ | ⧉ | ⬇ | ⬆ | ⊕ New Workspace | *fx* Generate Data | ⊙ | ≡
My Workspace

Manage

- 🛡 Privacy Hub
- 🔗 Database View
- ▦ Table View
- 🔑 Foreign Keys
- ⚒ Jobs
- ⇄ Schema Changes
- ⛉ Subsetting
- ▤ Post-Job Actions

Foreign Key Relationships

View Foreign Key Relationships    Add Foreign Key Relationships

[Column name search]    🔍 Advanced

Select Foreign Key(s) [Sorting by Frequency (Desc) ◆]      Select Primary Key v Last_Name (3)      [Primary Key ◆]
   ☐ Customers.Last_Name
   ☐ customers_legacy.Last_Name     🔍 Last_Name         ✕
   ☑ marketing.Last_Name       Found 2 of 99 columns matching 'Last_Name'
                                              public.customers.Last_Name
                                              public.customers_legacy.Last_Name    🗑
                                              marketing.Last_Name
> Gender (3)
> Email (3)
> Marital_Status (3)
> Number_Of_Children (3)
> Annual_Income (3)
> Occupation (3)
> Largest_Bill_Amount (3)
> Store_Membership_Card (3)
> Customer_Since (3)
> Last_Transaction (3)
> Birth_Date (3)
> Ext_Demographic_Data (2)

⊕ Collapse

TONIC

Workspace: My Workspace ▼

Foreign Key Relationships

View Foreign Key Relationships — Add Foreign Key Relationships

| Column name search | | *fx* Generate Data |
|---|---|---|
| | | Q Advanced |

🗑 Bulk Delete

| ☐ ▶ Foreign Key [Sort ◆] | Primary Key [Sorting by Column Name (Asc) ◆] |
|---|---|
| ☐ marketing.Customer_Key | customers.Customer_Key |
| ☐ retail_sales.Customer_Key | customers.Customer_Key |
| ☐ customers.First_Name | customers.Customer_Key |
| ☐ customers_legacy.First_Name | customers.Customer_Key |
| ☐ marketing.First_Name | customers.Customer_Key |
| ☐ retail_sales.Date_Key | date.Date_Key |
| ☐ vendors.[Manager_Start_Date_Key,Manager_End_Date_Key] | wo_date.[Date_Key,Date_Key] |
| ☐ wholesale_orders.[Order_Date_Key,Shipped_Date_Key] | wo_date.[Date_Key,Date_Key] |
| ☐ retail_sales.Product_Key | products.Product_Key |
| ☐ wholesale_orders.Product_Key | products.Product_Key |
| ☐ retail_sales.Store_Key | stores.Store_Key |

Sidebar
- Workspaces
- My Workspace
- Manage
- Privacy Hub
- Database View
- Table View
- Foreign Keys
- Jobs
- Schema Changes
- Subsetting
- Post-Job Actions ⊕ New Workspace ⊕ Collapse

FIG. 20

```
[
    {
        "fk_schema": "public",
        "fk_table": "customers_legacy",
        "fk_columns":
        [
            "Birth_Date"
        ],
        "target_schema": "public",
        "target_table": "customers",
        "target_columns":
        [
            "Birth_DateXXXXXXXKFLDASKLFHD"
        ],
        "nullable": false
    },
    {
        "fk_table": "customers_legacy",
        "target_table": "customers",
        "fk_schema": "public",
        "target_schema": "public",
        "fk_columns":
        [
            "Customer_Key"
        ],
        "target_columns":
        [
            "Customer_Key"
        ],
        "nullable": false
    },
    {
        "fk_table": "marketing",
        "target_table": "customers",
        "fk_schema": "public",
        "target_schema": "public",
        "fk_columns":
        [
            "Customer_Key"
        ],
        "target_columns":
        [
            "Customer_Key"
        ],
        "nullable": false
    },
    {
```

6 lines, 162 characters selected     Tab Size: 4    JSON

FIG. 21

TONIC

Workspace: My Workspace ▼ | ✎ | ⎘ ⎗ ➔ ⬆ ⊕ New Workspace | ƒx Generate Data | ⊙ ≡

- Workspaces
- My Workspace

Manage
- 🔒 Privacy Hub
- ⛃ Database View
- ▦ Table View
- 🔑 Foreign Keys
- ⚒ Jobs
- ⇄ Schema Changes
- ▽ Subsetting
- ▤ Post-Job Actions

Foreign Key Relationships
View Foreign Key Relationships | Add Foreign Key Relationships

Customer

Select Foreign Key(s) | Sorting by Column Name (Asc) ◆

- ∨ Annual_Income (3)
  - ☐ customers.Annual_Income
  - ☐ customers_legacy.Annual_Income
  - ☐ marketing.Annual_Income
- \> Birth_Date (3)
- \> Customer_Address (1)
- \> Customer_Key (2)
- \> Customer_Since (3)
- ∨ Email (3)
  - ☐ customers.Email
  - ☐ customers_legacy.Email
  - ☐ marketing.Email
- \> Ext_Demographic_Data (2)
- \> Gender (3)
- \> Largest_Bill_Amount (3)
- \> Last_Name (3)

Select Primary Key

Primary Key ◆

Create New Foreign Key
⊕ Create 0 Foreign Keys

Foreign Key Preview
None

2302

🔍 Advanced

⊕ Collapse

FIG. 23

MULTI-DATABASE SUBSETTING

CROSS REFERENCE TO OTHER APPLICATIONS

This application claims priority to U.S. Provisional Patent Application No. 63/167,500 entitled MULTI-DATABASE SUBSETTING filed Mar. 29, 2021 which is incorporated herein by reference for all purposes, and claims priority to 63/291,600 entitled VIRTUAL FOREIGN KEYS filed Dec. 20, 2021 which is incorporated herein by reference for all purposes.

BACKGROUND OF THE INVENTION

It would be beneficial, for various purposes, to obtain a subset of a database. However, due to the size and complexity of databases, obtaining a useful subset can be challenging.

BRIEF DESCRIPTION OF THE DRAWINGS

Various embodiments of the invention are disclosed in the following detailed description and the accompanying drawings.

FIGS. 11A and 11B illustrate embodiments of user interfaces for configuring foreign key relationships.

FIG. 12A illustrates an embodiment of a portion of a table.

FIG. 12B illustrates an embodiment of a portion of a table.

FIG. 13A illustrates an embodiment of an interface for viewing foreign keys.

FIG. 13B illustrates an embodiment of an interface for adding a virtual foreign key relationship.

FIG. 13C illustrates an embodiment of an interface for viewing virtual foreign key relationships.

FIG. 13D illustrates an embodiment of a portion of a table.

FIG. 14 illustrates an embodiment of an interface for configuring a virtual foreign key relationship.

FIG. 15 illustrates an embodiment of an interface for configuring a virtual foreign key relationship.

FIG. 16 illustrates an embodiment of an interface for configuring a virtual foreign key relationship.

FIG. 18 illustrates an embodiment of an interface for configuring a virtual foreign key relationship.

FIG. 19 illustrates an embodiment of an interface for accessing a JSON representation of a virtual foreign key relationship.

FIG. 20 illustrates an embodiment of an interface for viewing foreign key relationships.

FIG. 21 illustrates an embodiment of a JSON representation of a virtual foreign key relationship.

FIG. 23 illustrates an embodiment of an interface for adding virtual foreign key relationships.

DETAILED DESCRIPTION

Figure 1:
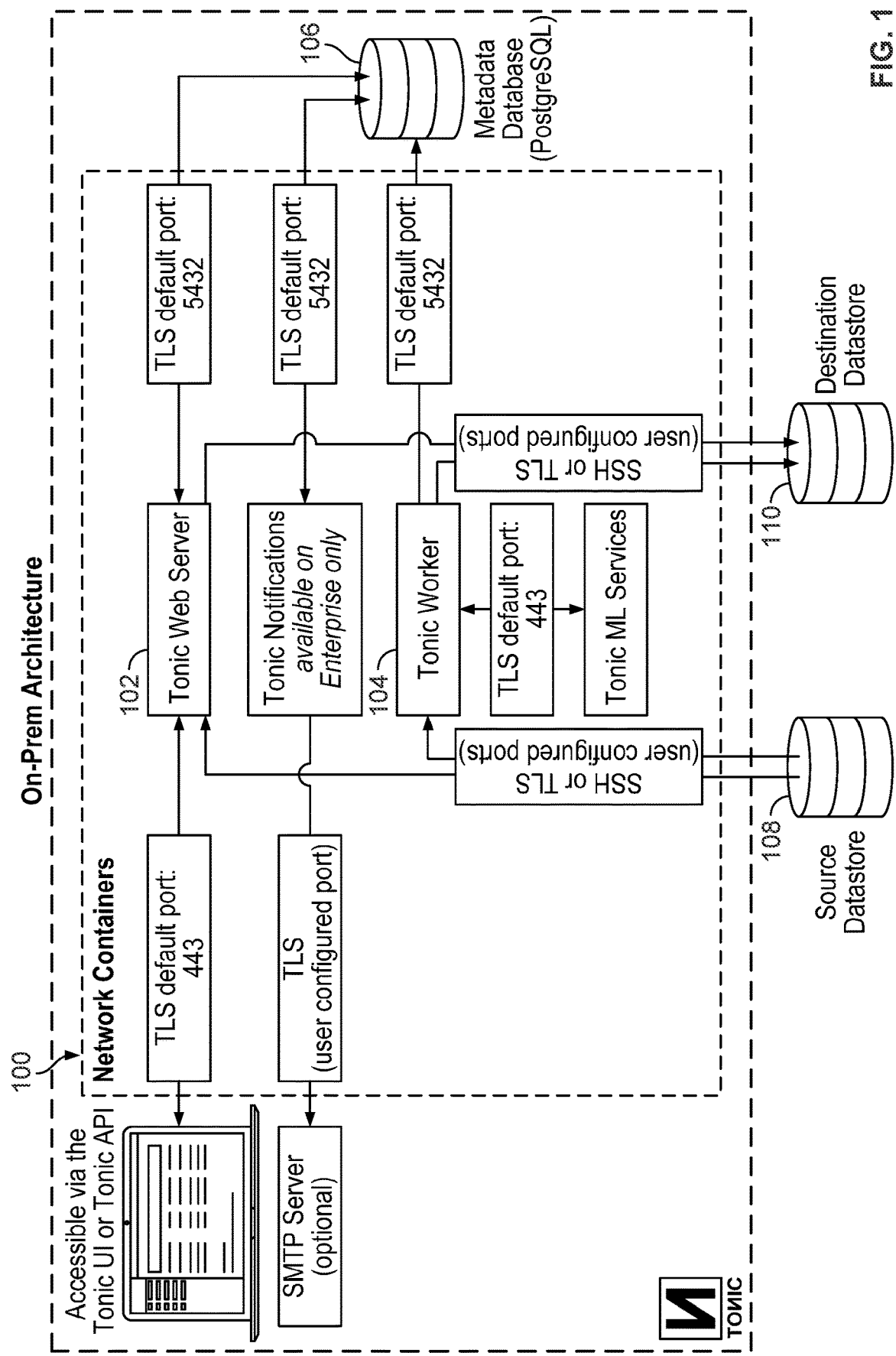
FIG. 1 illustrates an embodiment of an environment in which database subsetting is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for multi-database subsetting. In some embodiments, subsetting data includes intelligently shrinking data in order, for example, to take a representative sample of data in a manner that preserves the referential integrity of a database intact at the end of the subsetting processing. For example, if there are 50 source tables, each of which has some number of rows, at the end of the subsetting process described herein, the resulting subset would have the same number of tables, with the same schema, but with fewer rows.

End users may wish to access or use production data in order to perform analysis, test features, etc. However, there are various challenges associated with working with production data. For example, production data tends to grow in size and complexity over time, and it can be difficult for any one person to maintain the entire data model. Testing and analyzing a large production data set can be problematic. For example, working with production data comes with various security risks, downtime risks, access concerns, regulatory requirements, etc. Modifying production data may pose various risks and be untenable. For example, modifying production data when testing a feature may cause issues (e.g., corruption issues) or regressions. Further, making full copies of production data to work on may be resource intensive from a cost and time perspective, especially if the production data is being refreshed often.

Such challenges may be addressed by using the multi-database subsetting techniques described herein. For example, using embodiments of the subsetting techniques described herein, a database may be intelligently shrunk in a manner that not only preserves the referential integrity of the database, but also captures data that is useful (but not necessarily required for referential integrity) for analysis to be performed by an end user. The following are various examples of benefits of operating on a subset of a database (rather than, for example, directly on production data).

As one example, there may be cost savings. For example, as there is less data in the subset than the entire database, storage costs are lowered, whether in hardware or in a cloud service. Less bandwidth would also be necessary to retrieve and share data. By requiring less bandwidth to transfer data, this improves the ease of using and sharing the data as well, especially in the context of remote work, where individuals may have varying upload/download speeds. Further, by utilizing subsets, less time may be spent packaging and building data environments for testing, staging, etc. In this way, less time is spent refreshing and packaging these environments, making it easier to have an up-to-date packaged database that anyone can use. As will be described in further detail below, this is also useful if masking or obfuscation of data is used to protect privacy of certain columns.

The use of subsets generated using the multi-database subsetting techniques described herein also provides benefits in increasing productivity. For example, a subset of data may be more easily shared and utilized, for example, even on a laptop. This would allow a developer to load the subset of data on their local machine, which may be beneficial from a development standpoint, speeding up iteration cycles, etc. As another example, the subset may be sent as an email attachment or placed in a cloud drive, or utilized in a more complex scenario such as in a Docker container. Further, different teams and services can use different subsets of data that are applicable to their particular needs, which may be different. This is beneficial for microservices and teams that are only concerned with certain domains of data at an organization. Further, the use of subsets makes it easier to reproduce specific data environments for testing, analysis, and development.

The subsetting processing described herein also provides benefits with respect to privacy. For example, the subsetting described herein may be used to provide sharing of a subset of a database that satisfies GDPR (General Data Protection Regulation) requests. For example, when a user wishes to obtain data pertaining specifically to them, the subsetting described herein may be used to identify the relevant subset of data across one or more databases. The subset of data specific to that person may then be provided, without exposing the private information of other individuals. As another example, suppose a support issue is to be solved for a particular user. The support issue can be resolved for that particular user without sharing any data beyond that user. Rather, the subsetting described herein may be used to obtain only the data pertaining to that user, where it is then provided to a support team for evaluation.

There are various challenges to performing subsetting. For example, consider a "Users" table in an e-commerce database. While taking or selecting 5% of the single Users table may be simple, it is more difficult to obtain related data from other tables (e.g., "Orders" table, "Products" table, "Reviews table," etc.), without which referential integrity may be broken. Obtaining such data required for referential integrity may be difficult due to the complex relationships among tables in a database. For example, there may be a large number of tables in modern databases, where tables may be spread across multiple, separate databases, which may in turn be sharded. Typical databases can have complex dependency trees, even if not defined in the database. Thus, due to such complexity in dependencies, determining a subset of data that maintains referential integrity can be challenging.

Further, even if the data necessary for referential integrity was obtained, obtaining a useful subset is challenging, as much of the valuable data may be optional from a referential integrity standpoint. For example, what would be useful to include in a subset may differ depending on the type of the end user and the type of work they would like to perform. For example, different organizations and domains may have vastly different needs with respect to the type of data they need to work on. Thus, even for the same set of starting databases, what data to include in a subset, what database and storage systems that are used, how related data is tied together, etc. may be different for different groups.

Typically, due to such challenges, organizations take a simple cut of their production data set to work on, losing a great deal of the utility of their production dataset, as well as resulting in issues with referential integrity being broken.

The multi-database subsetting techniques described herein address such challenges. Using the multi-database subsetting techniques described herein, a subset may be obtained in a programmatic, computer-supported manner that not only maintains referential integrity, but also extracts related auxiliary data that, while optional from a referential integrity standpoint, provides utility to an end user.

Example Subsetting Architecture

FIG. 1 illustrates an embodiment of an environment in which database subsetting is performed. In various embodiments, platform 100 is configured to ingest data, process data (e.g., determine a data subset), provide the subset as output, etc. In this example, the platform includes a web server 102 and a worker 104. In some embodiments, the web server is an interaction component that users of the platform communicate with (e.g., via web-based applications installed on their browsers that interact with the web server). In some embodiments, the worker is configured to perform subsetting. In some embodiments, the webserver and the worker access source data from source data store 108. In various embodiments, the webserver provides various functionality, including providing previews to users.

In some embodiments, the worker is implemented as a container (e.g., in Docker or Kubernetes). As one example, the container is implemented in Linux, with .NET used as a runtime. In some embodiments, the container has a multi-threaded process. In some embodiments, upon completion of a subsetting job, the output subset is written to destination data store 110.

In some embodiments, the worker and its processing are coordinated through metadata database 106. In this example, the metadata database communicates with the webserver. In some embodiments, when the user requests to generate a subset, the web server sends a notification to the metadata database requesting for an available worker (e.g., worker 104) to perform a job. While a single worker is shown in this example for illustrative purposes, the system may include multiple workers that are performing jobs that have been placed on the metadata database (e.g., where an end user may manually select to generate the subset, or an automated system submits a subset generation request).

In some embodiments, the subsetting platform 100 is implemented on-premises of an entity utilizing the services and functionality of the platform. For example, the system may be on-premises in a virtual private cloud (VPC). In other embodiments, the platform or system is hosted by an operating entity, where customers or subscribers of the system access the hosted system.

In some embodiments, telemetry data from deployments is collected and provided to an entity (e.g., to report logs, bugs, etc.).

Further details regarding database subsetting are described below.

Embodiments of Configuring Subsetting

Figure 2:
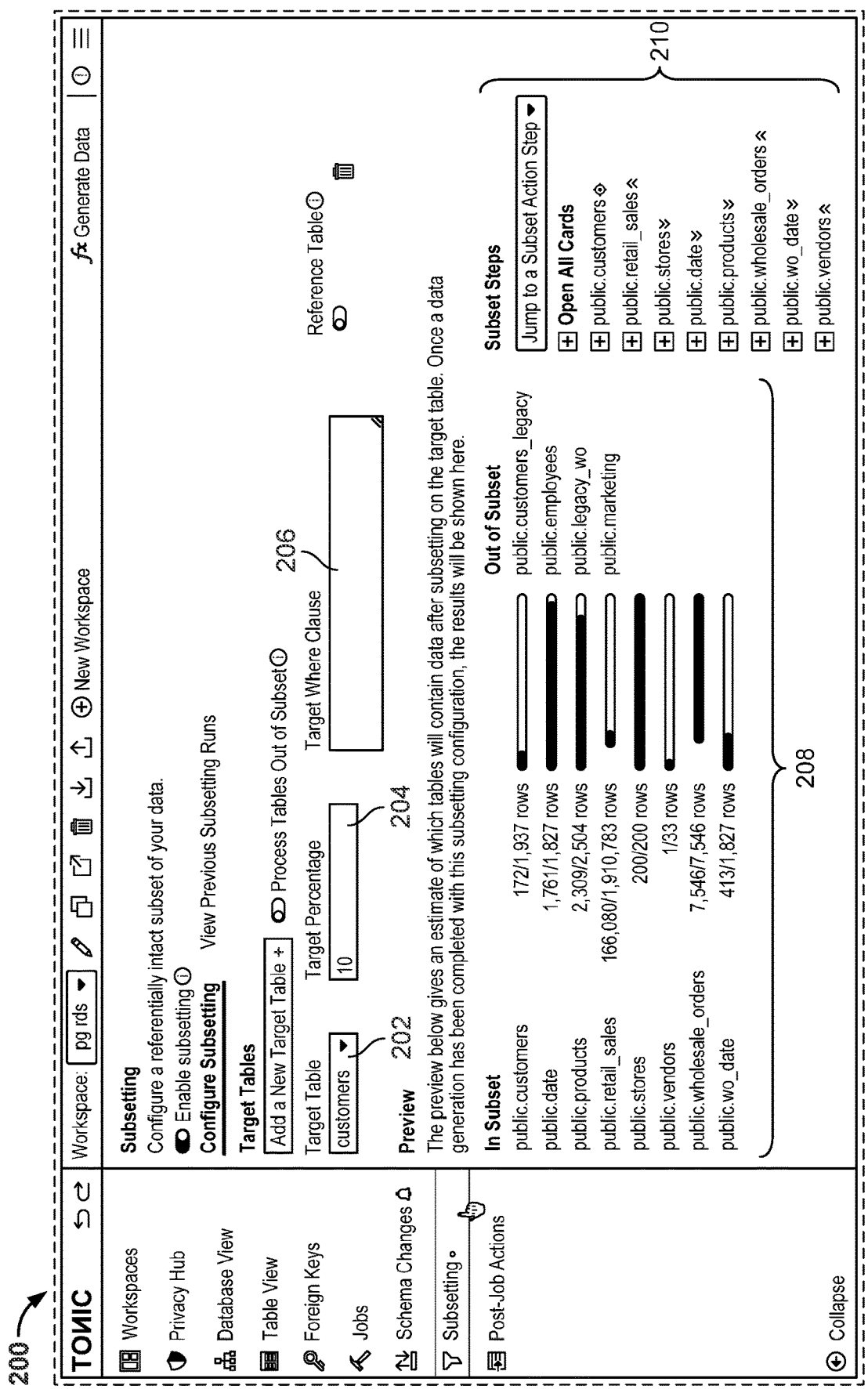
FIG. 2 illustrates an embodiment of a user interface for configuring database subsetting.

FIG. 2 illustrates an embodiment of a user interface for configuring database subsetting. In some embodiments, user interface 200 of FIG. 2 is provided by web server 102. In some embodiments, subsetting includes taking out a logical slice of a source database (or set of source databases, where a subset of tables across multiple databases is taken). This includes obtaining subsets of tables in the source database 108. Examples of source databases include MongoDB, SQL databases, etc. While an example involving a single database is shown in this example below, the database techniques described herein may be variously adapted to accommodate generating a subset of multiple-databases. Further details regarding multi-database subsetting are described below. In some embodiments, as shown at 202, configuring subsetting includes indicating a target table (or set of target tables) in the source database. As will be described in further detail below, in some embodiments, the subsetting process starts with a specific target table that is used as the seed of the subset, where the subsetting process then spreads from that target table across the other tables in the set of source tables for which a subset is to be determined.

Via the user interface, the user may also configure a condition on the target. In some embodiments, as will be described in further detail below, the target condition is used to determine a subset of the initial target table, such as a target set of rows. The target set of rows will then be used as the root data to determine what other subsets of data should be extracted or otherwise collected from other tables in the source database (or source set of tables). One example of a target condition that may be specified is a target percentage of the target table. This is shown at 204. In some embodiments, based on the specification of a target percentage, a random number of rows in the table that matches the target percentage is obtained and used as the seed of data used to determine what other data should be extracted from other tables. In some embodiments, as shown at 206, a user may also specify a target condition on the target table by specifying a target filter clause (e.g., implemented using a "where" clause in some databases). In some embodiments, the target where clause is used to generate a database query, in which a subset of rows of the target table that match the target where clause is obtained to determine the seed/initial set of data upon which subsetting is performed.

As one example of a target where clause, the user may enter filter criteria, such as city='boston'. As another example, the user may set a condition on the Users target table for users where customer_id=[1, 3, 5], in which case three rows of the target table that have matching customer identifiers would be used as the seed or starting point for the subsetting (e.g., as a basis to determine what data to extract from other related tables).

In some embodiments, the system performs validation of the filter criteria. For example, if the filter criteria does not match to a real column in the target table, the system may flag this in the user interface, indicating that there is possibly an invalid WHERE clause. The system may also indicate the nature of the error (e.g., that a column with the name entered in the filter criteria does not exist).

As shown in the example of FIG. 2, a user is configuring subsetting to extract, for example, 10% (target percentage condition) of the customer's table (because the user would like to target 10% of the customer table). When the system extracts 10% of the customers table, this will have an impact on what is extracted from other tables related to the customer table (e.g., retail sales table, products table, stores table, vendors table, etc.) as well.

In the example of FIG. 2, a preview 208 of the subsetting is shown (as configured according to the target table and target condition). In some embodiments, the preview provides an estimate of which tables will contain data after subsetting on the target table. In some embodiments, once data generation has been completed with the subsetting configuration, the results are displayed in the user interface.

With respect to the example preview shown, suppose that there were approximately 2,000 customers in the customers subset. After taking approximately 10% of the customers (based on the target percentage condition), there were 172 customers left. The rows pertaining to those 172 customers are used to determine what subset of data to obtain from other tables in the source data store. In this example, a percentage of the retail sales table was taken because they included the purchases that those customers made. This in turn impacted the products that were included in the logical slice/subset. For example, while only 10% of the sales was extracted, a large percentage of the products table may have been extracted, where, for example, 10% of the sales may encompass a large quantity of products (where there are only 2500 products in this example). In this example, the subsetting is configured to begin from the starting point (e.g., the customer table, indicated as the target table) as a seed, and then proceed from there, expanding into different parts of the source database by following dependencies such as foreign keys.

In the example of FIG. 2, a step-by step reenactment of the subsetting processing performed by the system is shown at 210. In the example of FIG. 2, the subsetting process started with the customer's table (indicated by a "target" symbol), and extracted 172 customers. The subsetting process then scanned the retail sales table and determined, given these customers, which sales records/rows to take/extract. The subsetting process then evaluated, in the following traversal order, the stores table, the date table, the products table, the wholesale orders table, the whole sales orders date table, and finally the public vendors table as part of the sub setting path in order to obtain the logical slice/subset of the entire source database. As shown in this example, the subsetting process uses the rows collected from the target table as a seed from which the subsetting process proceeds, and is used to determine what data to extract from other tables.

While a single target table was configured in the example of FIG. 2, the subsetting need not be limited to a single target table. For example, multiple target tables may be specified. For example, an end user may specify the customer table as well as the retail sales table as a set of target tables. The end user may then specify target conditions on each of the target tables. For example, an end user may target subsetting for 10% of customers, and separately specify all sales that happened on Christmas day. Further details regarding specification of multiple target tables are described below.

As will be described herein, in various embodiments, the subsetting described herein is an automated approach that involves minimal user intervention or user interaction. Using the techniques described herein, a user may simply select a target and condition for the seed of the subsetting, where the platform then determines how to perform the subsetting (e.g., by generating a traversal plan), as well as determines what data to extract from the various tables in the source set of tables. As will be described in further detail below, in various embodiments, the subsetting techniques described herein manage the spread of foreign keys from the target table, and automate determinations such as starting from a target table, what table to obtain data from next, and after deciding on the next table, what data to obtain from that table. In some embodiments, as will be described in further detail below, the subsetting is performed based on following foreign key/primary key relationships among tables.

Subsetting Example

The following is an example of performing subsetting to obtain a logical slice of a source set of tables, where the set of source tables may be included in one or more source databases. In various embodiments, performing subsetting (to generate or otherwise determine a subset of the source set of tables) includes determining what tables in a source set of tables to visit and in what order, as well as determining, for a given visited table, what subset of the table being visited (e.g., some subset of rows) is to be extracted and included in the overall subset. In some embodiments, the source set of tables is included in source data store 108 of FIG. 1, where the subset/logical slice is outputted to destination data store 110 of FIG. 1.

Figure 3:
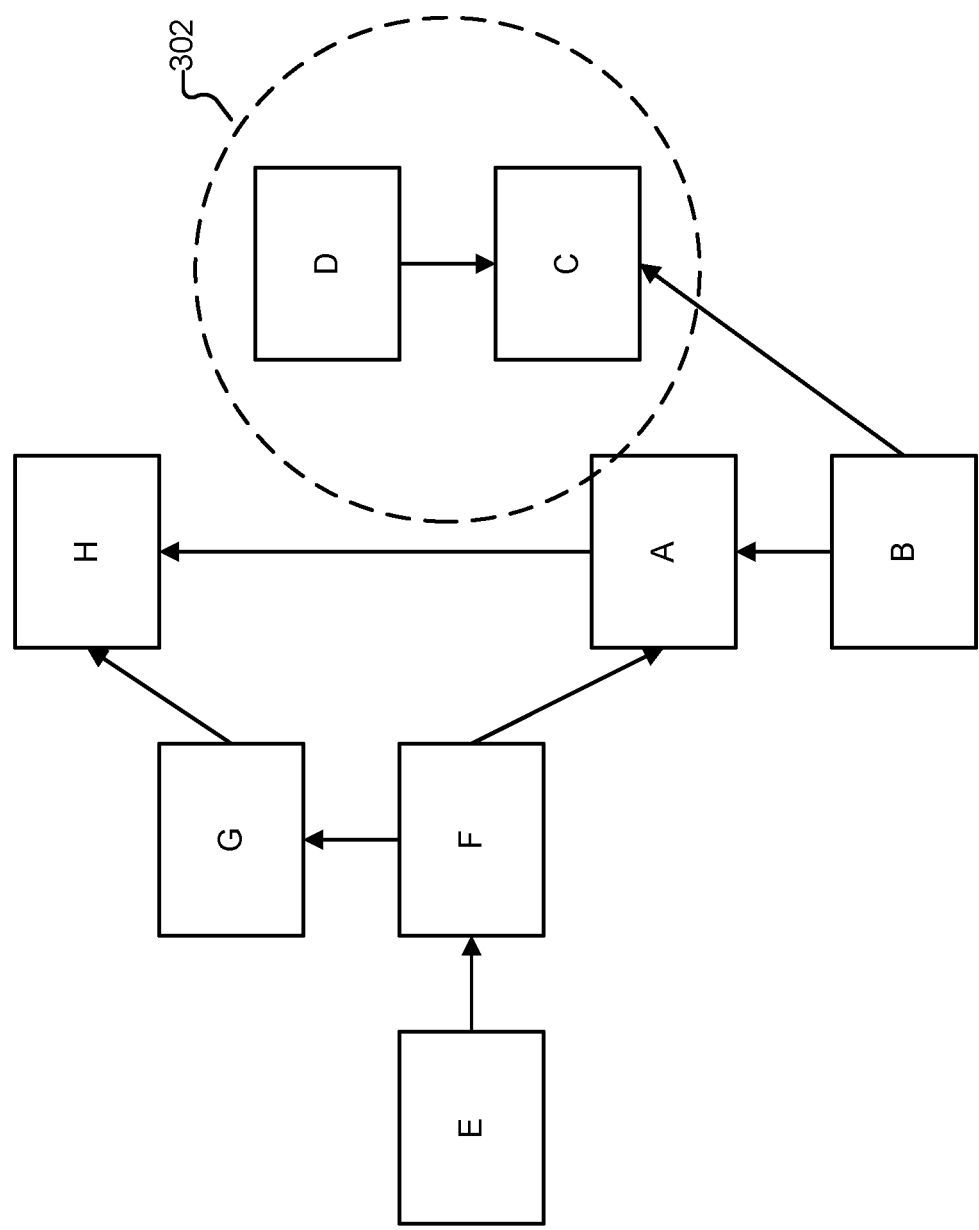
FIG. 3 illustrates an embodiment of a set of source tables.

FIG. 3 illustrates an embodiment of a set of source tables. In this example, suppose that an end user would like to use platform 200 to determine a logical slice or subset of the source set of tables. The source set of tables may be specified using a configuration user interface such as that shown in the example of FIG. 2.

In the example of FIG. 3, the dependencies among the tables in the source set of tables are determined. In this example, the dependencies, which are indicated by arrows, are foreign key/parent key relationships that may be between and within tables. In this example, the direction of the arrows describes which table has the parent/primary key column (or set of multiple primary key columns, or multi-column key), and which table has the corresponding foreign key column (or set of multiple foreign key columns, or multi-column key) that refer to the primary key columns. Consider, for example, tables D and C shown at 302. In this example, table D has a foreign key column that is referred to or is dependent on a parent key column in table C. That is, there is a foreign key relationship from table D to table C, where a row in table D must have a reference to a row in table C. This is based on dependency relationships (e.g., foreign key/parent key relationship), where if a row in D has a foreign key column that refers to a value in the corresponding parent key column in C, then the row in C that includes that value must be obtained from C for referential integrity.

The direction of the dependency relationship between table D and table C is from table D to table C, as table D has a foreign key column that is dependent on or to a corresponding parent key column in table C. In this example, table D is referred to as being "upstream" of C. Table C is referred to as being "downstream" of D. That is, table C has a primary key that a foreign key in table D references. Table D is dependent on/has a dependency to Table C. As shown in this example, the dependencies are used as directed edges among the source set of tables. An edge may either be traveled up from a table to a neighboring upstream table, or traveled down from a table to a neighboring downstream table. The direction of the dependency (to/from one table to another table) determines the direction of the edge.

In some embodiments, as part of subsetting, the subsetting algorithm automatically determines a visitation path or subsetting traversal plan of the tables in the set of source tables. As described above, this is used to determine, starting from the target table, what table to visit next, what table to visit after that, etc. Identifying such a path may be challenging, as there may be multiple possible paths. However, some paths may lead to cycles, in which the visitation would repeat indefinitely, and the determination of a subset would not complete (where the system continues to collect data indefinitely). In some embodiments, using the visitation determination algorithm described herein, a path is determined that is guaranteed to end.

Sorting Tables based on Dependencies

In some embodiments, determining the subsetting traversal plan or visitation path includes sorting the source set of tables according to the dependencies among (and/or within) the tables. As one example, a topological sort is performed.

Topological Sort Example

Figure 4:
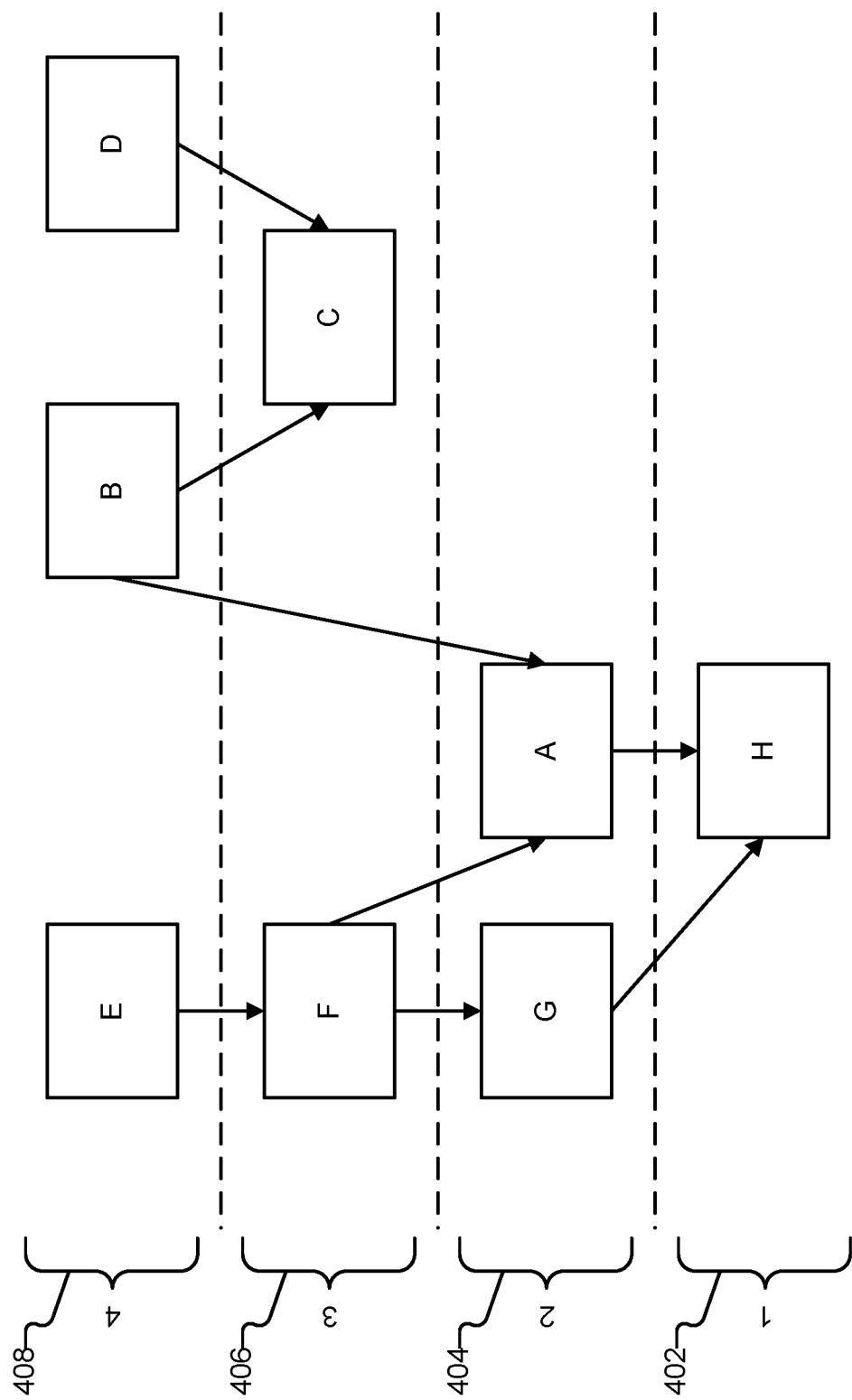
FIG. 4 illustrates an embodiment of a sorted set of source tables.

FIG. 4 illustrates an embodiment of a sorted set of source tables. In this example, a topological sort is performed to determine a partial ordering of the tables shown in the example of FIG. 3. While the use of a topological sort is described herein for illustrative purposes, the subsetting techniques described herein may be variously adapted to accommodate other types of sorting.

Based on the topological sort, the source tables are sorted into tiers. As shown in this example, there are four tiers. In some embodiments, the topological sort places a (partial) ordering on the tables based on the number of ancestor tables or levels of dependencies on the table (as a table may have multiple levels of dependencies on it).

In this example, no tables are dependent on tables E, B, or D, and they are placed into tier 4 (408).

Tables F and C each have one level of dependency on them. For example, for table F, there is a dependency from table E to table F (E→F for table F). For table C, there are two different dependency paths to table C. One is a dependency from table B to C (B→C) and another dependency path to table C is from table D to table C (D→C), both of which are of equal length. Based on having one level of dependency on them, tables F and C are placed into tier 3 (406) (lower value tier than tier 4, which includes table E, B, or D, because of more levels of dependency on tables F and C).

In this example, table G has two levels of dependency on it (where there is a two-level path from E→F→-G), and is placed into tier 2 (404), which is below tier 3.

For Table A, one path of dependencies on it is two levels (E→F→A), and another path has one level of dependency (B→A). In this example, the max length dependency chain/number of levels of dependency on A is two, and is used to determine what tier to bucket table A into. In this example, there are two levels of dependency, and table A is placed into tier 2 along with table G (because A has a path with more levels of dependency than those tables in the tier above).

For Table H, there are two dependency chains that are of length three with three levels of dependency on it (E→F→G→H and E→F→A→H). Thus, it is placed in a lower tier (402) relative to the other tables, Tier 1. Further, table H also has no dependencies to other tables, and so Tier 1 is also the lowest tier in this example.

In this example, the more levels/longer the chain of dependency on a table, the lower the value of the tier that it is bucketed into.

In this example, the sorting is independent of what the target table is. As will be described in further detail below, in some embodiments, the topological sort is used to determine a global impact of a local decision (e.g., choosing what table to visit next). As will be described in further detail below, the ordering imposed by the topological sorting is used to make a local decision, during path determination/visitation, of what table to go to next.

Embodiments of Cycle Detection and Breaking

Due to the complex dependency relationships that may exist between or among the tables, there may be cycles among the source set of tables. This may result in data collection running indefinitely, where the subsetting does not complete. In some embodiments, cycle breaking is performed as part of performing a sorting such as the topological sort.

In some embodiments, the system is configured to identify and break downstream cycles. An example of a downstream cycle is one in which there are three tables. For example, suppose tables 1, 2, and 3, where table 1 refers to table 2, table 2 refers to table 3, and table 3 refers back to table 1.

The following is an example of identifying such cycles. In some embodiments, the topological sorting algorithm is used to identify cycles in the dependency graph generated based on the dependency relationships among the tables in the source set of tables. For example, the topological sort is configured to throw an exception when the sorting algorithm identifies a cycle. The sorting algorithm then reports back what the cycle is. In some embodiments, the reporting of the cycle identified by the topological sort is in the form of a list of edges of the cycle.

In some embodiments, in response to identifying a downstream cycle, an edge is removed. The following are embodiments of logic for removing an edge. In some embodiments, this is performed until cycles are broken. In some embodiments, removing the edge includes removing a referential integrity constraint between two tables, including ignoring or disregarding or removing or deleting a foreign key.

In some embodiments, one edge is removed at a time. The topological sort is then run again on the graph with that edge removed. The topological sort will either end with no cycles found, or will again throw an exception if another cycle is found. If another cycle is found, another edge is removed and the cycle identification/breaking process is repeated.

In some embodiments, the edge that is selected for removal is the one that will reduce the overall size of cycles by the most going forward. In some embodiments, every edge in a cycle is removed one at a time. The edges are removed independently each time, and a next result is determined to observe the size of the next cycle.

If there are no cycles, then the topological sort proceeds. If there is still a cycle present, then the edge that had been removed is returned, and removal of another edge is attempted to make the next new cycle as small as possible.

In some embodiments, if two options of edges result in the same number of edges in a next cycle, one of the edges is selected randomly for removal. The topological sort is then continued, where the process of identifying and breaking cycles is performed iteratively until a zero cycle state is reached.

In some embodiments, an upper bound or threshold is set on the number of cycles that the system will attempt to break. For example, the system may attempt to break up to 100 different cycles (where this maximum number may be a configurable parameter). If a zero cycle graph cannot be determined after the threshold number of attempts, then, in some embodiments, the system returns, indicating that a graph without cycles could not be determined, and that subsetting cannot be performed. A notification may be provided to a user indicating that subsetting cannot be performed.

The following is an embodiment of the cycle identification and breaking logic described above. The sorting algorithm reports back a cycle, as well as the edges in the cycle. The system attempts removal of each single possible edge, individually, to break that cycle. The edge that is ultimately removed is the one that leads to the next cycle being the smallest.

This is an example of a greedy algorithm. A local decision (on which edge to remove) is based on what would result in the smallest next cycle. It would be beneficial if an edge that breaks multiple cycles is selected.

In some embodiments, if the maximum number of cycle-breaking attempts is reached, then the path determination logic aborts, and the subsetting is aborted.

In some embodiments, there are additional constraints on the decision of which edge to remove. In some embodiments, only edges that have a nullable constraint are removed.

In some embodiments, the cycle identification and break logic executes automatically. In other embodiments, user control is provided. For example, a cycle, when detected, may be presented to an end user via a front end, where the end user is provided the option to select which edge to remove.

By removing downstream cycles and bounding the number of upstream passes, this may also bound the number of downstream passes on tables.

Embodiments of Generating a Subsetting Traversal Plan

In some embodiments, subsetting includes determining a traversal path or subsetting traversal plan for visiting the tables. In some embodiments, the traversal path is determined based on how the tables have been sorted (e.g., using the topological sorting described above in conjunction with FIG. 4). In some embodiments, the subsetting traversal plan is generated by system 100 (e.g., by worker 104).

FIGS. 5A-5I illustrate an embodiment of determining a subsetting traversal plan for performing subsetting.

In this example, the traversal path begins with the target table (e.g., specified by an end user via the interface shown in the example of FIG. 2). In this example, table A is the target table. At step 1 (502), table A is visited. To determine what tables are to be visited and the order of visitation, edges to/from table A are followed. As shown in this example, the neighboring tables downstream of A (where table A is dependent on the downstream tables, because they have primary keys that foreign keys in table A refer to) are identified and placed in a downstream priority queue (queue of tables prioritized according to number of ancestors, for example). The neighboring tables upstream of A (that have foreign keys that refer to corresponding primary keys in table A) are identified and placed in an upstream priority queue (queue of tables prioritized according to number of ancestors, for example). In some embodiments, where a table is placed in a priority queue is dependent on what tier that table is in relative to the tiers of other tables already present in the priority queue (where the tier is based on the sorting, as described above).

In this example, table H is a downstream neighbor of table A (where a neighbor of table A, in this example, is a table that is one edge away from table A and has a direct relationship with A), and table H is added to the downstream priority queue (which is initially empty at the start of the traversal plan generation process).

In this example, both table F and table B are identified as being upstream neighbors of table A. As such, both table F and table B are added to the upstream priority queue (which is initially empty). In this example, table F is placed ahead of table B in the upstream priority queue. This is because table F has been sorted into a lower tier as compared with table B (that is, higher tier tables are placed toward the end of the upstream priority queue, and lower tier tables are placed toward the front of the upstream priority queue). Here, relative to table B, table F is placed ahead of table B. Thus, the sorting of the tables, as described above, will impact the order in which they will be visited.

In some embodiments, during the traversal determination process, the system records or tracks which tables have been visited. In some embodiments, tables may be visited multiple times, and the system records the number of times the table has been visited. In this example, table A is marked as having been visited (indicated by the check mark in this example).

With table A having been visited, the traversal path determination processing proceeds to step 2 (504), and a next table is visited. In some embodiments, the upstream priority queue is processed first. That is, tables from the upstream priority queue are visited first. When there are no more tables in the upstream priority queue to visit, tables in the downstream priority queue are visited. In some embodiments, the upstream queue is ordered such that the lower tier tables are processed before higher tier tables. In some embodiments, the downstream queue is ordered such that higher tier tables are processed before lower tier tables.

Figure 5A:
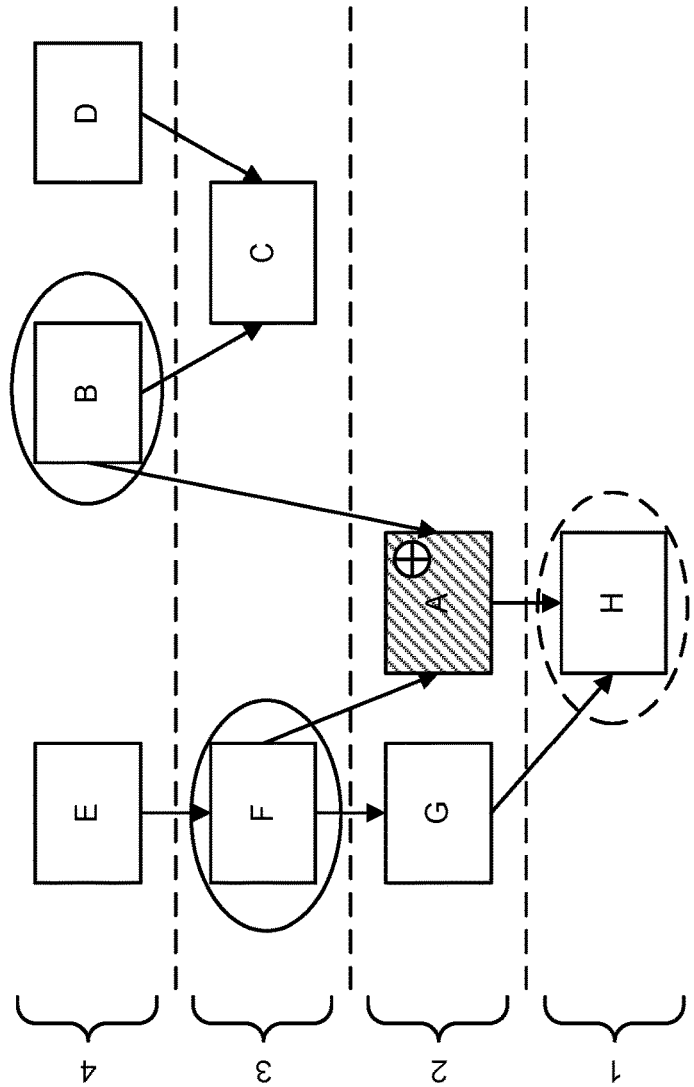
FIGS. 5A-5I illustrate an embodiment of determining a subsetting traversal path.
Figure 5B:
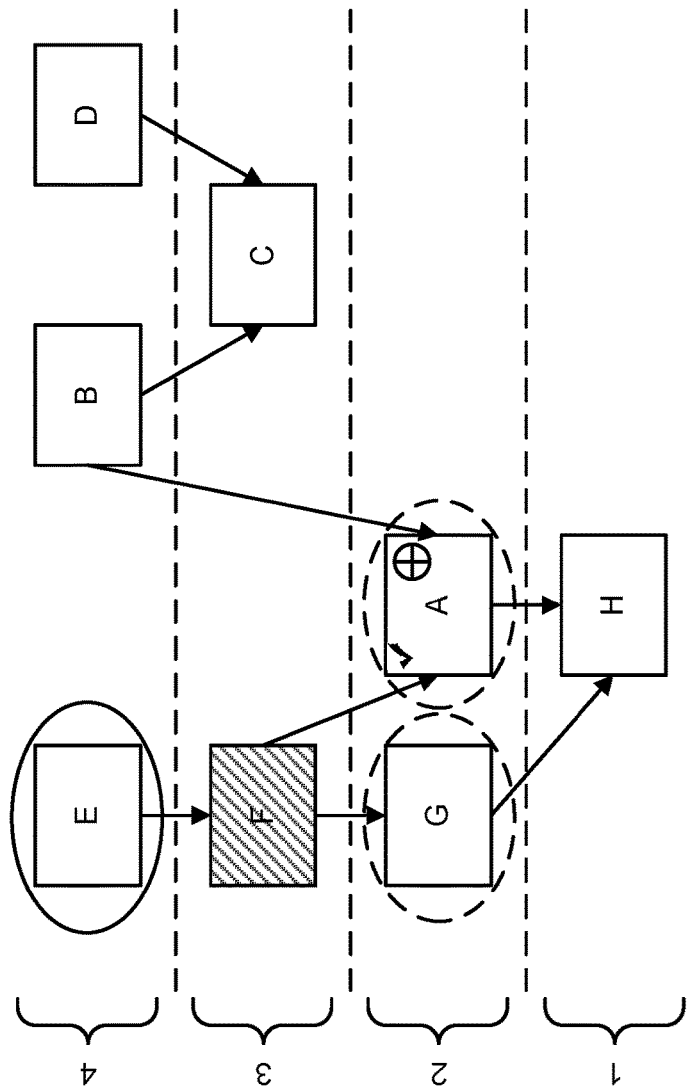

As shown in the example of FIG. 5B, at step 2, table F is visited (where, in this example, tables are pulled from the front of the queue). This is because tables from the upstream priority queue are processed first, as described above. F is at the front of the upstream priority queue, and is thus removed from the upstream priority queue and processed next.

In some embodiments, one goal of the traversal path determination algorithm is to minimize the number of tables that are visited while still obtaining a meaningful subset. In some embodiments, this is facilitated by biasing visitation toward visiting upstream. This reduces the number of times that a table is visited.

In some embodiments, the system tracks whether the table being visited was taken from the upstream queue or the downstream queue. In this example, table F was taken from the upstream priority queue, and the system records that table F is "upstream." As will be described in further detail below, the use of such upstream/downstream tracking will be used during execution of the traversal path (during which data is extracted from visited tables). For example, as will be described in further detail below, in some embodiments, there are two different types or ways in which a data may be collected from a table. If the table had been pulled from an upstream queue, then data is collected from the table in what is referred to herein as an "upstream" pass. If the table had been pulled from a downstream queue, then data is collected from the table in what is referred to herein as a "downstream" pass. A table may be visited multiple times, and be pulled from the upstream queue as well as the downstream queue. Thus, a table may be processed using both an upstream subsetting pass, as well as a downstream subsetting pass in some cases. Further details regarding embodiments of data extraction logic and upstream and downstream passes will be described below.

As described above, in some embodiments, the system also tracks the number of times that a table is visited as part of generating the traversal plan. In some embodiments, the number of times a table is visited is limited to a threshold number (e.g., maximum number of times of visitation). This may be used to bound the number of times a table is visited, and prevent an unbounded number of visits (and to ensure, for example, that data collection will end).

In this example, at step 2, table E is identified as being an upstream neighbor of table F and is included in the upstream priority queue. Table B is currently already in the upstream queue. In this example, table B and table E are at the same tier according to the dependency-based sorting. Table E may then be placed either ahead of B or after B. That is, both tables are of equal preferences, and are interchangeable. Their relative placement in the queue may be selected randomly (or at default relative position, where if there is an existing table in the queue at the same tier, then the new table is placed after the existing table by default). In this example, table E is placed after table B in the upstream queue.

At step 2, table G and table A are identified as being downstream neighbors of table F (the table being visited and processed). In this example, table G is added to the downstream priority queue. As table G is of a higher tier than table H (which is already present in the downstream queue), it is placed ahead of table H in the downstream priority queue. With respect to table A, in some embodiments, the system is configured such that tables that have already been visited are not re-added to queues. This may be a configurable parameter. For example, the system may be configured to allow re-visiting of tables (and re-insertion back into priority queues) up to a threshold number of times, which may be adjustable. In this way, the number of times a table may be included in a queue is limited. In some embodiments, the number of times that a table may be re-added to the downstream priority queue is a configurable parameter that is separate from the number of times that a table may be re-added to the upstream priority queue.

In the example of FIGS. 5A-5I, for illustrative purposes, tables are limited to being included in an upstream queue or downstream queue once. For example, the system may be configured to ensure that no table is visited in an upstream pass more than once. By avoiding upstream passes on a table more than once, this more generally bounds the number of times that tables are visited. In other embodiments, the number of times that a table may be visited is configurable. A threshold number of allowed (re)visits may also be set.

In this example, because table A has already been visited, it is not re-added to the downstream queue. With the upstream and downstream priority queues updated, table F is marked as visited.

Figure 5C:
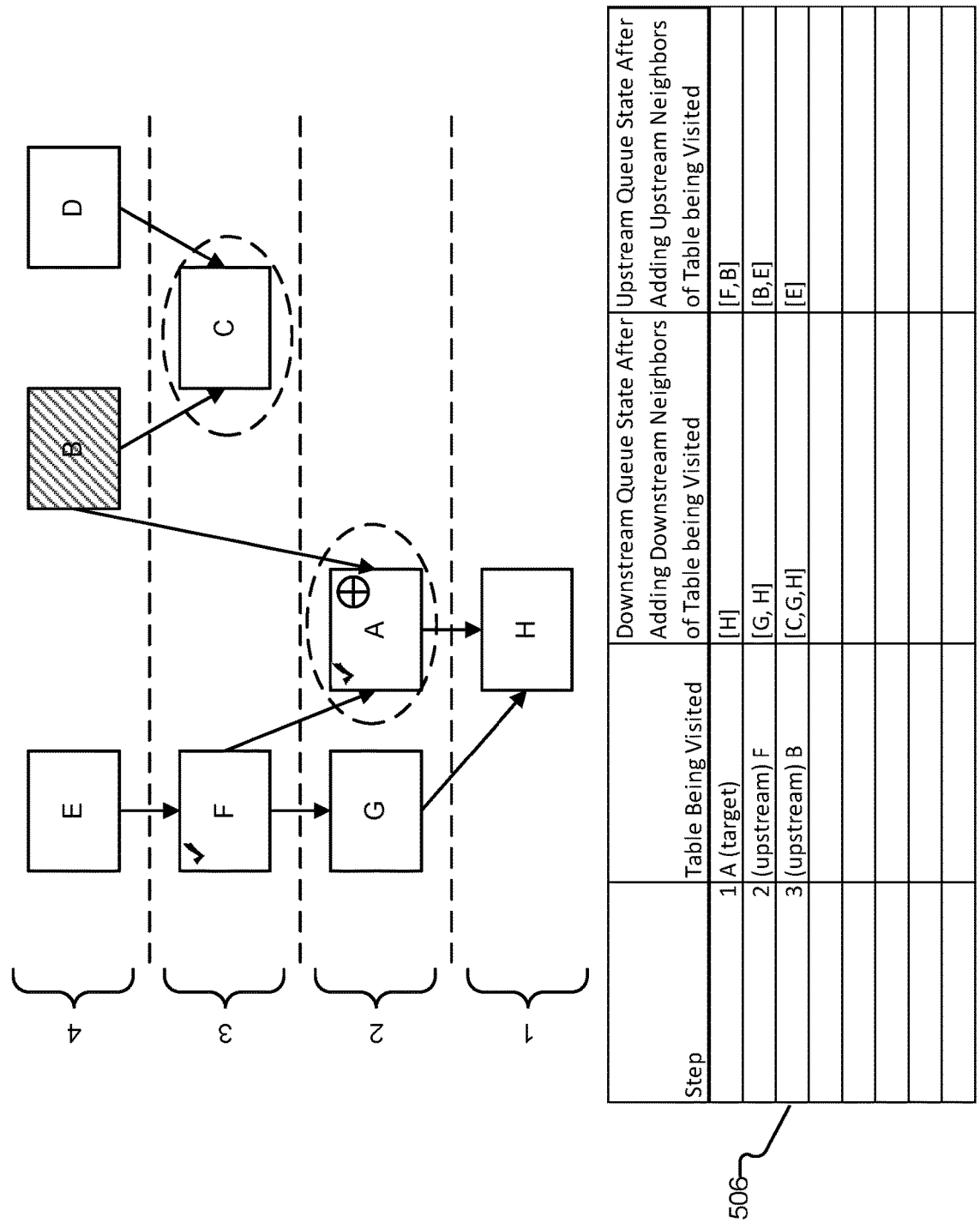

The traversal path determination process continues to step 3, as shown in the example of FIG. 5C. In this example, table B is the first table in the upstream queue, and is removed from the upstream queue for processing. Table B is noted by the system as having been taken from the upstream queue. Table B is now the table being visited/processed in step 3 (506).

In this example, there are no tables that are upstream neighbors of table B, and the upstream priority queue is not updated.

In this example, table A and table C are identified as being downstream neighbors of table B. In this example, as table A has already been visited, it is not re-added to the downstream priority queue. Table C has not been previously visited, and is added to the downstream priority queue. In this example, because C is the highest tier table in the downstream priority queue, it is placed at the front of the downstream priority queue.

Processing of table B has been completed, and table B is marked by the system as having been visited.

Figure 5D:
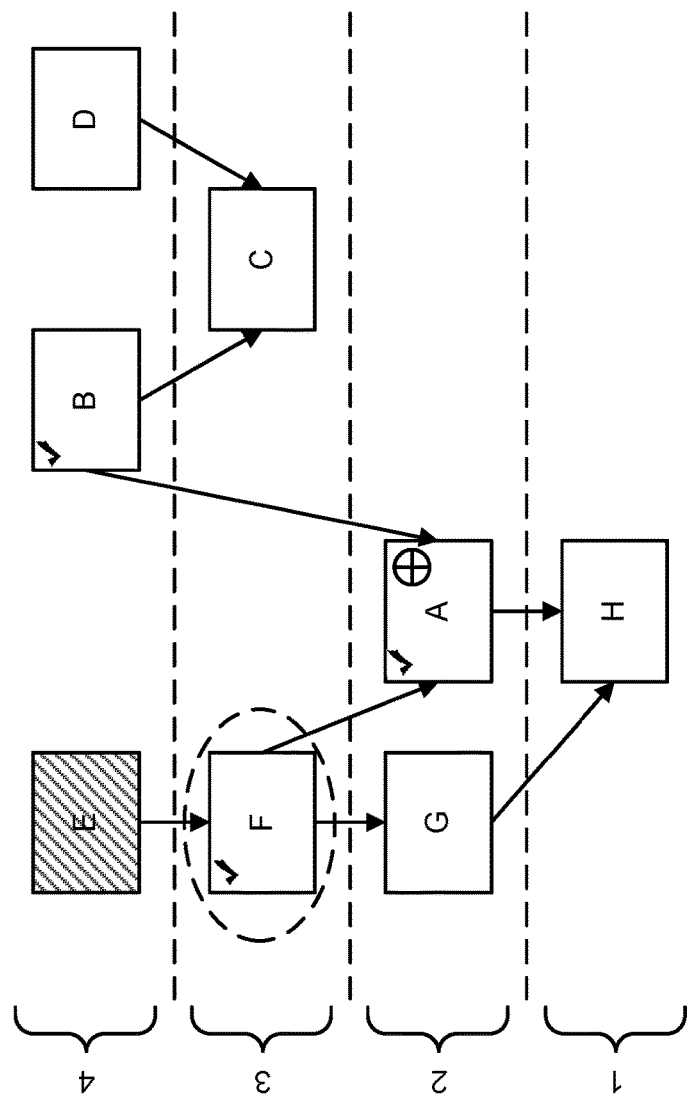

The traversal path determination process continues to step 4, as shown in the example of FIG. 5D. In this example, table E is at the front of the upstream priority queue (and is the only table in the upstream priority queue). Table E is removed from the upstream priority queue for processing. Table E is noted by the system as having been taken from the upstream priority queue. Table E is now the table being visited/processed at step 4 (508).

In this example, there are no tables that are upstream neighbors of table E, and the upstream priority queue is not updated. At this point, the upstream priority queue is empty.

In this example, table F is identified as being a downstream neighbor of table E. As table F is determined to have previously been visited, it is not re-added to the downstream priority queue.

Processing of table E has been completed, and table E is marked by the system as having been visited.

Figure 5E:
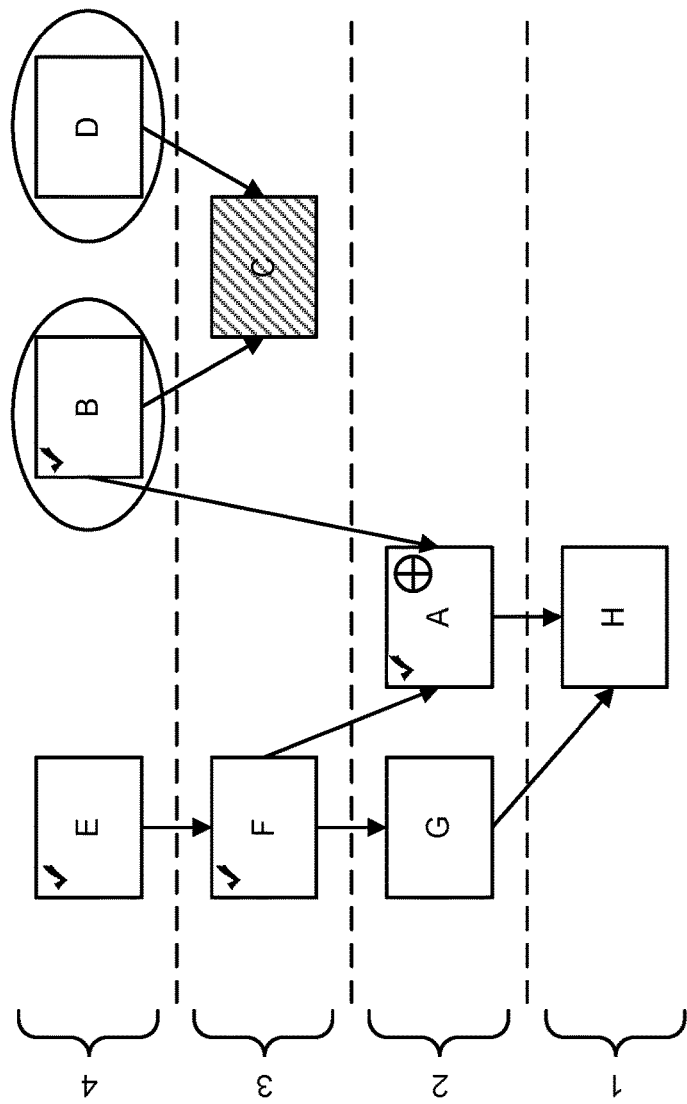

The traversal path determination process continues to step 5, as shown in the example of FIG. 5E. In this example, the upstream priority queue is empty. In response to determining that the upstream priority queue is empty, the traversal path determination algorithm then selects the next table to visit from the front of the downstream priority queue. In this example, the table at the front of the downstream priority queue is table C.

Table C is removed from the downstream priority queue for processing at step 5 (510). Table C is noted by the system as having been taken from the downstream priority queue. Table C is now the table being visited/processed.

In this example, table B and table D are identified as being upstream neighbors of table C. As table B has been previously visited, it is not re-added to the upstream priority queue. Table D has not been visited before, and is added to the upstream priority queue.

There are no tables that are downstream neighbors of table C, and no updates are made to the downstream priority queue.

Processing of table C has been completed, and table C is marked as having been visited (where, as described above, visiting of the table is also recorded, and in some embodiments, if multiple visits are permitted, the count of the number of times the table is visited is incremented).

Figure 5F:
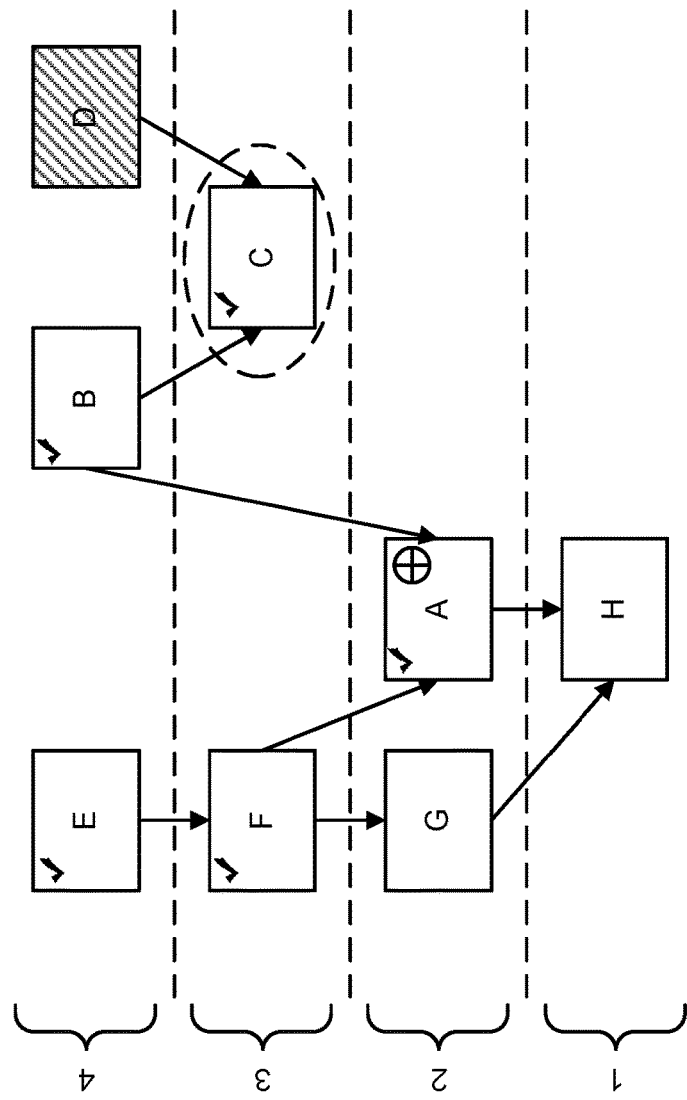

The traversal path determination process continues to step 6, as shown in the example of FIG. 5F. In this example, the upstream priority queue includes table D.

Table D is removed from the upstream priority queue for processing at step 6 (512). Table D is noted by the system as having been taken from the upstream priority queue. Table D is now the table being visited/processed.

In this example, there are no tables that are upstream neighbors of table D, and the upstream priority queue remains empty.

In this example, table C is identified as being a downstream neighbor of table D. The system determines that table C has already been visited, and table C is not inserted again into the downstream priority queue.

Processing of table D has been completed, and table D is marked by the system as having been visited.

Figure 5G:
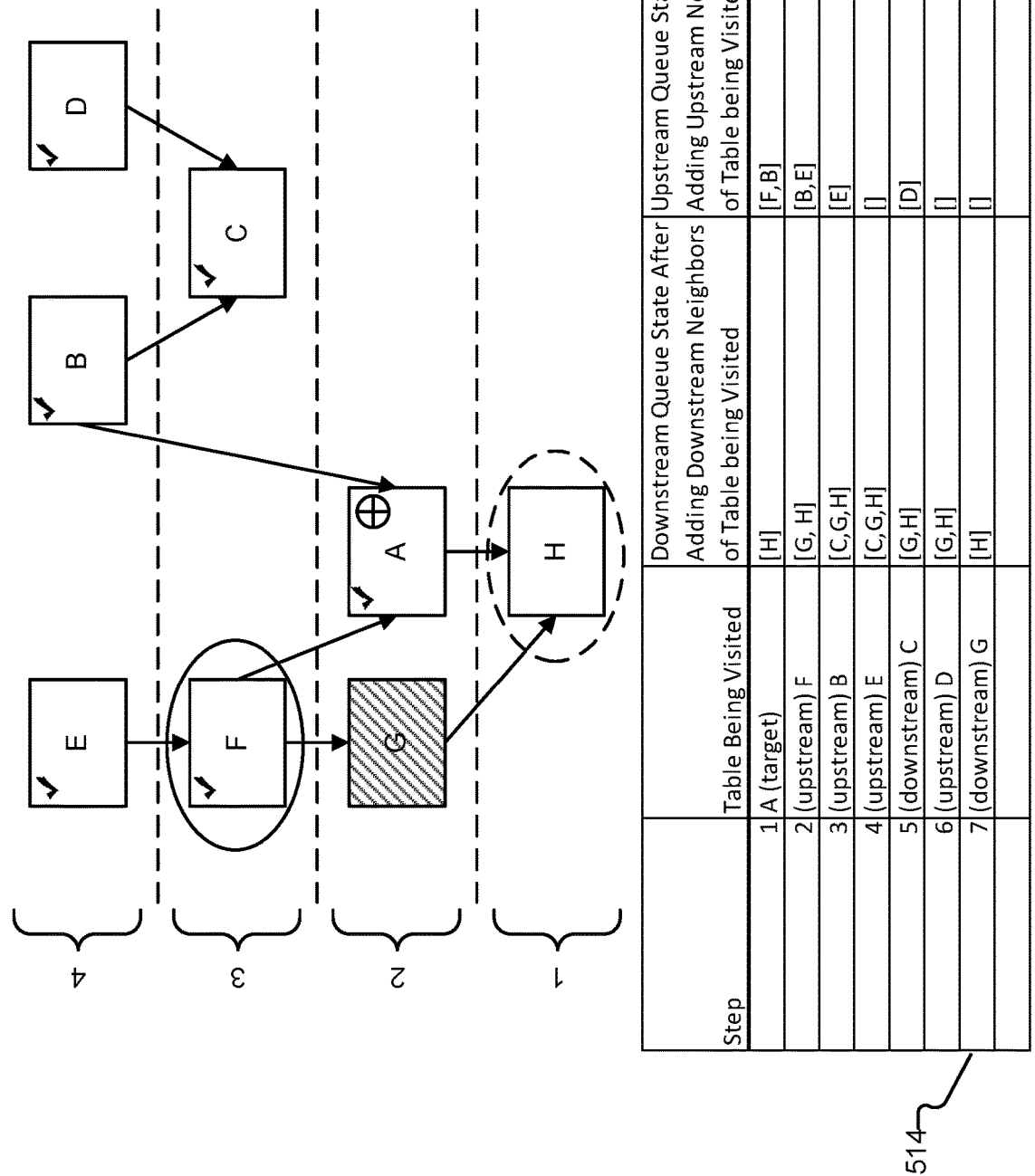

The traversal path determination process continues to step 7, as shown in the example of FIG. 5G. In this example, the upstream priority queue is empty. The path determination algorithm then takes the table at the front of the downstream priority queue, table G, as the next table to visit.

Table G is removed from the downstream priority queue for processing at step 7 (514). Table G is noted by the system as having been taken from the downstream priority queue. Table G is now the table being visited/processed.

In this example, table F is determined to be an upstream neighbor of table G. In this example, in response to determining that table F has already been visited, table F is not re-inserted into the upstream priority queue.

In this example, table H is identified as being a downstream neighbor of table G. While table H is determined to have not been visited yet, because it is already present in the downstream priority queue, table H is prevented from being added again to the downstream priority queue. In some embodiments, a table is only permitted to be present at most once in a queue at any given time.

Processing of table G has been completed, and table G is marked by the system as having been visited.

Figure 5H:
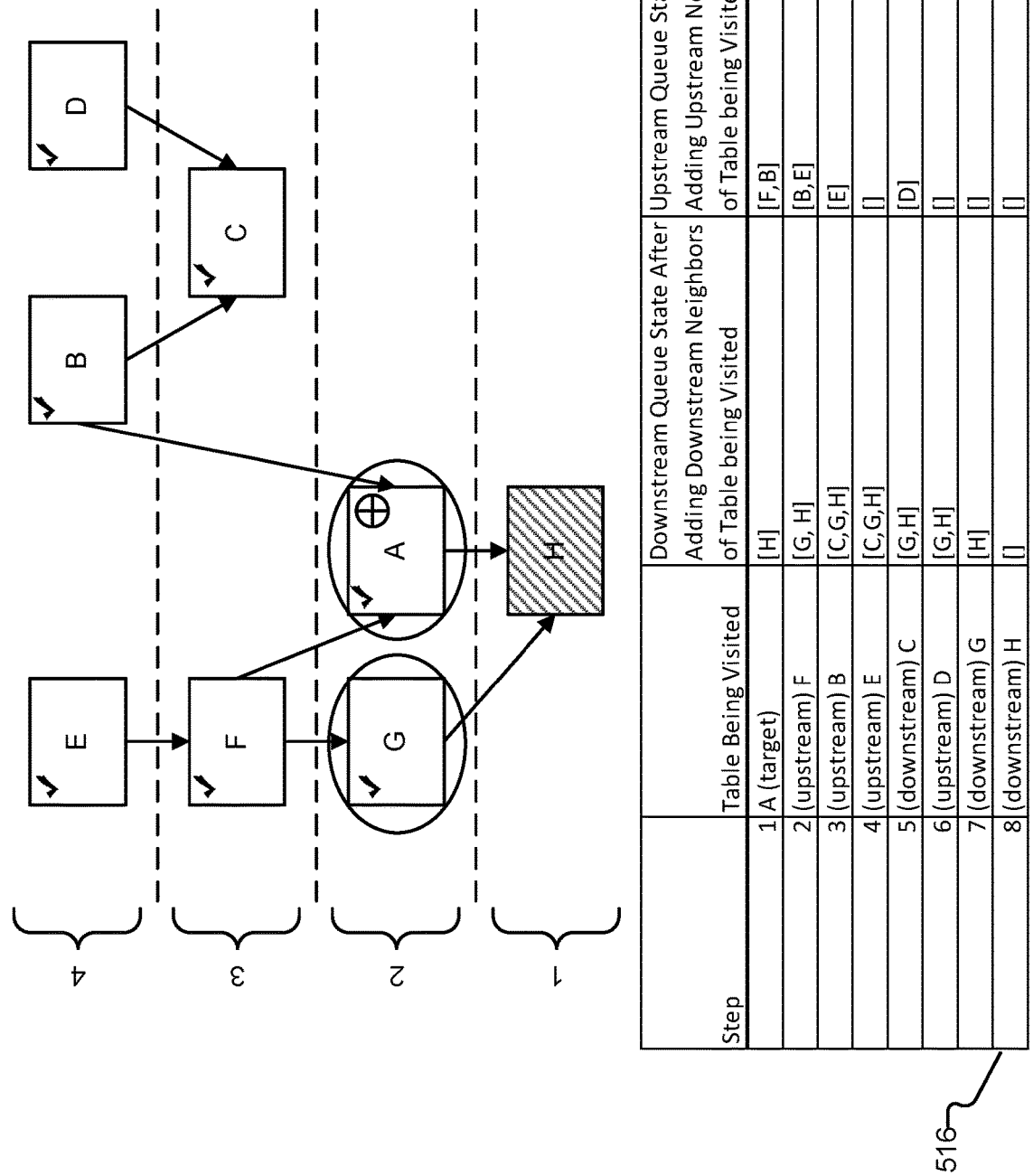
Figure 5I:
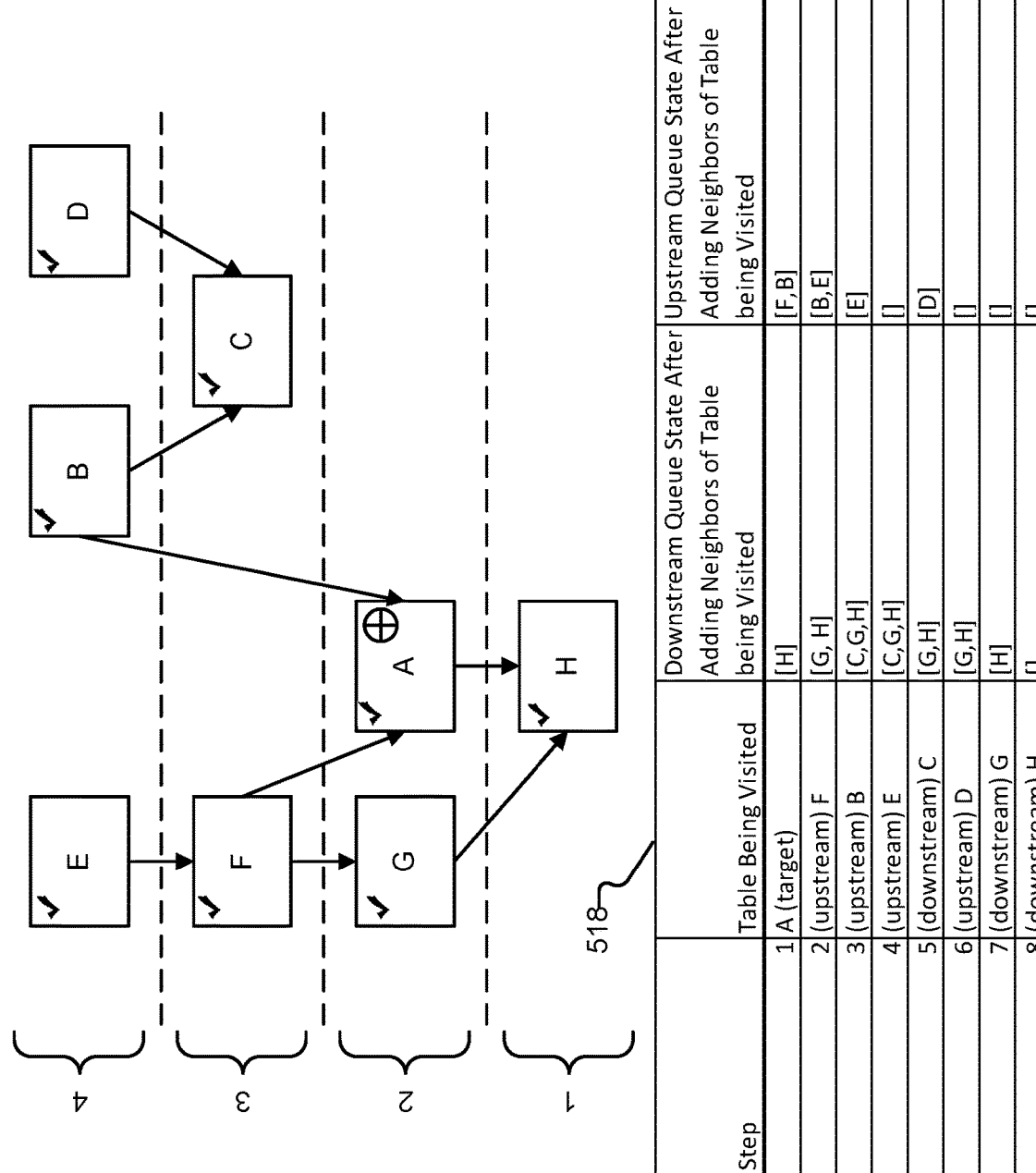

The traversal path determination process continues to step 8, as shown in the example of FIG. 5H. In this example, the upstream priority queue is empty. The path determination algorithm then takes the table at the front of the downstream priority queue, table H, as the next table to visit.

Table H is removed from the downstream priority queue for processing at step 8 (516). Table H is noted by the system as having been taken from the downstream priority queue. Table H is now the table being visited/processed.

In this example, table G and table A are determined to be the upstream neighbors of table H. In response to determining that both table G and table A have been visited, the system does not re-insert them into the upstream priority queue.

In this example, there are no tables that are downstream neighbors of table H (and thus no tables are added to the downstream queue).

Processing of table H has been completed, and table H is marked by the system as having been visited.

At this stage, both the downstream and upstream priority queues are empty, and all tables in the source set of tables have been visited by the traversal path determination algorithm. The path determination processing is thus complete (when both the upstream and downstream queues are empty). The visitation path of the tables determined by the traversal path determination algorithm is then stored as the traversal path to be executed to perform subsetting.

Figure 5J:
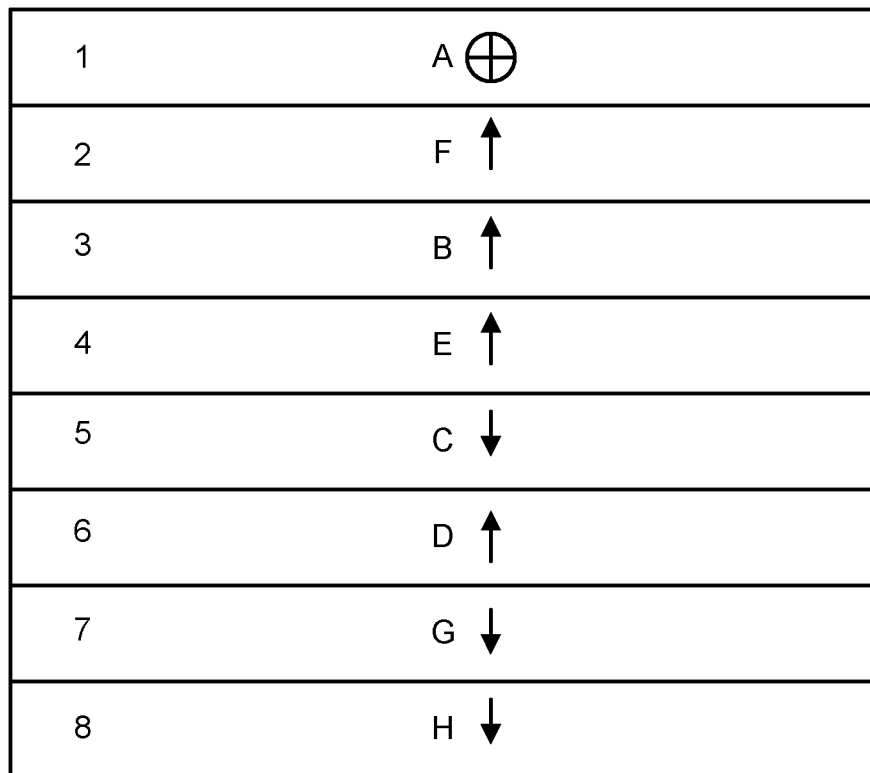
FIG. 5J illustrates an embodiment of a subsetting traversal path.

FIG. 5J illustrates an embodiment of a subsetting traversal path. In some embodiments, the traversal path is the visitation path determined by the processing described in conjunction with the examples of FIGS. 5A-5I (e.g., as shown in column 518 of FIG. 5I, in which the system has recorded the tables that have been visited, the order that they have been visited, as well as whether an upstream or downstream subsetting pass should be performed on a table at a given step in the subsetting traversal plan). In this example, the target table is indicated with a target symbol. This indicates that during the data collection phase, the target table is the table that is visited first, and that what rows to collect from the target table is based on the specified target condition.

As shown in this example subsetting traversal plan 520, the order of visitation of the tables is specified, as well as an indication of whether the table had been taken from an upstream priority queue or downstream priority queue (with an arrow pointing upward indicating upstream, and an arrow pointing downward indicating downstream). In some embodiments, the upstream/downstream arrow is used during the subsetting execution to determine what type of subsetting processing (e.g., either an upstream pass or a downstream pass) to perform.

For example, as will be described in further detail below, if a table is indicated as being associated with an upstream pass, then it has been labeled for being processed using an upstream-type subsetting pass, in which the rows extracted from the table being visited are determined based on data (e.g., corresponding primary key values) that has been extracted from tables that are downstream neighbors. This is used to obtain auxiliary data.

If, on the other hand, the table is indicated as being associated with a downstream pass, then it has been labeled for being processed using a downstream-type subsetting pass, in which the rows extracted from the table being visited are determined based on data (e.g., corresponding foreign key values) that has been extracted from tables that are upstream neighbors. This is used to obtain data necessary for referential integrity, to satisfy referential constraints between the table being visited and the subset of the upstream neighboring tables that have been obtained.

The traversal plan of FIG. 5J is an example of subset steps, such as subset steps 210 shown in the example user interface of FIG. 2. As shown in this example, the mapping of the visitation path is determined pre-emptively, without having fetched any rows from the source data store. That is, the entire subsetting is planned out prior to execution, in some embodiments.

As shown in this example, the path determination algorithm, through the use of the priority queues, expands or spreads out from the target table, where as a table is visited, the various links to/from a table are used to add neighboring tables (that are one edge away) to priority queues. A next table to visit is then selected from a queue, where the process of identifying neighboring tables and adding them to the queues is repeated iteratively. The frontier of what tables are visited expands as the algorithm moves from table to table.

Data Collection and Execution of a Subsetting Traversal Plan

Data extraction from the source set of tables (to determine the subset/logical slice of the source set of tables) is then performed according to the traversal plan generated, as described above.

The following are examples of data collection logic for determining what subset of data (e.g., subset of rows) to collect from a given table. For example, the visitation begins with the target table. The rows obtained from the target table are those that satisfy the target condition.

When other tables are being visited, in some embodiments, what rows to obtain from the table being visited is determined based on the rows that have already been extracted from neighboring tables. In some embodiments, which neighboring tables that are evaluated depends on the manner in which the table being visited was processed during the subsetting traversal plan generation process—in particular, based on which priority queue the table had been pulled from to add to the visitation path.

As described above, when generating the traversal path, the system determines, for each table, whether it was obtained from the upstream queue or from the downstream queue. During data extraction, when a table that had been obtained from the upstream queue is visited for data extraction, this is referred to as processing the table in an "upstream" pass. During an upstream pass of a table being visited, the subset to be collected from the table being visited is dependent on what has already been collected from neighboring downstream tables. This is used to determine auxiliary data/rows.

When a table that had been obtained from the downstream queue is visited for data extraction, this is referred to as processing the table in a "downstream" pass. During a downstream pass of a table being visited, the subset to be collected from the table being visited is dependent on what has already been collected from neighboring upstream tables. This is used to determine data that is required for maintaining referential integrity of the logical slice of the set of source tables.

As will be described in further detail below, different logic is performed to determine what rows to obtain from a table, where what logic to apply is based on whether the table is being visited in an upstream pass or a downstream pass. Examples of such data extraction logic are described below.

Downstream Data Collection Pass

Figure 6A:
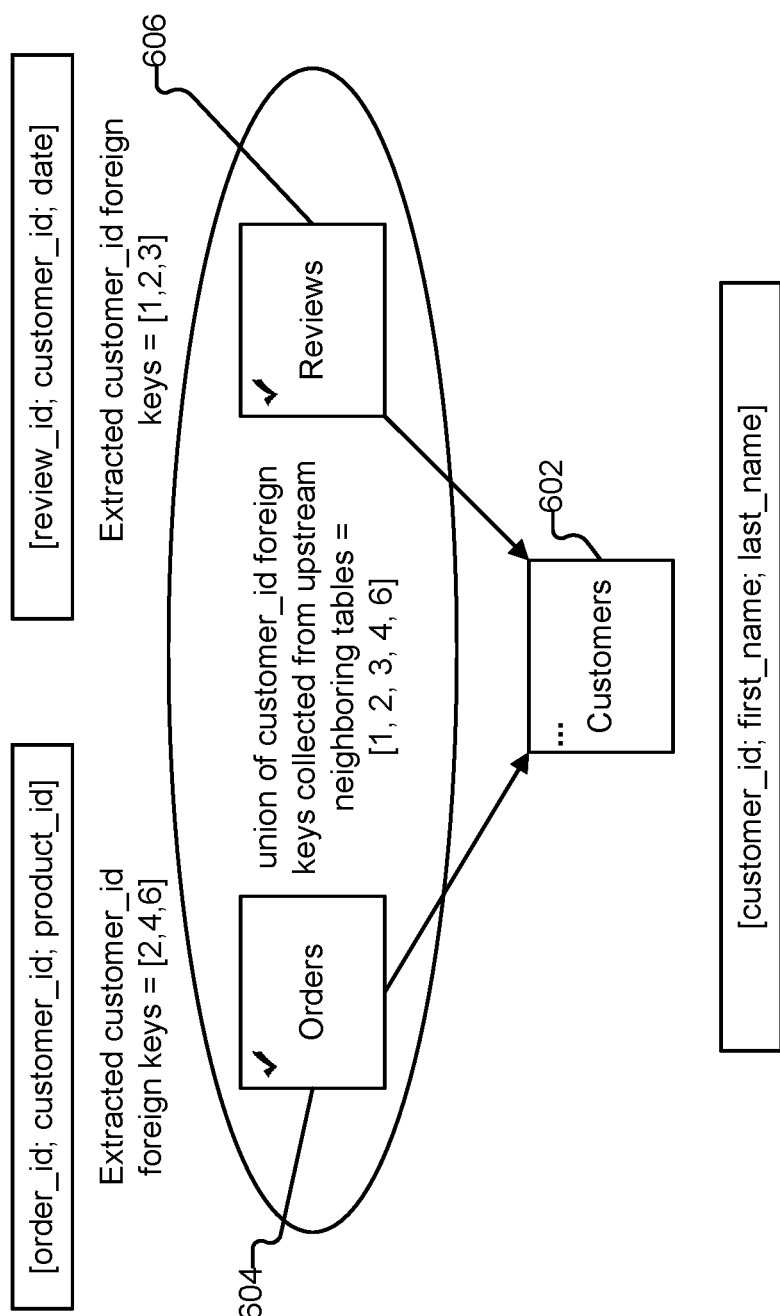
FIG. 6A illustrates an embodiment of determining a subset of a table during a downstream pass on the table.

FIG. 6A illustrates an embodiment of determining a subset of a table during a downstream pass on the table. In this example, suppose that customers table 602 is being visited. In this example, customers table 602, during the subset traversal plan generation process, was pulled from the downstream priority queue, and thus, is to be processed in a downstream subsetting pass. The system determines what rows of the customers table to obtain. In this example, the rows to extract from the customers table are determined based on what data has been extracted from the upstream neighbors of the customers table, which are, in this example, orders table 604 and reviews table 606.

In this example, the information to be obtained is that data that is required to maintain referential integrity. This includes obtaining the rows in the customers table with primary keys that are referred to by foreign keys in the rows that have already been extracted from the tables that are upstream neighbors. In some embodiments, the logic for obtaining data from a table being processed in a downstream pass is to look at all the upstream tables and the foreign keys that those upstream tables have, and all the rows in the table being visited are obtained that are required given the foreign keys already collected for the neighboring upstream tables.

In this example, suppose that the customers table has the following set of columns:

[customer_id; first_name; last_name]

where in this example, customer_id is a primary key.

In this example, the orders table 604 has the following set of columns:

[order_id; customer_id; product_id]

where in this example, the customer_id column in the orders table 604 is a foreign key column that refers to the customer_id primary key column of customers table 602. That is, the orders table has a customer_id foreign key column that refers to the customer_id primary key column in the customers table.

In this example, the reviews table 606 has the following set of columns:

[review_id; customer_id; date]

where in this example, the customer_id column in the reviews table 606 is a foreign key column that refers to the customer_id primary key column of customers table 602. That is, the reviews table also has a customer_id foreign key column that refers to the customer_id primary key column in the customers table.

In this example, suppose that the orders table and the reviews have already been visited as part of the data collection process, and subsets of rows were already extracted from each table. In some embodiments, the platform determines, for the orders table and the reviews table, the customer_id foreign key values in the rows that have previously been extracted from those tables. This may be performed by performing a lookup of data that has been written to the output data store (e.g., in destination data store 110) so far. In another embodiment, similar to observed primary key values, observed foreign key values are also recorded and stored to a cache for referencing, such as to use to determine what foreign key values have been collected so far.

In this example, suppose that the lookup returns that three rows from the orders table had been extracted so far, where the extracted rows included the following customer_id foreign key values: [2, 4, 6].

In this example, suppose that three rows from the reviews table had also been extracted, but with the extracted rows including the following customer_id foreign key values: [1, 2, 3].

In this example, in which the customers table 602 itself is being evaluated as part of a downstream pass, the rows that are obtained from the customers table are those that are required in order to maintain referential integrity of the logical slice/subset. For example, because the orders and reviews extracted rows had foreign keys to certain customer_ids, the rows in the customers table corresponding to those customer_ids must also be included in the output logical slice (in the subset of the customers table that is generated and included in the destination data store).

In some embodiments, the system uses the values for the customer_id foreign key values imported so far to determine a database query on the customers table. For example, the system determines the union of the foreign key customer_id values extracted from the upstream orders and reviews table. This results in the set of customer_id values [1, 2, 3, 4, 6].

The system then generates a database query for the customers table to select and extract those rows where the customer_id value is in [1, 2, 3, 4, 6]. For example, a select statement is created or generated on the source data store to select rows from the customers table where customer_id is in [1, 2, 3, 4, 6]. The following is an example of such a query:

SELECT * FROM CUSTOMERS WHERE customer_id IN (1, 2, 3, 4, 6);

If each customer_id has only one row in the customers table, then those six rows are obtained and added to the subset. In this way, referential integrity with respect to customer_id is maintained among the orders, review, and customer table.

As shown in this example, the customer_id foreign keys that have been collected from the upstream orders and review tables are used to determine what customer_ids (and by extension, what rows) are needed from the customers table. Here, the customer_id foreign key values are followed from the orders and reviews table to the customer table, where whatever customer rows are needed to satisfy the previously extracted customer_id foreign key values are collected.

In the above example query, there were five customer_ids included in the query. Suppose that there were many more values to select on, such as a million values. In such a case, the database may not allow a single query with such a large number of query parameters (and have an upper limit). In some embodiments, the query is chunked into multiple queries, each with a subset of the query parameters.

Upstream Data Collection Pass

Figure 6B:
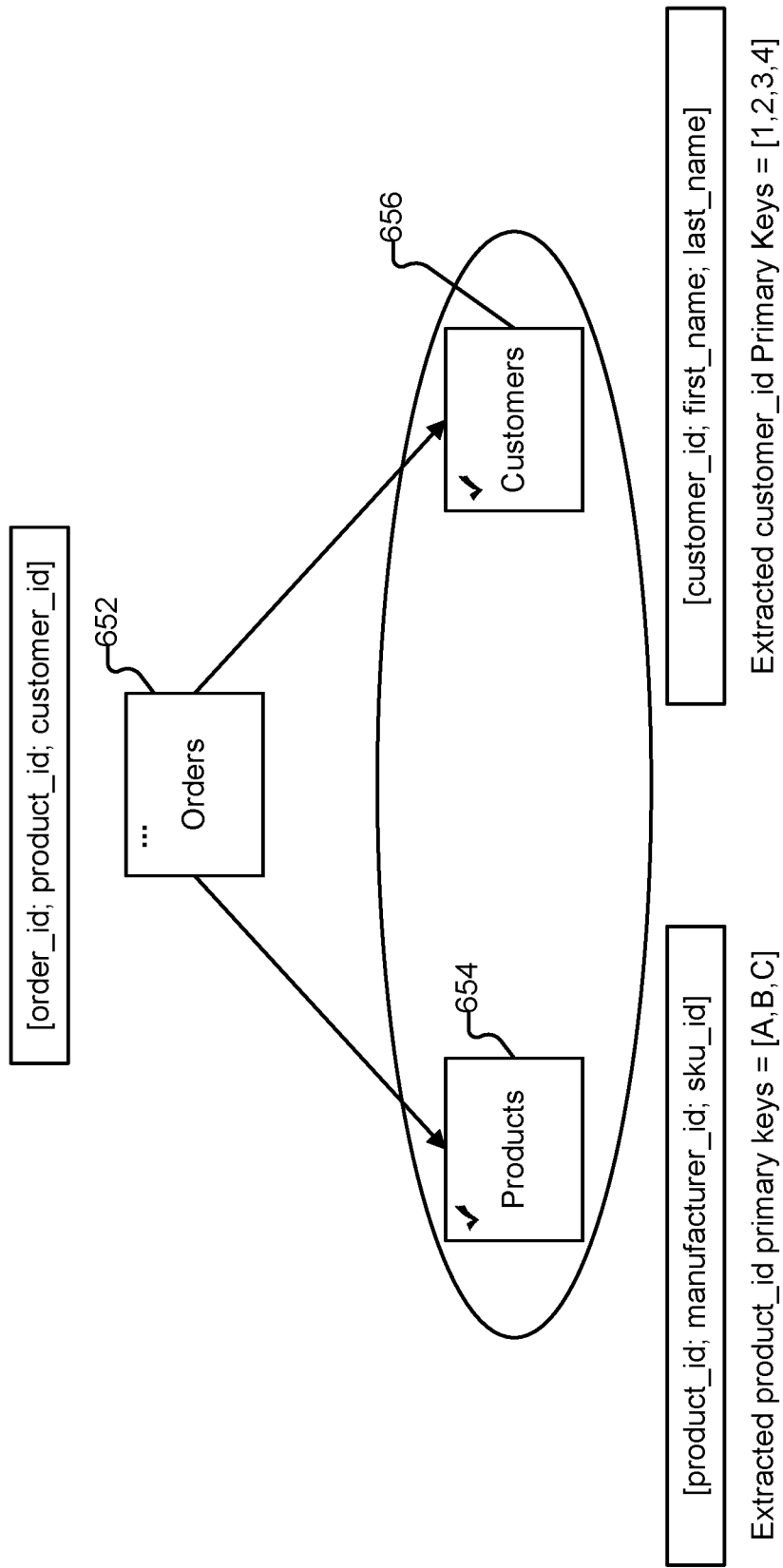
FIG. 6B illustrates an embodiment of determining a subset of a table during an upstream pass on the table.

FIG. 6B illustrates an embodiment of determining a subset of a table during an upstream pass on the table. While an orders table and customers table are included in this example for illustrative purposes, the example of FIG. 6B is separate from the example of FIG. 6A.

In this example, suppose that orders table 652 is being visited. The system determines what rows of the orders table to obtain. In this example, the rows to extract from the orders table are determined based on what data (e.g., primary key values) has already been extracted from the downstream neighbors of the orders table, which are, in this example, products table 654, and customers table 656. In this example, the rows to be obtained in this pass are not needed for referential integrity, but include auxiliary data that would be beneficial to have in the logical slice (information that would be useful for the purposes of testing, for QA, etc.). This includes obtaining rows in the orders table (table being visited) that have foreign key values that reference primary key values in the rows that have already been extracted/imported from the neighboring downstream products and customers tables. In some embodiments, when doing an upstream pass on a table, the neighboring downstream tables are evaluated, and the knowledge of that is used to fill in the data to be obtained from the table being visited.

In this example, suppose that the products table 654 has the following set of columns:

[product_id; manufacturer_id; sku_id]

Where product_id is a primary key column in the products table 654 in this example.

In this example, suppose that the customers table 656 has the following set of columns:

[customer_id; first_name; last_name]

Where customer_id is a primary key column in the customers table 656.

In this example, suppose that the orders table 652 has the following set of columns:

[order_id, product_id, customer_id]

where the product_id column in the orders table is a foreign key column that refers to the product_id primary key column in the products table 654, and where the customer_id in the orders table is a foreign key column that refers to the customer_id primary key column in the customers table 656.

In this example, suppose that the products table had already been visited and had data extracted from it. As described above, in some embodiments, the system, when extracting data from a table, also records the primary key column values that were in the extracted rows. In this example, suppose that for the product_id primary key column, the following primary key values were obtained [A, B, C].

Similarly, in this example, suppose that the customers table had also already been visited and had data extracted from it. In this example, suppose that for the customer_id primary key, the following primary key values were obtained [1, 2, 3, 4].

In this example, in which the orders table 652 itself is being evaluated as part of an upstream pass, the rows that are obtained from the orders table are those that are determined to be of use and that relate to the primary key values already collected from the products and customers table, where a row in the orders table that is determined to be of use is referred to herein as an auxiliary row (and is not required for referential integrity), and is one that has a product_id foreign key value that is included in the set of [A, B, C] and that also has a customer_id foreign key value that belongs to the set of [1, 2, 3, 4]. That is, suppose that the Cartesian product of [A, B, C] and [1, 2, 3, 4] is taken. This results in the set of pairs of (product_id, customer_id):

[(A,1), (A,2), (A,3), (A,4); (B,1), (B,2), (B,3), (B,4); (C,1), (C,2), (C,3), (C,4)]

A row of the orders table is collected if the pair of (product_id, customer_id) for that row is in the above set determined based on the Cartesian product of the previously collected product_id and customer_id primary key values.

In this example, a row from the orders table that has a product_id in [A, B, C], but does not have a customer_id that is in [1, 2, 3, 4] may not be of use to the logical slice (since that row does not relate to a customer_id that had been collected from the customers table), and such rows are not collected from the orders table in some embodiments. An alternative embodiment in which such rows are collected is described in further detail below.

In some embodiments, the system performs an intersection operation to identify the appropriate subset of rows to collect from the orders table. In some embodiments, the intersection operation is performed in memory.

As one example, a first query is made to the orders table for all rows where the product_id foreign key value belongs to [A, B, C]. This may result in the obtaining of rows that have customer_id foreign key values that do not belong in the set of [1, 2, 3, 4]. A second query is made to the orders table for all rows where the customer_id foreign key value belongs to [1, 2, 3, 4]. This may result in the obtaining of rows that have product_id foreign key values that do not belong in the set of [A, B, C].

In some embodiments, the intersection of the results of the two queries to the orders table (which are, for example, two sets of rows) is determined to be the subset of the orders table that is added to the output logical slice in the destination data store.

The following is another example of a query usable to fetch a subset of rows. In this example, the following database query is generated and executed on the orders table (based on the primary key values collected from the downstream neighboring products table 654 and customers table 656):

SELECT * FROM ORDERS WHERE product_id IN ('A', 'B', 'C') and customer_id IN (1, 2, 3, 4);

In this example, an intersection is determined, where a Cartesian product is generated of every possible combination of product_id and customer_id (as shown in the example Cartesian product shown above). Here, all rows in the orders table are obtained or imported where product_id is in [A, B, C] and the customer_id is in (1, 2, 3, 4).

While in this example, a relatively small number of values (from a database querying perspective) is used in the WHERE clause of the query, databases may be large, and there may be millions of values upon which the query is based. Even if chunking were performed, the number of combinations of parameters would result in a large number of queries that may be untenable to perform.

In some embodiments, to address such cardinality issues and minimize the number of database queries that are made, the system performs a database query that is based on collected primary key values for one of the downstream tables. For example, the downstream table that has the smaller number of extracted primary key values is used to generate a database query on orders. Here, in this embodiment, one of the downstream tables is selected as a primary or master table. The primary table is the one that will produce the fewest number of queries against the database. By choosing such a table, there will be fewer queries against the database, speeding up the data collection process.

As described above, in some embodiments, the system maintains a record of the values imported for various primary keys during the data collection process. In some embodiments, a count is made of the number of values imported for the primary keys implicated in the generation of the database query. The primary key (which belongs to one of the tables) for which fewer values have been imported is selected as the primary key upon which the database query will be generated.

In this example, the products table is selected as the master table, and the database query is generated based on the product_id primary key values that have been extracted for the products table. For example, the system generates a database query for all rows in the orders table where the product_id values belong in the set [A, B, C], but does not include a condition on the customer_id key.

This set of rows returned based on the database query is placed in memory before being written to the output destination data store. The system then performs, in memory, a filtering of the rows based on the customer_id primary key values that were previously extracted from the customers table (where in some embodiments, the primary key values are kept track of and accumulated (e.g., locally to the computing device, either in memory or on disk), where there is a locally cached copy of every primary key that has been observed). For example, if a returned row does not have a customer_id value that belongs to [1, 2, 3, 4], the returned row is discarded and is not included in the logical slice/subset. If the returned row does have a customer_id value that is in the set of [1, 2, 3, 4], then the row is written to the subset of the orders table in the destination data store. In this way, rather than determining the subset completely through database queries (which may become untenable), the number of database queries is minimized, and where a portion of the data collection processing is performed in memory (rather than on the source data store).

The above embodiment of selecting a primary or master table upon which to base the database query avoids issues to do the Cartesian product, and applies to both upstream and downstream passes on tables. The Cartesian product issue may occur whenever there is more than one table or column under consideration in generating a filtering condition for importing a subset of rows.

Filtering

In some embodiments, when obtaining auxiliary or optional data, various options to filter such auxiliary data are provided. For example, a temporal filter may be applied to query only for orders that were in the last month. In this way, queries may be written that decide what to include and what not to include in the subset. In this way, the output subset may be tuned.

Null Values

In the above example upstream data collection pass of FIG. 6B, the data collection queries made to the orders table were constructed based on a Cartesian product, where the queries were issued to obtain rows from the orders table where product_id IN ('A', 'B', 'C') and customer_id IN (1, 2, 3, 4). Such data collection queries result in rows being requested from the orders table with (product_id, customer_id) belonging to:

[(A,1), (A,2), (A,3), (A,4); (B,1), (B,2), (B,3), (B,4); (C,1), (C,2), (C,3), (C,4)]

In some embodiments, the queries to the orders table are expanded to collect rows where:
one of the product_id and customer_id foreign key values is permitted to be NULL or unfilled, and the other foreign key value is non-NULL, such as where (product_id, customer_id) belong to:
[(A, NULL); (B, NULL); (C, NULL); (NULL,1), (NULL, 2), (NULL,3), (NULL,4)]
or to collect rows from the orders table where both of the product_ID and customer_ID foreign key values are NULL (NULL, NULL).

In some embodiments, including rows for which at least some of the foreign key values of interest (i.e., that are being used by the query to identify rows to collect) are unfilled or NULL is beneficial when obtaining auxiliary data, as for some tables, it may not be expected for every row to have each and every column filled out with a non-NULL value. For example, some tables may have two disjoint columns, where if a value is filled out in one column, it is not filled out in the other column. In such a case, issuing data collection queries for rows where values for both foreign keys are filled out would not yield any rows.

Thus, issuing queries to include collection of rows where at least one of the foreign key columns of interest is allowed to be unfilled provides flexibility with respect to what foreign keys are filled out in the table from which data is being collected.

In some embodiments, what additional rows are requested (beyond those that satisfy the Cartesian product) is a configurable heuristic. For example, for upstream data collection passes on a table, an end user may allow for rows to be collected where the relevant foreign key values are all NULL, or the end user may specify that at least one of the foreign key values must be non-NULL.

Union Data Collection

In the above example, an intersection operation was performed to determine what rows to collect from the table being visited. This minimizes the data that is collected during an upstream pass, and minimizes the number of times each table must be visited, as will be described in further detail below. In other embodiments, rather than determining the intersection, a union operation is performed. This expands the amount of data that is collected during an upstream pass.

For example, referring to the example of FIG. 6B, rather than basing what rows from the orders table to collect on the Cartesian product of product_id IN ('A', 'B', 'C') and customer_id IN (1, 2, 3, 4), all rows are taken from the orders table where product_id IN ('A', 'B', 'C') or customer_id IN (1, 2, 3, 4). In this case, this will likely result in an expanded or larger subset of the orders table being taken. For example, rows where the product_id is in ('A', 'B', 'C') but where the customer_id is not in (1, 2, 3, 4) may be obtained. For example, a row of the orders table where product_id='A' and customer_id=10 may be collected.

Collecting data in this manner has implications for both the execution phase of subsetting (during which data is collected), as well as the traversal order determination phase. For example, suppose that a row of the orders table where product_id='A' and customer_id=10 was collected. In this case, the customer_id foreign key value of 10 was collected. However, the row with the corresponding primary key value in the customers table had not been collected. In order to maintain referential integrity, the customers table should be revisited during the data collection phase in order to obtain the row that has the corresponding customer_id primary key value of 10. That is, the downstream neighbors should be revisited in a downstream data collection pass, in light of the new foreign keys that have been collected from the orders table. In some embodiments, during the data collection phase, when revisiting a table such as the customers table during the downstream data collection pass, a query is constructed that only collects the data in the customers table referenced by those new rows collected from the orders table.

In order for the downstream table to be revisited during the execution phase, the traversal path determination algorithm is adapted to allow revisitation (e.g., revisitation of tables for downstream data collection passes). For example, when a table pulled from an upstream queue is visited during the path determination phase, its downstream neighbors are re-added to the downstream queues even if they have been visited before.

Continued Subsetting Example

FIGS. 7A-7I illustrate an embodiment of collecting a subset of data. In this example, a subset of the set of source tables in the examples of FIGS. 5A-I is obtained. In this example, the traversal plan described in conjunction with FIG. 5J is executed. As will be shown in the examples below, data will be collected from a table in upstream and downstream passes. Data collected in upstream passes will be indicated in slanted lines. Data collected in downstream passes on a table will be indicated with a dotted pattern.

Figure 7A:
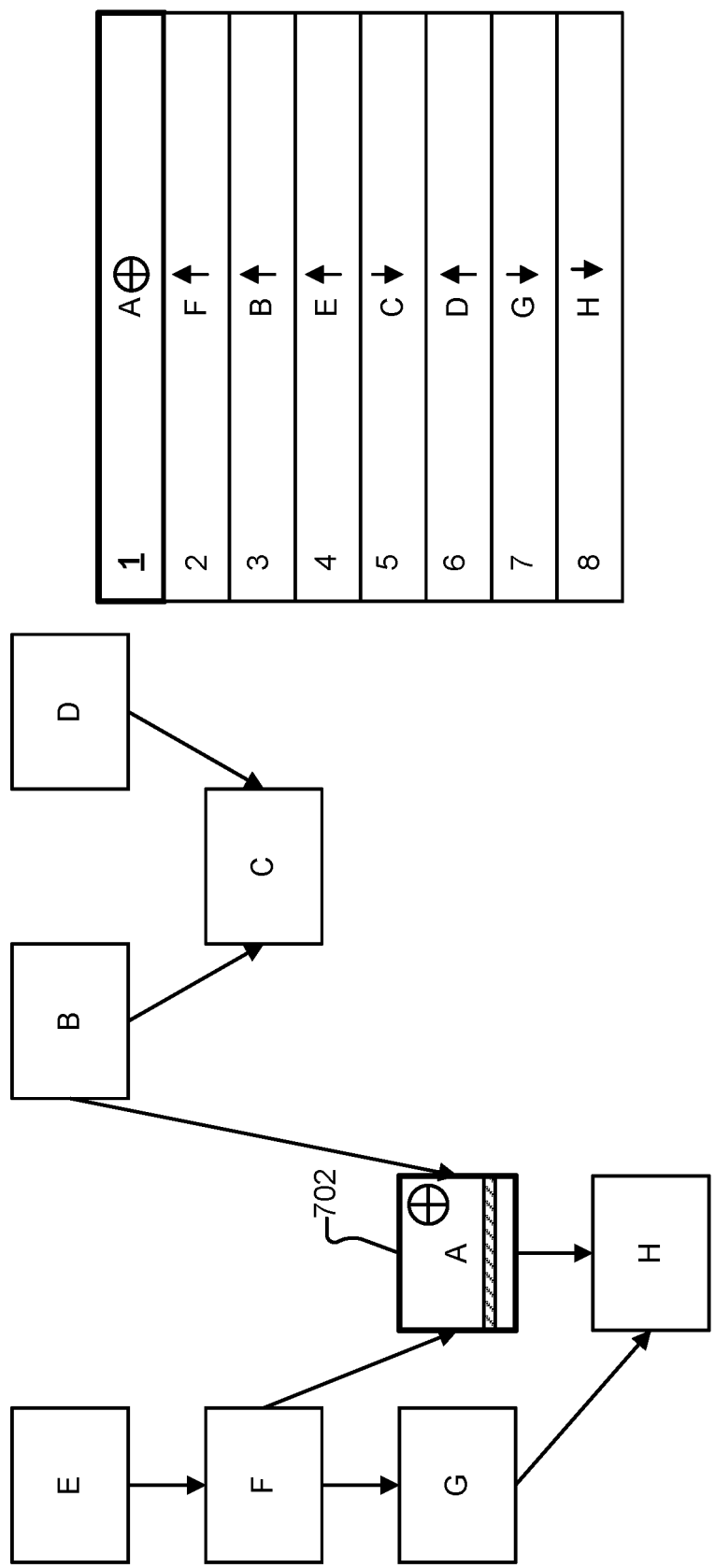
FIGS. 7A-7I illustrate an embodiment of collecting a subset of data.

The subsetting process begins at step 1, as shown in the example of FIG. 7A.

In this example, the target table, table A (indicated by the target symbol), is visited first. The subsetting algorithm determines what subset of the data in table A should be obtained.

In this example, because table A is the target table, the target condition (specified, for example, using a configuration user interface such as that shown in the example of FIG. 2) is used to generate a database query for the data (e.g., rows) in table A that meets the target condition. In some embodiments, the extracted rows are written to destination data store 110 (which will include the subset/slice of the source set of tables).

In this example, table A is marked as being visited (where visiting of a table is indicated by a "check" mark, as shown in the examples of FIGS. 7A-7I). In some embodiments, the values in primary keys of the subset of rows extracted from table A are recorded (e.g., to a local primary key cache). For example, the system maintains a list of all primary key values that have been extracted from tables during the subsetting process.

Figure 7B:
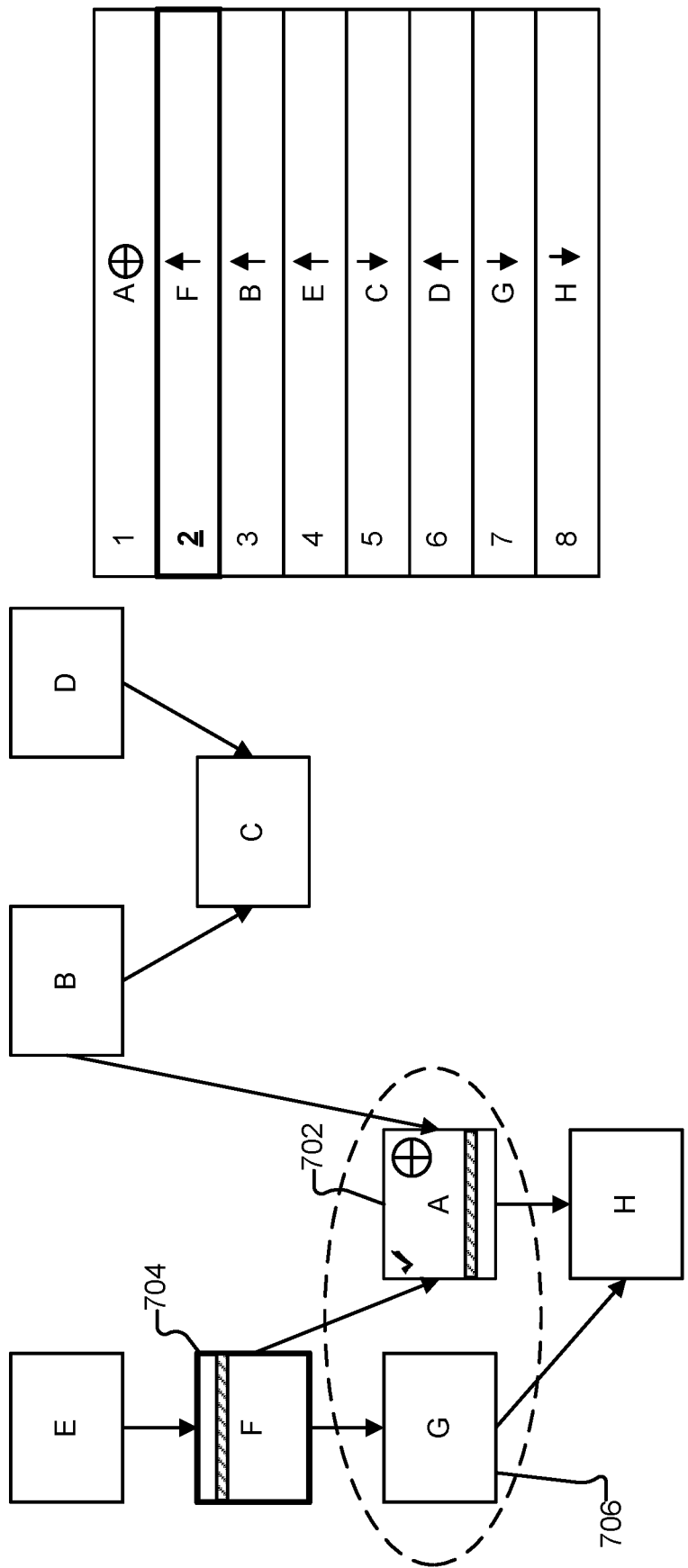

After the subset of table A has been obtained, the subsetting algorithm proceeds to step 2, as shown in the example of FIG. 7B. As shown in this example, at step 2, table F is visited. The subsetting algorithm determines what subset of the data in table F should be obtained.

In this example, the subsetting algorithm uses the indication of whether the table being processed was from the upstream priority queue or the downstream priority queue to determine what subset of the data in table F should be obtained.

In this example, at this step of the traversal plan, table F was pulled from the upstream queue. The subsetting algorithm then performs an upstream subsetting pass on table F, where the subsetting algorithm bases what data to extract from table F on the data that has been extracted from the neighboring tables that are directly downstream of table F.

In this example, table G (706) and table A (702) are both downstream neighbors of table F. At this point in the subset collection processing, only table A has been visited (and had a subset of data extracted). Here, table F is upstream of table A. This dependency relationship indicates that table F has a foreign key column that corresponds or refers to a parent/primary key column in table A. In this example, the system determines the primary key values in the subset of rows of table A that had been obtained (e.g., from the local cache of collected primary keys that are recorded). The primary key values in the subset of rows of table A are used to generate a database query to table F.

In this example, table F is queried for a subset of rows in table F that have foreign key values that match the values of the corresponding primary key values extracted from table A in step 1.

If table G had already been visited, the database query to table F would be generated based on the primary key values collected for both table G and table A (e.g., the cartesian product of the two sets of primary key values collected for tables G and A, similar to as described above in conjunction with FIG. 6B, which describes an embodiment of logic for an upstream subsetting pass). Although table G has not yet been visited, it will be visited later according to the traversal plan, and data will be extracted from it. As described above, database query optimization may be performed to address cardinality issues due to Cartesian products.

A subset of table F is obtained based on the database query. The subset of table F is added to the aggregate subset/logical slice stored to the destination data store 110. Any primary key column values in the subset of rows extracted from table F are recorded by the system.

Figure 7C:
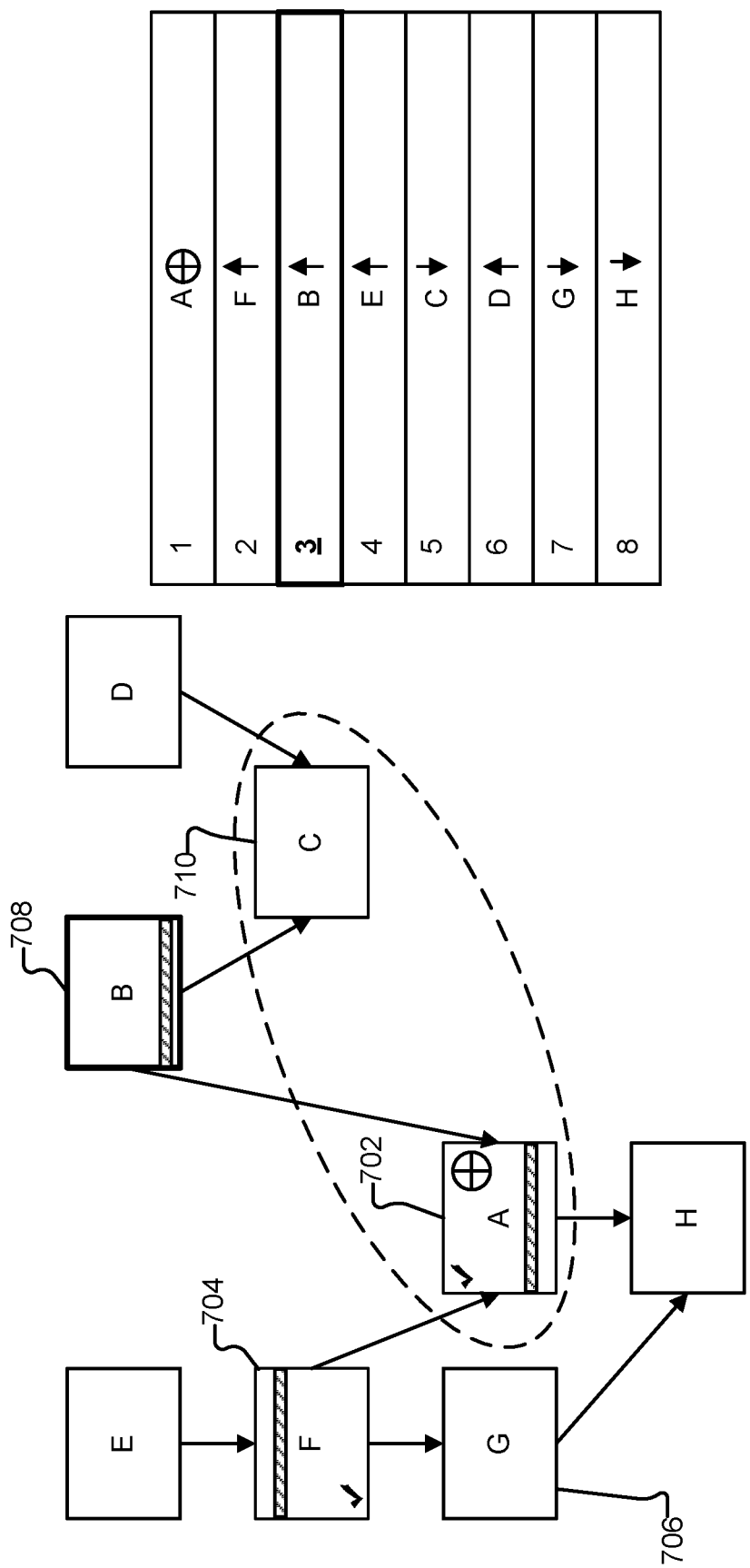

After the subset of table F has been obtained, the subsetting algorithm proceeds to step 3, as shown in the example of FIG. 7C. As shown in this example, at step 3, table B (708) is visited. The subsetting algorithm determines what subset of the data in table B should be obtained.

In this example, at this step, table B had been obtained from the upstream priority queue (indicated by the "up" arrow next to table B in the traversal plan). The subsetting algorithm then performs an upstream subsetting pass on table B. In this example, the subsetting algorithm bases what data to extract from table B on the data that has been extracted from the tables that are directly downstream of table B.

In this example, table C (710) and table A (702) are both downstream of table B. At this point in the processing, only table A has been visited (and had a subset of data extracted). Here, table B is upstream of table A. This dependency relationship indicates that table B has a foreign key column that corresponds to a parent/primary key column in table A. In this example, the system determines the primary key values in the subset of rows of table A that had been obtained so far. The primary key values in the subset of rows of table A are used to generate a database query to table B.

In this example, table B is queried for a subset of rows in table B that have foreign key column values that match the primary key values of a corresponding primary key column that have been extracted from table A in step 1.

A subset of table B is obtained based on the database query. The subset of table B is added to the aggregate subset/logical slice stored to the destination data store. Any primary key column values in the subset of rows extracted from table B are recorded by the system.

Figure 7D:
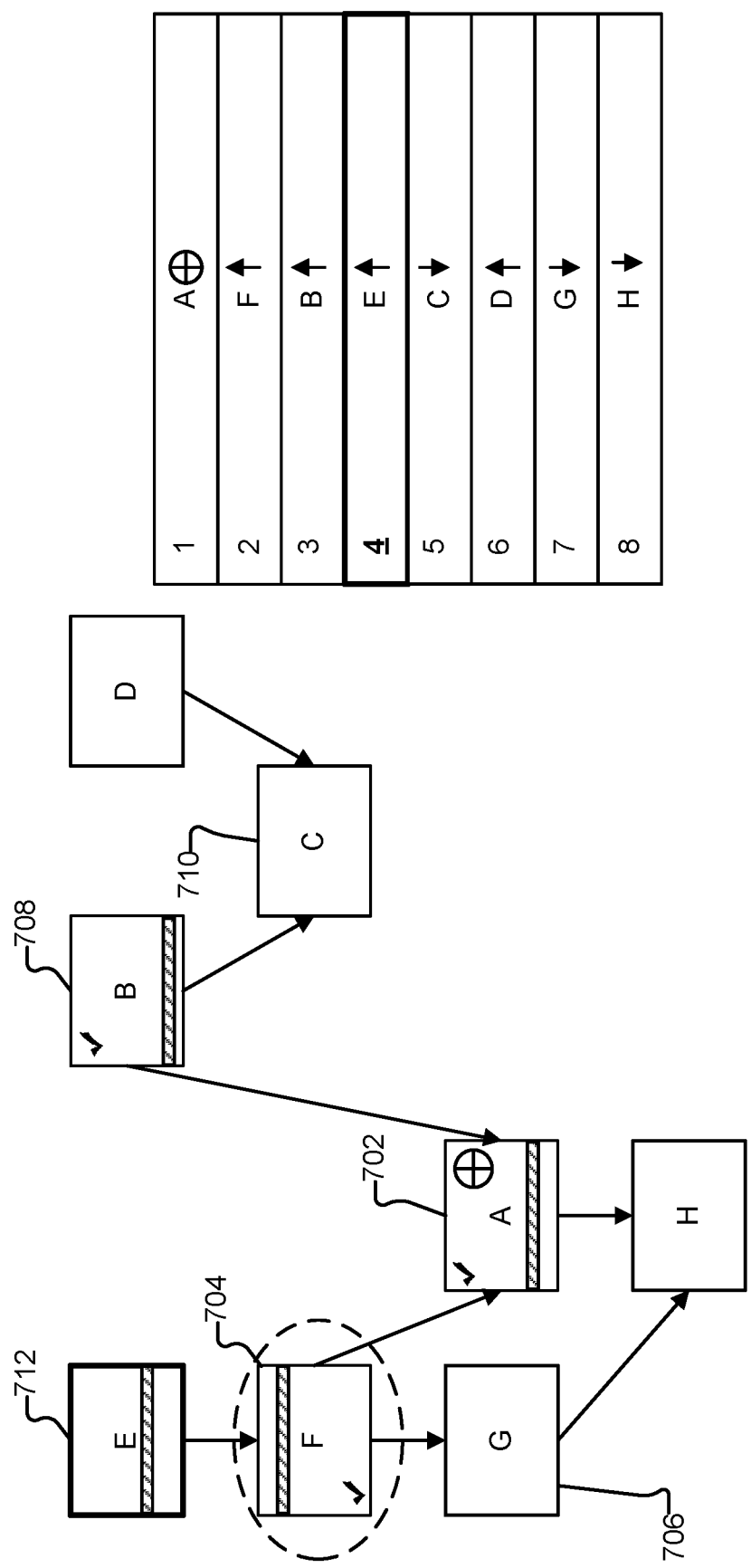

After the subset of table B has been obtained, the subsetting algorithm proceeds to step 4, as shown in the example of FIG. 7D. As shown in this example, at step 4, table E (712) is visited. The subsetting algorithm determines what subset of the data in table E (the table being visited) should be obtained.

In this example, at this step of the traversal plan generation process, table E had been pulled from the upstream priority queue for visitation. In this example, the subsetting algorithm then performs an upstream subsetting pass on table E. In this example, the subsetting algorithm bases what data to extract from table E on the data that has been extracted from the downstream neighbors of table E.

In this example, table F (704) is directly downstream of table E. Table F had previously been visited, where a subset of table F had been extracted (at step 2 of the traversal plan, as described in conjunction with the example of FIG. 7B). Here, table E is upstream of table F. This dependency relationship indicates that table E has a foreign key column that corresponds or refers to a parent/primary key column in table F. In this example, the system determines the values of the corresponding primary key column(s) in the subset of rows of table F that have already been obtained. Those extracted values from the corresponding primary key column(s) in the subset of rows of table F are used to generate a database query to table E.

In this example, table E is queried for a subset of rows in table E that have foreign key column values that match the primary key values in a corresponding primary key column that have been collected from table F in step 2.

A subset of table E is obtained based on the database query. The subset of table E is added to the aggregate subset/logical slice stored to the destination data store. Any primary key column values in the subset of rows extracted from table E are recorded by the system.

Figure 7E:
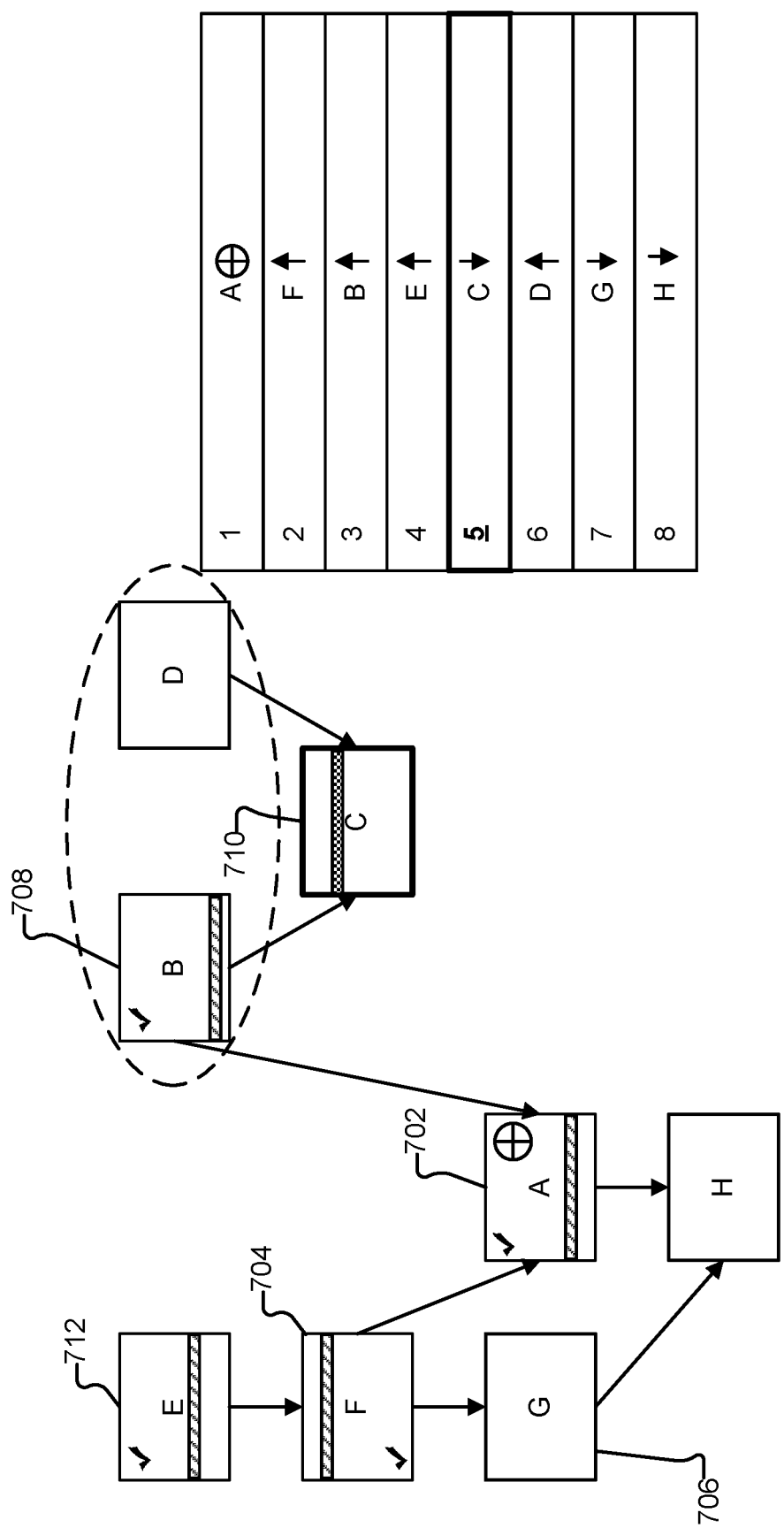

After the subset of table E has been obtained, the subsetting algorithm proceeds to step 5, as shown in the example of FIG. 7E.

As shown in this example, at step 5, table C (710) is visited. The subsetting algorithm determines what subset of the data in table C (the table being visited) should be obtained.

In this example, at this step of the traversal plan generation process, table C had been obtained from the downstream priority queue. In response to determining that table C was from a downstream priority queue, the subsetting algorithm performs a downstream subsetting pass on table C, and bases what data to extract from table C on the data that has been extracted from the tables that are direct upstream neighbors of table C.

In this example, table B and table D are both upstream neighbors of table C. At this point in the processing, only table B has been visited (and had a subset of data extracted). Here, table B is upstream of table C. This dependency relationship indicates that table B has a foreign key column that corresponds to a parent/primary key column in table C. In this example, a lookup of the destination data store is performed to determine what foreign key values have been collected for table B. For referential integrity, for each extracted row in table B that has a (non-null) value in its foreign key columns, a row exists in table C (primary/parent table in this example) that has a matching value in its corresponding parent key column. The values in the foreign key column of the rows that have been extracted from table B are used to generate a database query for the necessary (for referential integrity) rows from table C. An example of logic for a downstream subsetting pass is described above in conjunction with the example of FIG. 6A.

A subset of table C is obtained based on the database query. The subset of table C is added to the aggregate subset/logical slice stored to the destination data store. Any primary key column values in the subset of rows extracted from table C are recorded by the system.

Figure 7F:
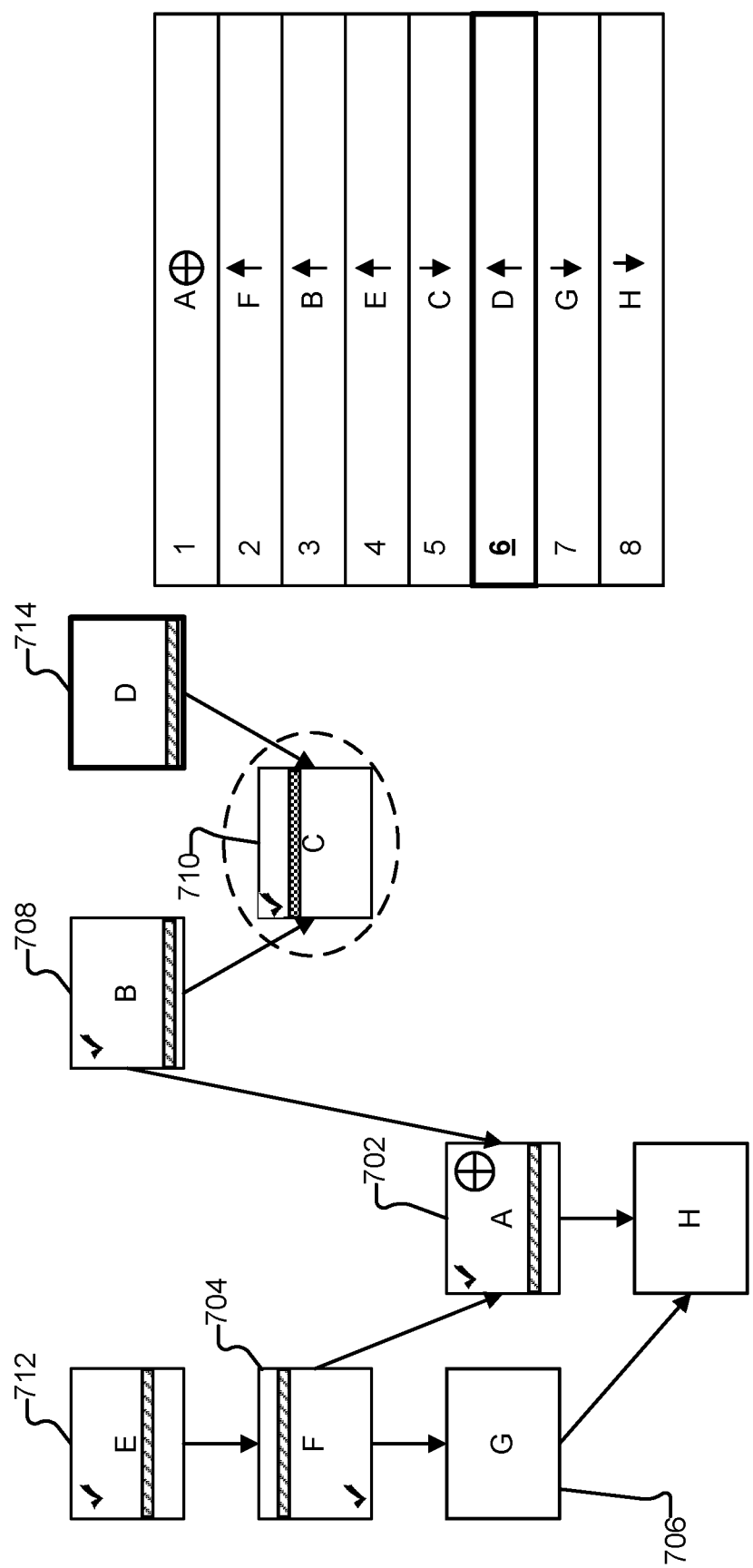

After the subset of table C has been obtained, the subsetting algorithm proceeds to step 6, as shown in the example of FIG. 7F. As shown in this example, at step 6, table D (714) is visited. The subsetting algorithm determines what subset of the data in table D (the table being visited) should be obtained.

In this example, at this stage of the traversal plan generation process, table D had been obtained from the upstream priority queue. Based on this, the subsetting algorithm performs an upstream subsetting pass on table D, and bases what data to extract from table D on the data that has been extracted from the tables that are direct downstream neighbors of table D.

In this example, table C is directly downstream of table D. Table C had previously been visited, where a subset of table C had been extracted in step 5. Here, table D is upstream of table C. This dependency relationship indicates that table D has a foreign key column that corresponds to a parent/primary key column in table C. In this example, the system determines the values of the corresponding primary key column(s) in the subset of rows of table C that had been obtained (e.g., from the cache of recorded primary key values). Those extracted values from the corresponding primary key column(s) in the subset of rows of table C are used to generate a database query to table D.

Similar to as described in conjunction with FIG. 6B regarding upstream pass subsetting logic, in this example, table D is queried for a subset of rows in table D that have foreign key column values that match the values of the corresponding primary key column extracted from table C in step 5 (described on conjunction with the example of FIG. 7E).

A subset of table D is obtained based on the database query. The subset of table D is added to the aggregate subset/logical slice stored to the destination data store. Any primary key column values in the subset of rows collected from table D are recorded by the system.

Figure 7G:
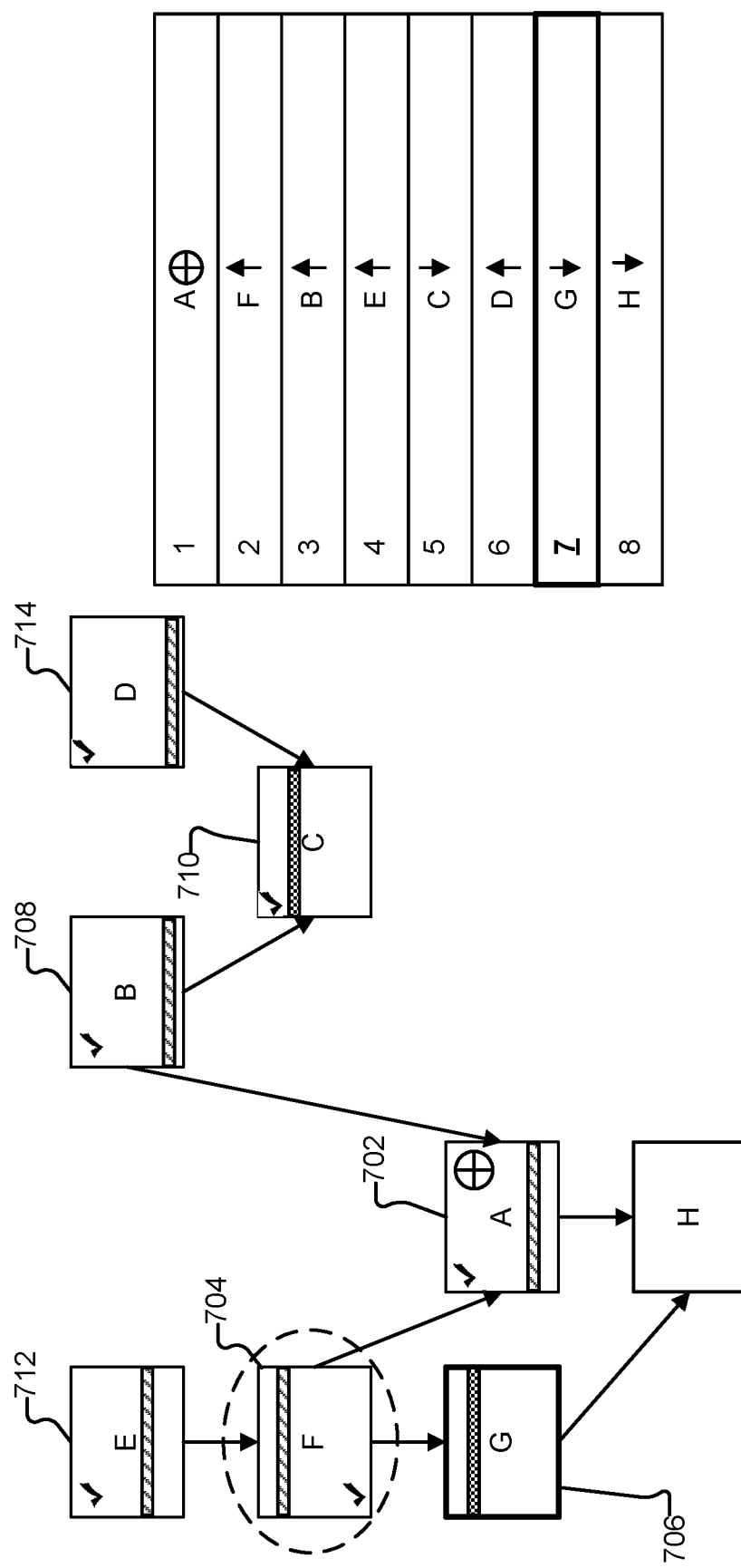

After the subset of table D has been obtained, the subsetting algorithm proceeds to step 7, as shown in the example of FIG. 7G.

As shown in this example, at step 7, table G (706) is visited. The subsetting algorithm determines what subset of the data in table G (the table being visited) should be obtained.

In this example, at this stage of the traversal plan generation process, table G had been obtained from the downstream priority queue. Based on this information, the subsetting algorithm applies a downstream subsetting pass on table G, where the subsetting algorithm bases what data to collect from table G on the data that has been extracted from the tables that are direct upstream neighbors of table G.

In this example, table F is upstream of table G. Table F has been visited (and had a subset of data extracted). Here, table F is upstream of table G. This dependency relationship indicates that table F has a foreign key column that corresponds to a parent/primary key column in table G. In this example, the system determines the values in the corresponding foreign key column in the extracted rows of table F. For referential integrity, for each extracted row in table F that has a (non-null) value in its foreign key columns, a row exists in table G (primary/parent table in this example) that has a matching value in its corresponding parent key column. The values in the foreign key column of the rows extracted from table F are used to generate a database query for the necessary (for referential integrity) rows from table G that have the corresponding parent key values.

A subset of table G is obtained based on the database query. An example of such downstream subsetting pass logic is described in conjunction with the example of FIG. 6A. The subset of table G is added to the aggregate subset/logical slice stored to the destination data store. Primary key column values in the subset of rows extracted from table G are recorded by the system.

Figure 7H:
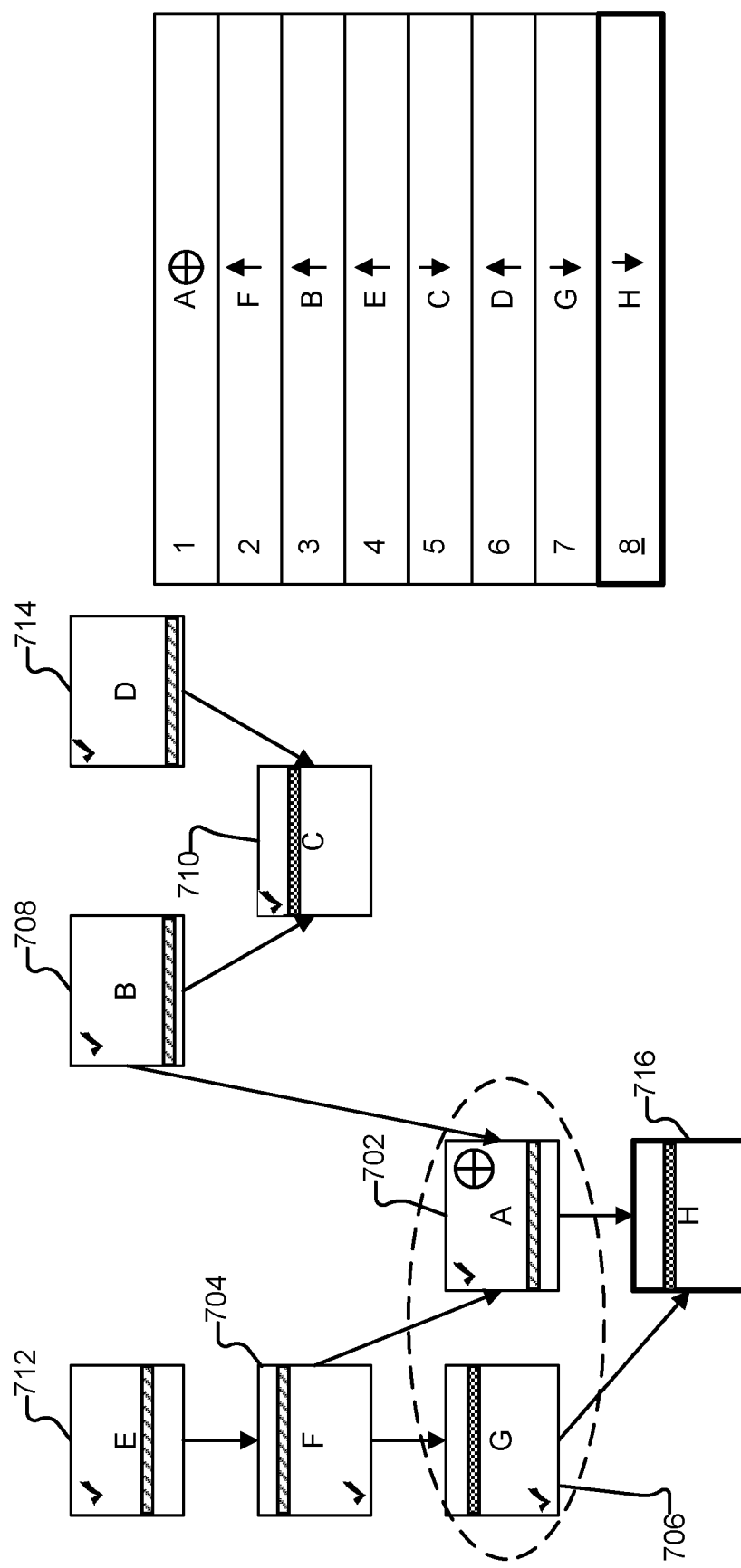

After the subset of table G has been obtained, the subsetting algorithm proceeds to step 8, as shown in the example of FIG. 7H.

As shown in this example, at step 8, table H (716) is visited. The subsetting algorithm determines what subset of the data in table H (the table being visited) should be obtained.

In this example, at this stage of the traversal plan generation process, table H had been obtained from the downstream priority queue. Based on this information, the subsetting algorithm performs a downstream subsetting pass on table H, where the subsetting algorithm bases what data to extract from table H on the data that has been previously collected from the tables that are direct upstream neighbors of table H.

In this example, table G and table A are both upstream of table H. At this point in the processing, both table G and table A have been visited (and had respective subsets of data extracted). Here, table G has a dependency relationship with table H that indicates that table G has a foreign key column that corresponds to a parent/primary key column in table H. Table A also has a dependency relationship with table H that indicates that table A has a foreign key column that corresponds to a parent/primary key column in table H.

In this example, the system determines the previously collected values in the foreign key columns in the extracted rows of tables G and A (e.g., by performing a lookup of the output destination data store) that refer to corresponding primary keys in table H. For referential integrity, for each of the rows extracted from table G and table A that have a (non-null) value in its foreign key columns, a row exists in table H (primary/parent table in this example) that has a matching value in its corresponding parent key column(s). The values in the foreign key columns of the rows extracted from tables G and A are used to generate a database query for the necessary (for referential integrity) rows from table H. For example, downstream subsetting pass processing similar to that described in conjunction with the example of FIG. 6A is performed.

A subset of table H is obtained based on the database query. The returned subset of table H is added to the aggregate subset/logical slice stored to the destination data store. Any primary key column values in the subset of rows extracted from table H are recorded by the system.

Figure 7I:
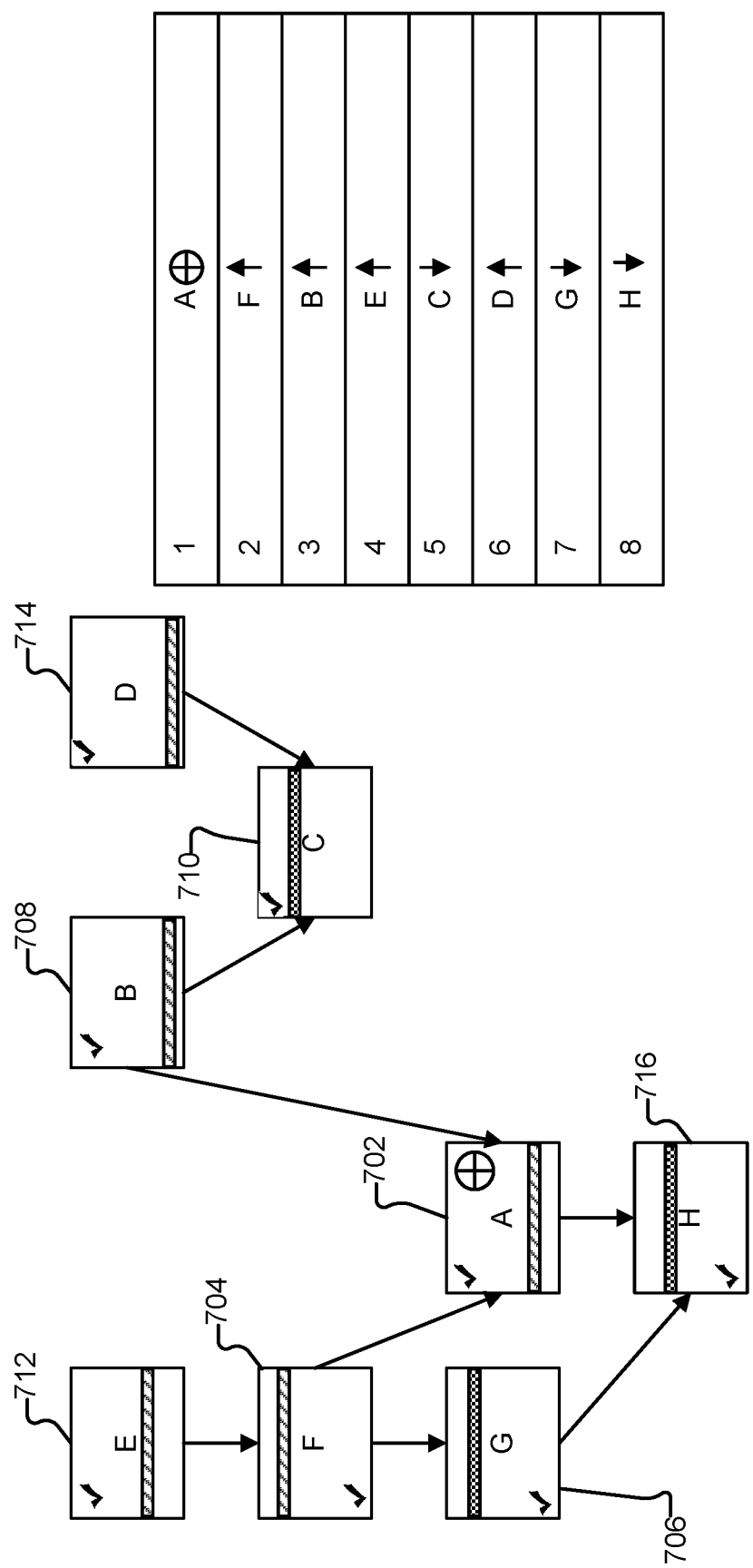

After the subset of table H has been obtained, the subsetting algorithm ends. As shown in the example of FIG. 7I, all tables have been visited, and there are no further tables to visit according to the traversal plan generated as described above. The logical slice/subset of the source set of tables has been extracted and outputted to a destination data store.

As shown in the example above, what to collect from a table is dependent on what had already been collected from a neighboring table. That is, what has been collected so far in the data collection/subsetting process is used to determine what to collect from the table being visited. If nothing has been collected from a neighboring table, then a determination cannot be made as to what data should be collected from the table being visited (either for referential integrity or as auxiliary data for usefulness).

With respect to upstream data collection (collection of data during an upstream pass), the data to be collected from a table being visited in an upstream pass is dependent on the tables that are downstream of the table being visited. The sorting described above makes it so that a table that is in a higher tier is placed toward the end of the upstream queue so that it is visited later during data collection, allowing tables that are downstream of it to be collected from first (as they will be visited earlier).

For example, as shown in FIG. 7D, based on the sorting, E will be visited after F according to the generated traversal plan. In this way, table F will already have had data collected from it before table E is visited, which facilitates the determination of what to collect from table E. If table E had been visited prior to F, then no data could have been collected from table E at that stage, as there would be no primary key values collected from table F on which to base the decision on what to obtain from table E.

Similarly, with respect to downstream data collection (collection of data during a downstream pass), the data to be collected from a table being visited in a downstream pass (and that had been extracted from the downstream queue) is dependent on the tables that are upstream of the table being visited. The sorting described above makes it so that a table that is in a higher tier is placed toward the front of the downstream queue so that data is collected from it earlier. In this way, when an intermediate table is visited during a downstream pass, it is more likely that data has already been collected for tables that are upstream of it.

For example, as shown in FIG. 7H, based on the sorting, table H is visited after table G. In this way, data will have already been collected from table G (which is upstream of table H) in an earlier downstream pass before visiting table H and applying a downstream pass on table H. If table H had been visited prior to G, then there would be no foreign key values collected from table G that could have been used in the determination of what to collect from table H (where what to collect from table H would be based solely on what had been extracted from table A).

In this way, based on the sorting and the priority queues (where the position within a priority queue that a table is placed is based on the sorting), by the time that a table is being visited, as much data as possible has been collected from neighboring tables.

In some embodiments, as database queries are generated and then executed against the visited tables, the rows imported from the source tables are written to the output/destination data store (e.g., destination data store 110).

Subsetting in the Presence of Masking

As described above, when collecting data from tables, the system performs a database query for rows of a table, and then writes a subset of those tables to an output logical slice that is stored in the destination data store.

In some embodiments, in addition to determining a subset of a source set of tables, the system is also configured to perform masking or obfuscation of data. For example, the system may be configured to mask customer_id values (e.g., with synthetic or fake values), where the masked value is then stored to the destination data store.

As described above, when visiting a table during a downstream pass, the foreign key values of tables that are upstream neighbors of the table being visited are determined. In some embodiments, the foreign key values are obtained from the output subset in the destination data store, and then used to generate a query for rows of the table being visited.

In some embodiments, if the values obtained from the destination data store are masked values, the system unmasks them prior to using them to generate the database query on the table being visited (otherwise the query would not return the appropriate rows if the query were generated on the masked values rather than their original values as in the source set of tables). This is because the values between the source and destination data stores are no longer aligned due to the masking.

In some embodiments, the type of masking transformations that are allowed are limited to reversible transformations. In some embodiments, format-preserving encryption is used. As one example implementation, a Feistel network/cipher and cycle walking are used. Thus, in some embodiments, when performing downstream subsetting, where a database query is generated based on foreign key values that may have been masked when written to the destination data store, the value is first unmasked/reversed before being used in the database query against the source table. If primary key values used in upstream subsetting passes are obtained from the destination data store instead of from a cache of recorded primary keys, they are also unmasked (if they had been masked when written to the destination data store).

Figure 8:
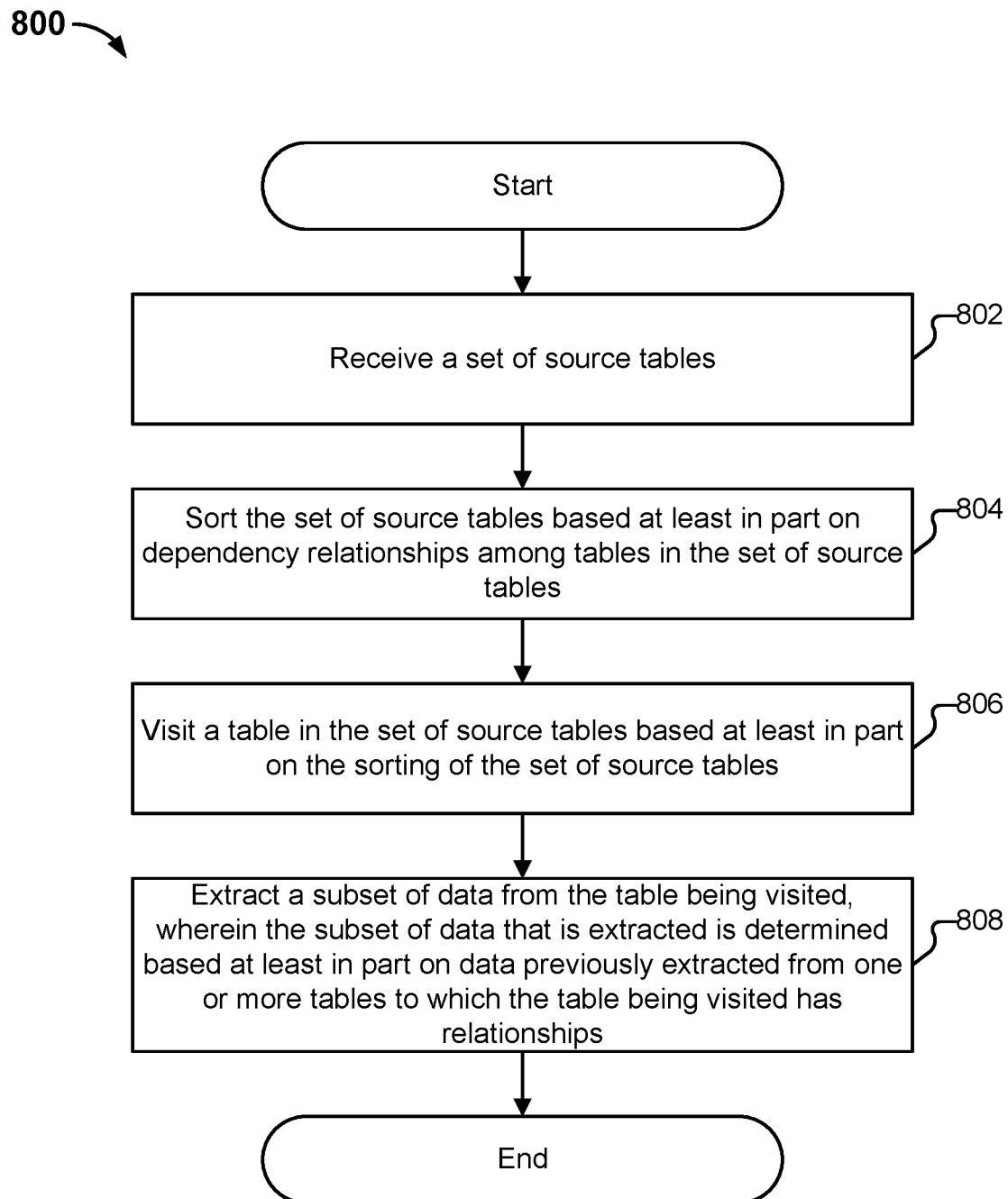
FIG. 8 is a flow diagram illustrating an embodiment of a process for performing database subsetting.

FIG. 8 is a flow diagram illustrating an embodiment of a process for performing database subsetting. Embodiments of subsetting are described above. In some embodiments, process 800 is executed by system 100. The process begins at 802, when a set of source tables is received. For example, the set of source tables for which a subset is to be extracted may be included in a source data store such as source data store 108. The set of source tables may be indicated via a user interface, for example, as a source data set for which a subset is to be generated. The set of source tables may belong to a single database, or be from multiple databases. For example, the data set for which a subset is to be generated may include tables in multiple databases. Further details regarding multi-database subsetting are described below.

At 804, the set of source tables is sorted based at least in part on dependency relationships among tables in the set of source tables. For example, a topological sort is performed, as described above. In some embodiments, the dependency relationships include foreign key relationships. In some embodiments, the foreign key relationships for the set of source tables are enumerated to determine the dependency relationships among or between the tables in the source set of tables. This includes querying the databases to which the source tables belong for foreign key relationships defined in those databases (e.g., foreign key relationships that have been explicitly constrained in the source databases and that are set at the database level). The foreign key relationships may also include virtual foreign key relationships that were not defined in the databases, but are added foreign key relationships (and known to the platform). The virtual foreign key relationships that have been added or defined or set outside/externally of the source databases are also enumerated or otherwise identified and obtained (e.g., by accessing a list or set of virtual foreign keys that had been added in the platform). Further details regarding virtual foreign keys are described below.

At 806, a table in the set of source tables is visited based at least in part on the sorting of the set of source tables. In some embodiments, what table to visit is determined according to a subsetting traversal plan. In some embodiments, the traversal plan is generated using process 900 of FIG. 9.

At 808, a subset of data (e.g., a subset of rows) is extracted from the table being visited. In some embodiments, the subset of data that is extracted is determined based at least in part on data previously extracted from one or more tables to which the table being visited has dependency relationships. In some embodiments, the data collection performed at 808 is implemented using process 1000 of FIG. 10.

Figure 9A:
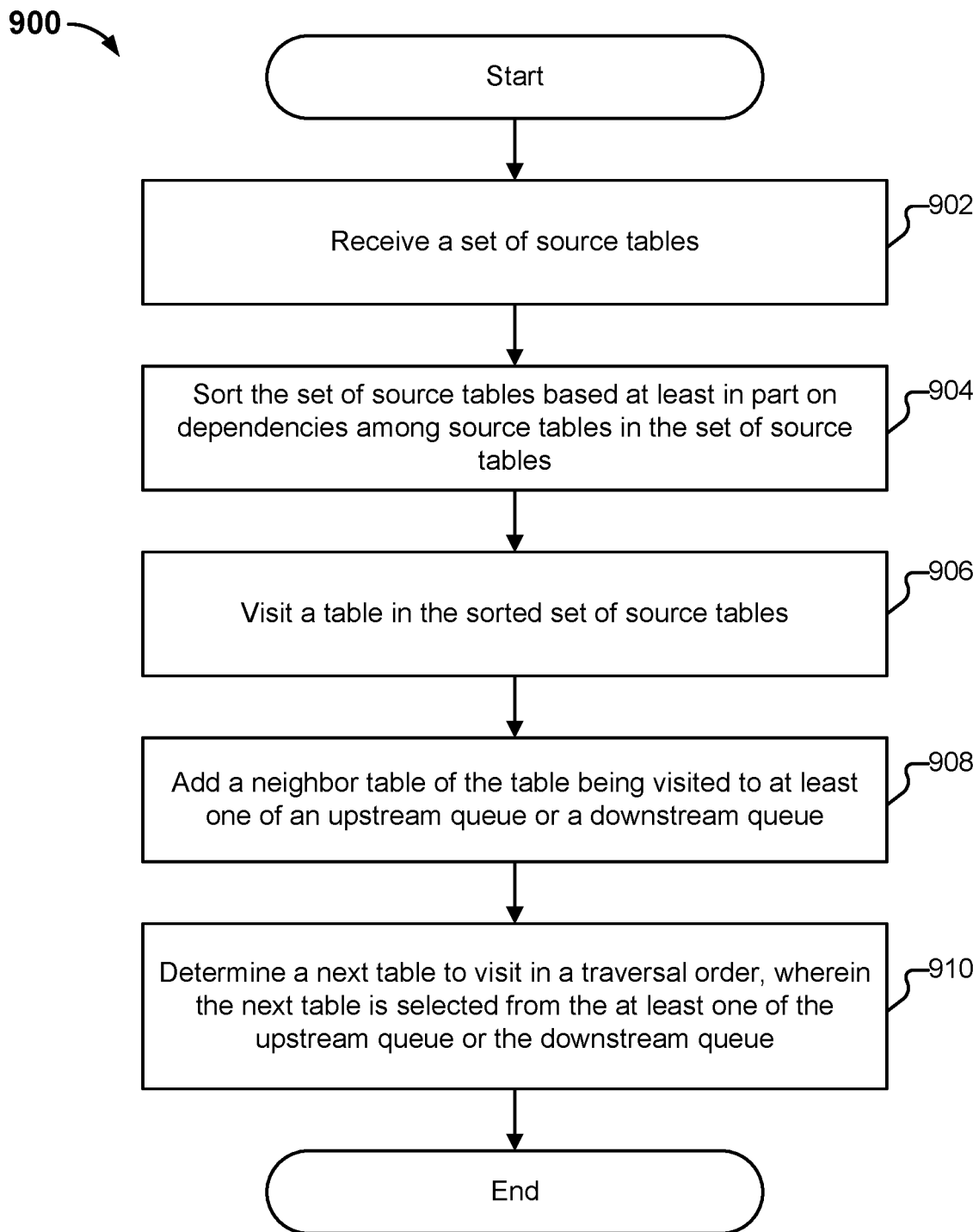
FIG. 9A is a flow diagram illustrating an embodiment of a process for generating a subsetting traversal plan.

FIG. 9A is a flow diagram illustrating an embodiment of a process for generating a subsetting traversal plan. An example of such a traversal plan is shown in the examples of FIG. 5J. Embodiments of generating a subsetting traversal plan are described above. An example of generating a subsetting traversal plan is described in conjunction with FIGS. 5A-5I. In some embodiments, process 900 is executed by system 100. In some embodiments, process 900 of FIG. 9A is used to determine what table to visit in step 806 of FIG. 8. The process begins at 902, when a set of source tables is received. For example, the processing at step 802 of FIG. 8 is performed. At 904, the set of source tables is sorted based at least in part on dependencies among source tables in the set of source tables. For example, the processing at step 804 of FIG. 8 is performed.

At 906, a table in the sorted set of source tables is visited. In some embodiments, the first or starting table that is visited is a target table (specified, for example, via the user interface shown in the example of FIG. 2).

At 908, a neighboring table of the table being visited at 906 is added to at least one of an upstream queue or a downstream queue.

At 910, a next table to visit in a traversal order is determined. In some embodiments, the next table is selected from the at least one of the upstream queue or the downstream queue.

Figure 9B:
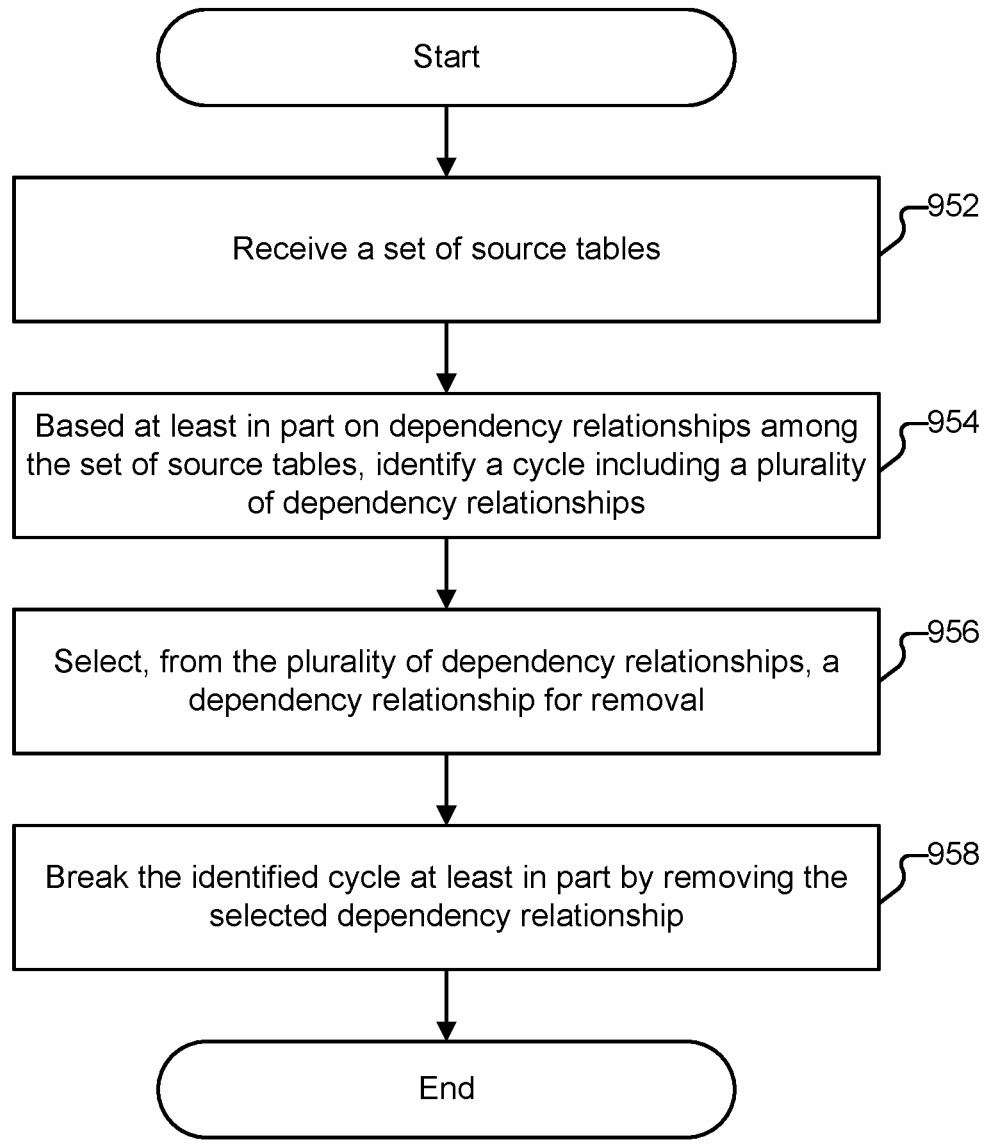
FIG. 9B is a flow diagram illustrating an embodiment of a process for identifying and breaking cycles.

FIG. 9B is a flow diagram illustrating an embodiment of a process for identifying and breaking cycles. Further details regarding cycle identification and breaking are described above. In some embodiments, process 950 is executed by platform 100. In some embodiments, process 950 is performed as part of performing the sorting at steps 804 of FIG. 8 and 904 of FIG. 9. The process begins at 952, when a set of source tables is received.

At 954, based at least in part on dependency relationships among the set of source tables, a cycle including a plurality of dependency relationships is identified. For example, a topological sort is performed, where the topological sort throws an exception when a cycle is reached. The exception that is thrown is detected.

At 956, a dependency relationship is selected from the plurality of dependency relationships for removal. For example, in response to detecting the exception indicating that the cycle has been identified, the list of edges that is in the cycle is obtained. The list of edges corresponds to dependency relationships (e.g., foreign key relationships) between the tables in the identified cycle. Each dependency relationship in the identified cycle is evaluated as a candidate for removal to break the identified cycle. The following is an example of evaluating a given dependency relationship.

In some embodiments, evaluating a dependency relationship for removal includes removing the dependency relationship from the cycle. The sorting is then run again or continued. If another cycle is identified, the size of the next cycle is determined.

In some embodiments, the dependency relationship that is selected for removal is the one that results in the smallest-sized next cycle (e.g., least number of edges or nodes/tables in the cycle).

It may be the case that upon removal of the candidate dependency relationship, the sorting completes with no further cycles being determined. This may be treated by the process as the next subsequent cycle being of size zero (zero tables in the cycle).

If, for multiple candidate dependency relationships, their removal results in a subsequent cycle of the same size (which may include a size-zero cycle state being reached, where no subsequent cycle was detected), then, in some embodiments, one of these dependency relationships is selected randomly for removal.

At 958, the selected dependency relationship is removed. This breaks the identified cycle. The sorting is then performed again or continued. If another cycle is identified, then the process returns to 956 to process the subsequently identified cycle. In various embodiments, the process ends when a zero-cycle state is reached (e.g., the sorting process completes without identifying any more cycles). Upon completion of the sorting, the sorted set of source tables may be used for further processing, such as determination of a subsetting traversal path. The process may also end when a threshold number of cycles have been attempted to be broken, but the sorting process could not complete (could not reach a zero-cycle state). In some embodiments, the subsetting process is aborted in this case.

Figure 10:
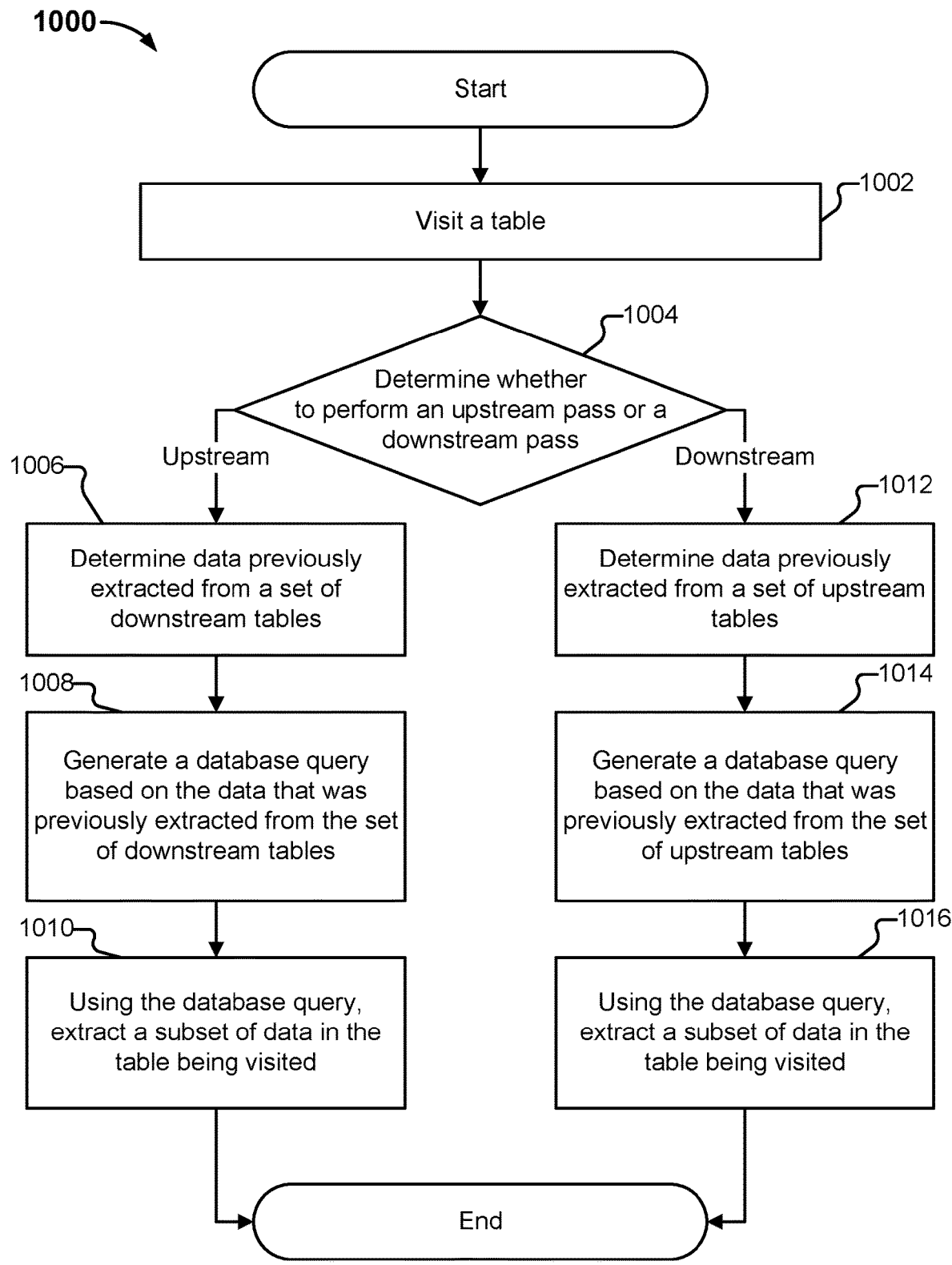
FIG. 10 is a flow diagram illustrating an embodiment of a process for collecting a subset of data.

FIG. 10 is a flow diagram illustrating an embodiment of a process for collecting a subset of data. Embodiments of data collection are described above. Examples of data collection logic are described in conjunction with FIGS. 6A-6B and FIGS. 7A-7I. In some embodiments, process 1000 is executed by system 100. In some embodiments, process 1000 is used to implement step 808 of process 800 of FIG. 8. The process begins at 1002, when a table is visited. For example, a table is visited as part of the subset collection process, which may include executing a subsetting traversal plan, as described above.

At 1004, it is determined whether to perform an upstream subsetting pass or a downstream subsetting pass on the table being visited. In some embodiments, the determination of whether to perform an upstream or downstream pass is dependent on which priority queue (upstream or downstream priority queue) the table had been obtained from at a corresponding stage of the traversal plan (which may be generated using process 900 of FIG. 9).

If it is determined that an upstream pass should be performed on the table being visited, then the process continues to 1006, where an upstream pass is performed. If it is determined that a downstream pass should be performed on the table being visited, then the process continues to 1012, where a downstream pass is performed.

At 1006, during the upstream pass, data previously extracted from a set of downstream tables is determined. This includes determining primary key values that had been previously collected from neighboring downstream tables, where those primary keys are referred to by foreign keys in the table being visited.

At 1008, a database query is generated based on the data that was previously collected from the neighboring downstream tables. For example, the rows of the table being visited that are selected are those that have foreign key values that match/refer to the primary key values that were previously collected from the neighboring downstream tables.

At 1010, using the database query, a subset of data in the table being visited is extracted. In some embodiments, the subset of data is imported from a source data store and written to a destination data store.

As described above, if, at 1004, it is determined that a downstream subsetting pass is to be performed on the table being visited, the process continues to 1012, where, during a downstream pass, data previously extracted from a set of upstream tables is determined. This includes determining foreign key values that had been previously collected from neighboring upstream tables, where the foreign key values are foreign keys that refer to primary keys in the table being visited.

At 1014, a database query is generated based on the data that was previously collected from the neighboring upstream tables. For example, the foreign key values of the neighboring upstream tables are used to determine what rows to obtain from the table being visited. If multiple foreign key columns are involved, the database query (or set of database queries) may be based on a Cartesian product of the previously collected foreign key values.

At 1016, a subset of data in the table being visited is collected using the database query generated at 1014. For example, the rows of the table being visited that are selected are those that have primary key values matching to the corresponding foreign key values of the neighboring upstream tables. In this way, data required for referential integrity is obtained. In some embodiments, the subset of data is imported from a source data store and written to a destination data store.

Reference Tables

In some embodiments, what are referred to herein as "reference tables" may be specified. As one example, reference tables include special types of direct targets that may be specified for which a 100% subset is obtained (e.g., all rows of the table are to be collected and included in the output subset). For example, a user may specify that a certain table should be designated as a reference table, which is recorded by the platform. In some embodiments, the designation of a table as a reference table impacts the determination of the subsetting traversal plan. For example, if a reference table is visited during the path determination phase of the subsetting process, based on the designation of the table being visited being a reference table, upstream neighbors of the reference table are not added to the upstream priority queue. This prevents upstream traversal above the reference table.

In some embodiments, the execution phase of the subsetting process is also adapted to accommodate reference tables. For example, suppose that an upstream data collection pass is being performed on a table being visited during the execution phase. What data to collect from the table being visited is based on the downstream neighbors of the table being visited. For example, the data collection query that will be issued to the table being visited is constructed based on primary keys that have been collected so far from the downstream neighboring tables. In some embodiments, if one of the downstream neighbors is determined to be a reference table (where, in some embodiments, the platform maintains a record of whether a table is designated as a reference table), primary keys collected for that reference table (which would be all of the primary keys if the reference table had been visited) are ignored, or otherwise not used when generating the data collection query on the table being visited. In this way, the determination of what to collect from the table being visited will not be based on all rows in the reference table having been obtained.

One example of a reference table is a table containing the 50 states of the United states—an end user performing subsetting typically would like all 50 states to show up in this table in the subset (not just the states referenced by other tables), but does not want this to affect the seed of the subset. For example, if the customers table has a foreign key that references a primary key in the states table (where the customers table is upstream of the states table in this example), and limiting of upstream traversal was not performed as described above, this would result in the system collecting every customer that had a non-NULL state (even though only a subset of the customers was desired).

Specification of Multiple Target Tables

In some embodiments, multiple target tables may be specified. Specification of multiple targets allows subsets to have multiple tables that define the core or seed of the database. For example, in a health care database scenario, both patients and doctors may be specified as targets. Allowing users to have multiple targets in their database provides for complex subsets. Having multiple targets also allows for expressive conditions over what kind of data is pulled into a subset.

As one example, suppose that the end user specifies two target tables, a retail sales table, and a customers table. The end user also specifies target conditions on the two target tables, for example, 10% of customers, and retail sales that happened on Christmas (e.g., retail sales.date=Christmas). In some embodiments, this results in the system creating two starting tables, one that has all sales on Christmas, and one that has 10% of customers. During the subsetting process, more customers may be imported to maintain integrity with the sales that happened on Christmas (which will likely include customers that were not part of the original 10% according to the target condition percentage on the customers table).

The following is an example of determining a subsetting traversal plan in the presence of multiple target tables. In this example, suppose that there are two target tables, table A and table B. In this case, the traversal order determination process begins by visiting both target tables. The traversal order determination then identifies the upstream neighbors and downstream neighbors of both table A and table B.

The upstream neighbors of table A and the upstream neighbors of table B are then placed in the upstream priority queue as described above, where their relative placement in the upstream priority queue is determined as described above (e.g., based on the number of ancestors a table has and the tier into which it has been sorted).

Similarly, the downstream neighbors of table A and the downstream neighbors of table B are placed in the downstream priority queue as described above, where their relative placement in the downstream priority queue is determined as described above (e.g., based on the number of ancestors a table has and the tier into which it has been sorted).

The traversal path determination processing then continues as described above, for example by selecting a next table to visit from the front of the upstream priority queue. During the execution phase, the queries for the subset to collect from table A and table B are based on their respective specified target conditions.

Sharding

In some embodiments, a portion of the source dataset for which a subset is to be generated may be sharded or distributed across multiple databases. For example, for a users data set, one shard on one database may include users whose first names start from A-C, while a second shard on a second database may include those users whose first names start from D-F, and so on. The following are embodiments of subsetting in the presence of sharding. In some embodiments, during the subsetting execution phase (where a determined traversal order is being executed and data collection queries are being issued/executed), the platform broadcasts a data collection query to all shards for the requested subset of data to be collected. If the shard has rows that match the filter criteria of the query, then it returns those rows. If the shard does not have any rows that match the filter criteria of the query, then they do not return any rows. The platform then aggregates the rows returned by the various shards, and writes them to the subset in the destination data store. The outputted data may be placed in corresponding shards in the destination data store. In other embodiments, the aggregated data is placed into a single location (rather than being sharded as in the source data store).

Multi-Database Subsetting

In some embodiments, the system provides the ability to query multiple source databases or data stores that may have objects that are related to each other, and combine them at the same time as subsetting. In this way, a single subset may be created from a set of source tables across multiple data stores, where dependencies across databases are preserved. This is referred to herein as multi-database subsetting.

As described above, in various embodiments, a subset is generated by following dependencies among, between, or within tables. For example, the subsetting is configured to begin from a target table as a starting point, and then proceed from there, expanding into different parts of a source database by following foreign keys. In a scenario where multiple databases are involved though, there are no foreign keys that exist across the source databases.

In some embodiments, multi-database subsetting (subsetting where a source data set includes tables distributed across multiple databases) is supported or facilitated by establishing of virtual dependencies that are referred to herein as virtual foreign keys. In some embodiments, the system provides end users the ability to create virtual foreign key relationships between tables. Further details regarding establishing virtual foreign key relationships are described below.

In some embodiments, specifying virtual foreign key relationships includes setting implied relationships between different kinds of related data. This includes establishing interconnections between tables that were not previously defined in a database. For example, the platform allows users to create virtual foreign key relationships that exist between tables, where the platform treats virtual foreign keys in the same manner as innate, existing foreign keys that had been defined in the source database. With respect to subsetting, the subsetting techniques described herein also treat virtual foreign keys in the same manner as existing foreign keys that were already defined in a set of source databases. By providing the capability to add virtual foreign keys, the platform is able to handle data relationships that were not explicitly defined in the database at the database level, but are beneficial for application logic.

If a source data set includes tables across multiple databases, virtual foreign keys may also be established between tables that are in different databases. This allows subsetting to be performed across multiple databases. For example, where the set of source tables are across multiple databases, the virtual foreign key relationships specified across multiple databases are followed by the subsetting processing described above in the same manner as if they were innate, existing foreign keys that had been defined in the source databases themselves. In this way, by providing the ability to set implied relationships (virtual foreign keys) between different kinds of related data (between tables in different databases), relevant data is ensured to be included in the subset. The adding of additional data relationships (virtual foreign keys) may be used to tune the output subset.

Virtual Foreign Keys

The following are further details regarding virtual foreign keys.

FIGS. 11A and 11B illustrate embodiments of user interfaces for configuring foreign key relationships. In the example user interface of FIG. 11A, a user may view all foreign keys, which may include existing foreign key relationships in an input data set (e.g., input source database(s)), as well as any added virtual foreign keys. In the example user interface of FIG. 11B, a user may add virtual foreign keys that were not defined in the source database. In the example of FIG. 11A, those foreign keys that have a lock next to them are actual foreign keys that already exist in a source database or set of source databases. While examples involving setting virtual foreign keys within a single source database are described herein for illustrative purposes, virtual foreign keys may be set in multi-database contexts. For example, users may create virtual foreign key relationships between tables that are across multiple databases (where typically, foreign keys do not exist across databases).

The following is an example of an existing foreign key in a source database. FIG. 12A illustrates an embodiment of a portion of a table. In this example, a portion of a products table is shown. As shown in this example, the products table has a products key column. Each product key is unique to a row. Each product will have a completely unique product key to identify the product.

Figure 12B:
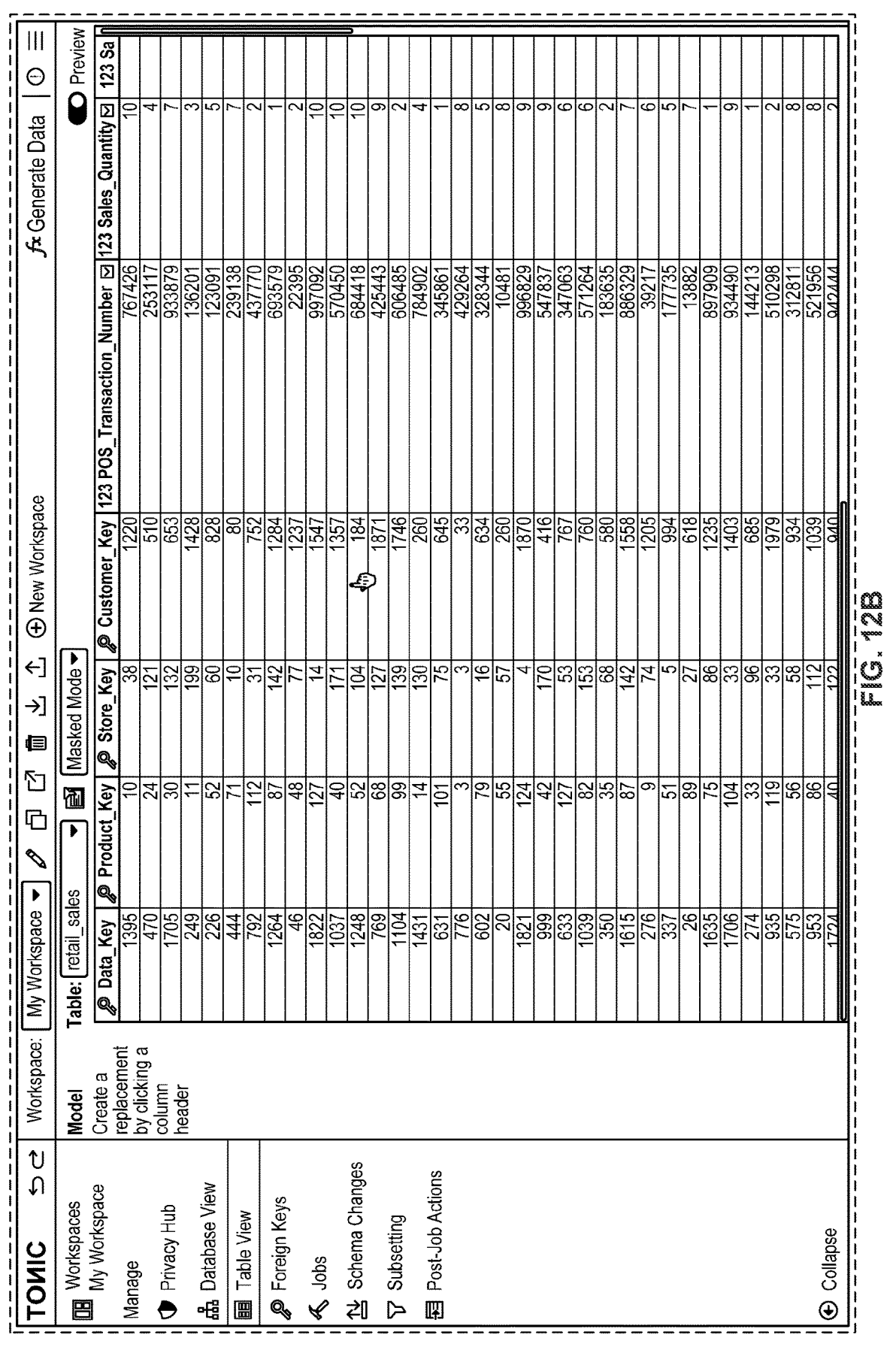

FIG. 12B illustrates an embodiment of a portion of a table. In this example, a portion of a retail sales table is shown. In this example, each sale includes information such as when a sale occurred, as well as what products were sold. In this example, the product key column in the retail sales table is a foreign key to the primary key column in the products table of FIG. 12A (the products key column).

In the example of FIGS. 12A and 12B, an existing foreign key-primary key relationship has already been previously established or defined in a source database. While it would be beneficial if all of the foreign key relationships that were desired were already set up in the source database, this is not always the case. For example, while a user may remember that there should be a relationship between the product keys listed in the retail sales table and the product keys column in the products table (and that a product key listed in the retail sales table should exist in the products table), oftentimes there is not a set relationship that is established in the database. It would be beneficial in many cases if foreign key relationships could be established and added. For example, this would allow foreign key constraints to be enforced to ensure referential integrity (e.g., for the database to enforce that a product key listed in the retail sales table should actually be present in the products table, rather than relying on a user to remember such a relationship and simply assume that is true). Enforcing foreign key constraints allows for correctly masking foreign keys when the primary key has been masked, as well as ensuring proper subsetting and other functionality.

For example, as described above, using the system described herein, a user may specify data to be masked (e.g., encrypting the data, obfuscating the data, etc.). Suppose for example that Alice would like to mask the primary key "product" key in the products table. If the system is aware of a foreign key relationship with the product key column in the retail sales table, then the platform may automatically mask the corresponding foreign key (as the foreign key points back to the primary key via the set relationship). However, without such a relationship being set, this may result in the primary key being masked, but columns that should be tied to the primary key (but do not have foreign key relationships set) not being masked, resulting in potential inconsistencies in the output in the destination data store.

In some embodiments, the virtual foreign key tool described herein allows users to find and establish virtual foreign key relationships (that do not already exist in the source database or a set of source databases). For example, users are able to add their own foreign keys. In some embodiments, the "virtual" aspects pertains to such foreign keys being added in the platform to preserve relationships, but are not enforced by the source or destination database. This allows users to create needed or desired foreign key relationships even if those foreign key relationships were not actually set or defined explicitly in the source database, without requiring the users to remember that certain relationships should exist when they use them. That is, using the virtual foreign key tool described herein, users may create virtual foreign keys that the platform may then use to perform or facilitate various other functionality, such as subsetting.

In the example of FIG. 11A, those foreign key relationships with locks are existing foreign keys that were identified in the source database (e.g., by querying the source database).

The following is an example of adding a virtual foreign key relationship.

FIG. 13A illustrates an embodiment of an interface for viewing foreign keys. In this example, existing foreign keys that were identified by the platform (e.g., by querying the source database) are shown (where the locks indicate that the relationships are existing ones in the source database).

FIG. 13B illustrates an embodiment of an interface for adding a virtual foreign key relationship. In this example, suppose that Alice would like to set the customers_legacy. Birth_Date as a foreign key to public.customers.Birth_Date. Via the example user interface of FIG. 13B, the user may select what column they would like the foreign key to be, as well as what column (which may be in a different table) they want the primary key to be, and then create the virtual foreign key relationship.

FIG. 13C illustrates an embodiment of an interface for viewing virtual foreign key relationships. In this example, the interface of FIG. 13A has been updated to include the newly added/created virtual foreign key relationship. In this example, the new foreign key relationship is indicated as being virtual by not having a lock next to it. Rather, there is an option to select the virtual foreign key relationship to edit it (where in some embodiments, existing foreign key relationships are locked and not allowed to be modified).

Figure 13D:
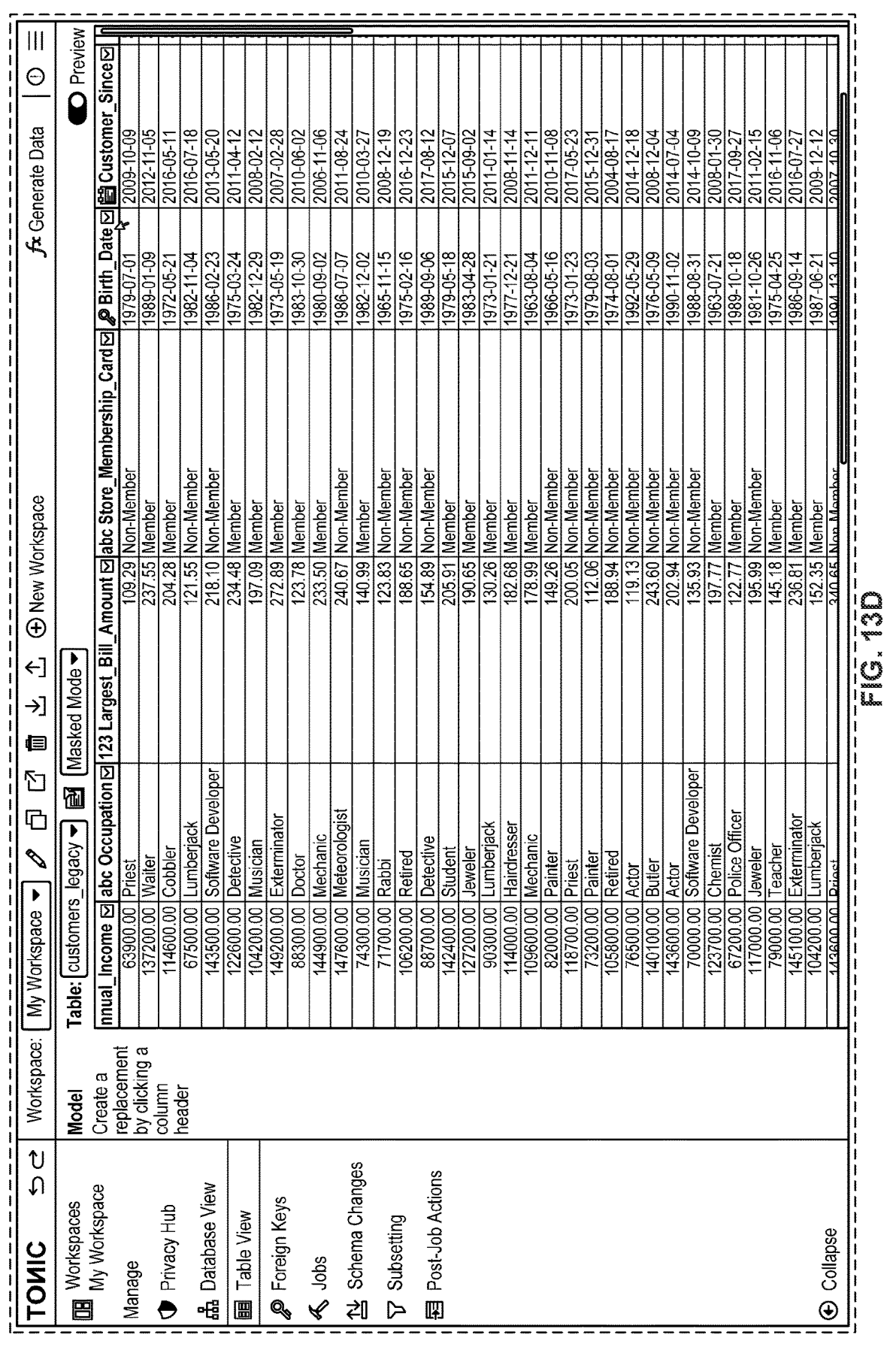

FIG. 13D illustrates an embodiment of a portion of a table. In this example, a portion of the customers_legacy is shown. Because of the virtual foreign key relationship that was added, the Birth_Date column is recognized by the system as if it were a real foreign key.

In some embodiments, when creating a virtual foreign key relationship, the user may select from a list of columns to make foreign keys. In some embodiments, the platform provides the list of candidate columns to make foreign keys as follows.

In some embodiments, the platform scans all of the columns in the input source database (or set of source databases). In some embodiments, the identified columns are linked by column name (e.g., grouped by same column name), as shown in the example of FIG. 14, where customers.Birth_Date and marketing.Birth_Date are both listed and grouped together under Birth_Date (because they both have the same column name). In some embodiments, identified columns with the same name are grouped together in the user interface. In some embodiments, the groupings are case sensitive (where two columns that are spelled the same, but with, for example one uppercase and the other lowercase, are two separate column name groupings).

In some embodiments, identified columns that are candidate foreign keys may also be sorted. For example, the groups of candidates for foreign keys may be sorted by frequency (either ascending or descending), as shown in the example interface of FIG. 15. Sorting by frequency may be beneficial to identify columns that should be foreign keys, as the more often a column name appears, the more likely it is to be a foreign key. In other embodiments, the groupings of candidates for foreign keys (grouped, for example, based on common column name) are sorted by name (either ascending or descending).

Figure 17:
FIG. 17 illustrates an embodiment of an interface for viewing foreign key relationships.

Multiple foreign key relationships may be mapped to a single primary key, as shown in the example interface of FIG. 16. The multiple virtual foreign key relationships that are created that are mapped to the same primary key may be surfaced or reflected in the foreign key relationships view, as shown in the example interface of FIG. 17. Thus, as shown, multiple virtual foreign key relationships may be created in a batch.

In some embodiments, the column to use as a primary key may be selected via an interface such as that shown in the example of FIG. 18. In this example, the user has selected marketing.Last_Name as a foreign key. As shown in this example, the user may filter the candidate primary keys by searching for columns with certain names, such as Last_Name in this example.

In some embodiments, a foreign key cannot be a primary key to itself, and in some embodiments, the user interface is configured to prohibit users from selecting a primary key that is the same as a selected foreign key. As one example, the column that is the same as the selected foreign key is removed from the list of candidate primary keys.

Figure 19:
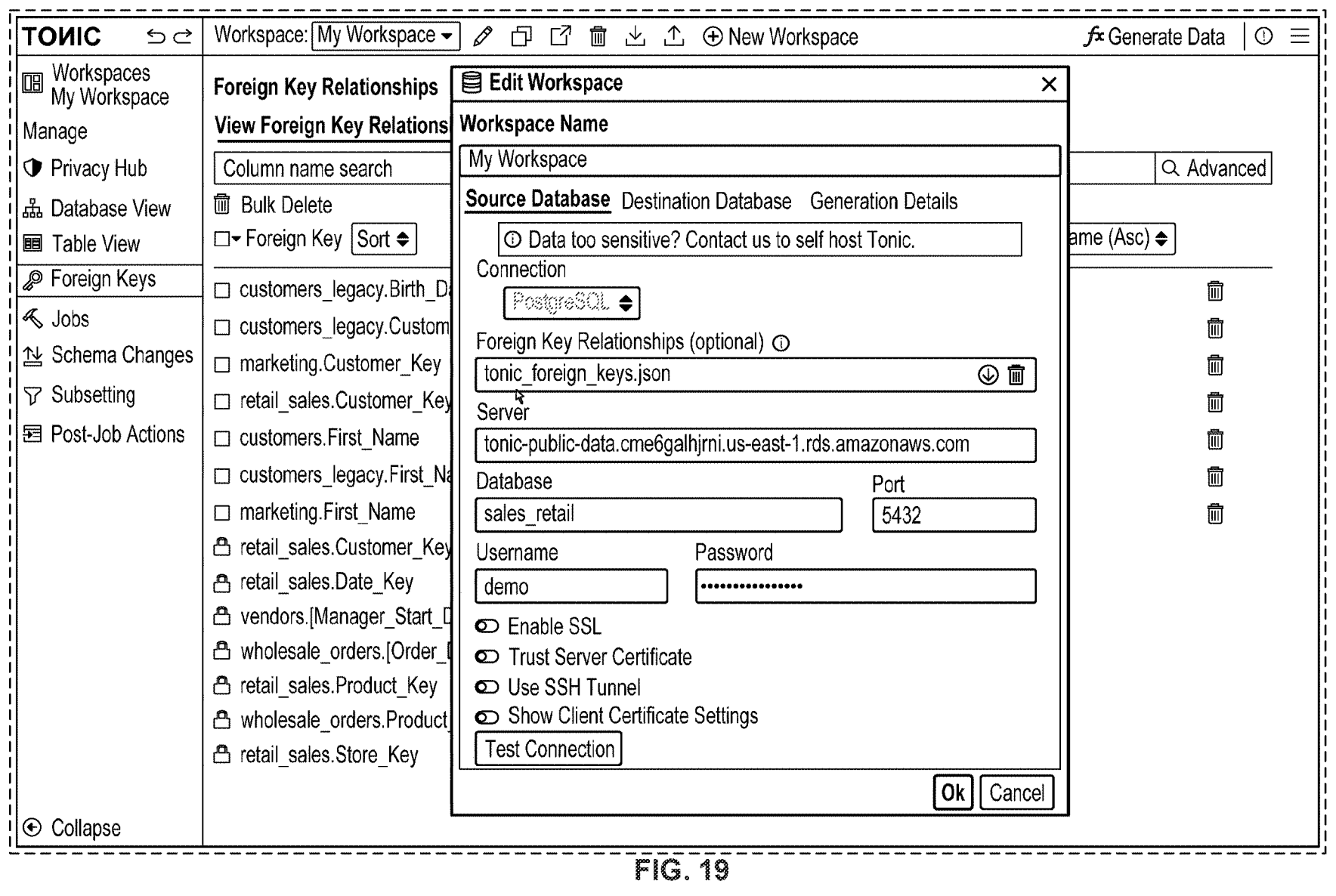

In some embodiments, in response to a user input via the user interfaces described above to create a virtual foreign key relationship, a corresponding data object is created. As one example, a JSON (JavaScript Object Notation) representation of a created virtual foreign key is generated by the platform and stored. FIG. 19 illustrates an embodiment of an interface for accessing a JSON representation of a virtual foreign key relationship. While examples involving JSON representations are described herein for illustrative purposes, the techniques described herein may be variously adapted to accommodate any other type of file format or representation, as appropriate.

In some embodiments, when a user starts a job to perform a function such as masking or subsetting, the system performs a check to determine whether all of the foreign keys are valid (e.g., via foreign key constraints). For example, the system determines with a target column (e.g., primary key) exists in a given table. If not, then a foreign key is not valid. The user may then be prompted via a user interface to update their foreign key. The user may be provided an option via the interface to delete the virtual foreign key or edit its JSON representation.

The virtual foreign key relationships may be a one-to-one mapping (e.g., a single column mapping to a single column). In other embodiments, as shown in the example of FIG. 20, users may specify compound primary keys and compound foreign keys (e.g., multi-column keysf). In some embodiments, such compound foreign keys may be created by directly writing JSON code.

The following are examples and embodiments of a data model (e.g., JSON data model) for virtual foreign key relationships. In some embodiments, a column is described with three fields: schema, table, and column. In some embodiments, a virtual foreign key relationship includes two blocks of JSON code, one for the foreign key (fk) schema, foreign key (fk) table, and foreign key (fk) columns, and a corresponding block of target schema, target table and target columns (where the target is, for example, the selected primary key). An example of JSON representations of virtual foreign key relationships is shown in the example of FIG. 21.

In some embodiments, the JSON representation of a column includes a field for indicating whether the column/key is nullable. When performing subsetting, this information may be used to facilitate cycle breaking, as described above.

Figure 22:
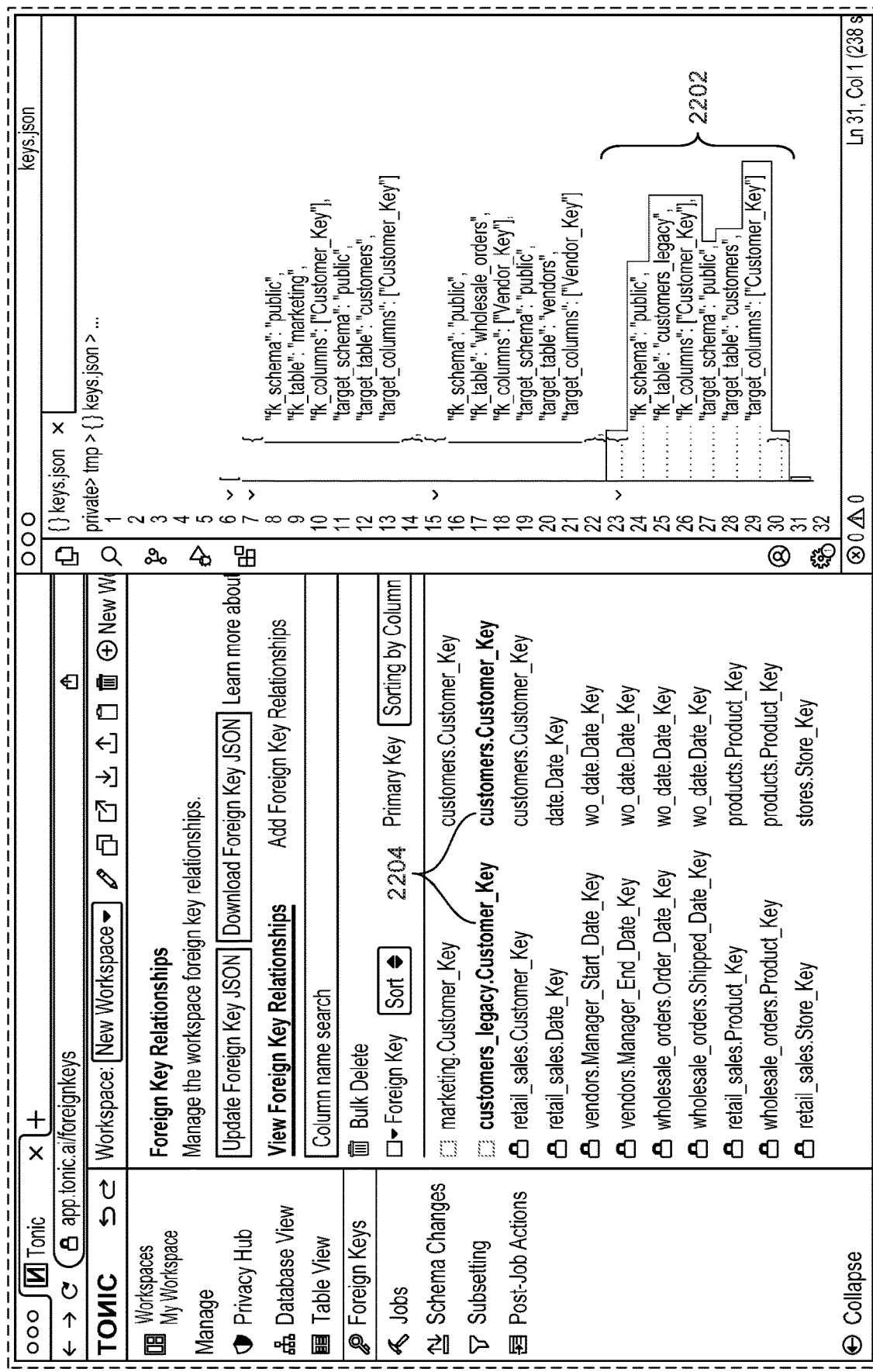
FIG. 22 illustrates an embodiment of a JSON representation of a virtual foreign key relationship.

FIG. 22 illustrates an embodiment of a JSON representation of a virtual foreign key relationship. For example, the highlighted block of JSON 2202 is a representation of the highlighted virtual foreign key relationship 2204 shown in the user interface for viewing foreign key relationships.

In some embodiments, the data model for the virtual foreign key relationships further includes a field for specifying the database that the foreign key table belongs to, as well as a field for specifying the database that the target table belongs to. A type of the database (e.g., SQL, Postgres, MongoDB, etc.) may also be indicated in the representation of the virtual foreign key relationship.

In the case of an input data set being multiple databases, when a virtual foreign key relationship is added between two tables in two different databases, the database fields for the foreign key table and the target table are different. In the context of multi-database subsetting, in various embodiments, the data collection queries generated during the execution phase of the subsetting are constructed based on what database is being queried. For example, when multi-database subsetting is performed, different types of databases may be involved (e.g., a SQL database, a MongoDB data store, etc.). The query is constructed to be compatible with the database that is being queried.

In some embodiments, a JSON document is maintained by the platform to store and keep track of all representations of virtual foreign key relationships. In some embodiments, the portion of the UI for displaying virtual foreign key relationships is driven by or generated based on the contents of the JSON document. In some embodiments, a user may directly edit the JSON document to write a virtual foreign key relationship. The new relationship will then be surfaced in the user interface (as, in some embodiments, the user interface is rendered according to the content of the JSON document including the JSON representations of virtual foreign key relationships). As described above, the existing foreign key relationships may be determined by querying the input database (or set of input databases). The source database(s) may also be queried for all columns that are not foreign keys, where such columns (identified, for example, by their column names) may be presented in a user interface as candidates for selection as foreign keys, as shown in various example user interfaces above.

FIG. 23 illustrates an embodiment of an interface for adding virtual foreign key relationships. As shown in this example, a user may also search, via a search bar 2302 in the user interface, for particular columns (e.g., that have "customer" in the column name in this example).

In various embodiments, as described above, the platform provides the ability to establish virtual foreign key relationships among tables that are across multiple source databases. This allows subsetting to ensure referential integrity across tables in multiple databases. By treating such virtual relationships as foreign keys while subsetting, related data will be collected as if it were a real foreign key (instead of a virtual one). In some embodiments, the platform treats virtual foreign keys in the same manner as innate, existing foreign keys. For example, virtual foreign keys may be used in the same way that existing foreign keys are used when performing subsetting, where virtual dependency relationships between tables in different databases may be followed to determine subsetting traversal paths, as well as during the execution phase of the subsetting process, when data collection queries are constructed and issued. For example, the JSON representation of a virtual foreign key relationship may be accessed to determine a virtual dependency relationship that had been added between a table in one database and a table in another database, where the direction of the dependency relationship is determined based on which table had been designated as the foreign key table, and which table had been designated as the primary key table when setting the virtual dependency relationship.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
  receive a set of source tables;
  sort the set of source tables based at least in part on dependency relationships among tables in the set of source tables;
  determine a traversal order based at least in part on the sorting of the set of source tables; and
  subsequent to determining the traversal order, execute the traversal order, wherein executing the traversal order comprises:
    visiting a table in the set of source tables according to the determined traversal order; and
    issuing a query to extract a subset of data from the table being visited;
    wherein extracting the subset of data from the table being visited comprises determining whether to perform an upstream pass on the table being visited or a downstream pass on the table being visited; and
    wherein in response to determining that the upstream pass is to be performed on the table being visited, the subset of data extracted from the table being visited is determined based at least in part on data that has been collected from at least one neighboring table that is downstream of the table being visited, and wherein the at least one neighboring table that is downstream of the table being visited includes a primary key that a foreign key in the table being visited refers to; and a memory coupled to the processor and configured to provide the processor with instructions.

2. The system recited in claim 1, wherein the processor is further configured to receive a specification of a target table.

3. The system recited in claim 2, wherein the processor is further configured to receive a specification of a target condition on the target table.

4. The system recited in claim 3, wherein the processor is further configured to extract a seed subset of data from the target table based at least in part on the target condition.

5. The system recited in claim 4, wherein the table being visited is visited subsequent to extracting the seed subset of data from the target table, and wherein the subset of data extracted from the table being visited is determined based at least in part on at least a portion of the seed subset of data extracted from the target table.

6. The system recited in claim 1, wherein the subset of data extracted from the table being visited is based at least in part on one or more primary key values that have been collected from the at least one neighboring table that is downstream of the table being visited.

7. A method, comprising:
receiving a set of source tables;
sorting the set of source tables based at least in part on dependency relationships among tables in the set of source tables;
determining a traversal order based at least in part on the sorting of the set of source tables; and
subsequent to determining the traversal order, executing the traversal order, wherein executing the traversal order comprises:
visiting a table in the set of source tables according to the determined traversal order; and
issuing a query to extract a subset of data from the table being visited;
wherein extracting the subset of data from the table being visited comprises determining whether to perform an upstream pass on the table being visited or a downstream pass on the table being visited; and
wherein in response to determining that the upstream pass is to be performed on the table being visited, the subset of data extracted from the table being visited is determined based at least in part on data that has been collected from at least one neighboring table that is downstream of the table being visited, and wherein the at least one neighboring table that is downstream of the table being visited includes a primary key that a foreign key in the table being visited refers to.

8. The method of claim 7, further comprising receiving a specification of a target table.

9. The method of claim 8, further comprising receiving a specification of a target condition on the target table.

10. The method of claim 9, further comprising extracting a seed subset of data from the target table based at least in part on the target condition.

11. The method of claim 10, wherein the table being visited is visited subsequent to extracting the seed subset of data from the target table, and wherein the subset of data extracted from the table being visited is determined based at least in part on at least a portion of the seed subset of data extracted from the target table.

12. The method of claim 7, wherein the subset of data extracted from the table being visited is based at least in part on one or more primary key values that have been collected from the at least one neighboring table that is downstream of the table being visited.

13. A system, comprising:
a processor configured to:
receive a set of source tables;
sort the set of source tables based at least in part on dependency relationships among tables in the set of source tables;
determine a traversal order based at least in part on the sorting of the set of source tables; and
subsequent to determining the traversal order, execute the traversal order, wherein executing the traversal order comprises:
visiting a table in the set of source tables according to the determined traversal order; and
issuing a query to extract a subset of data from the table being visited;
wherein extracting the subset of data from the table being visited comprises determining whether to perform an upstream pass on the table being visited or a downstream pass on the table being visited; and
wherein in response to determining that the downstream pass is to be performed on the table being visited, the subset of data extracted from the table being visited is determined based at least in part on data that has been collected from at least one neighboring table that is upstream of the table being visited, and wherein the at least one neighboring table that is upstream of the table being visited includes a foreign key that refers to a primary key in the table being visited; and
a memory coupled to the processor and configured to provide the processor with instructions.

14. The system recited in claim 13, wherein the processor is further configured to receive a specification of a target table.

15. The system recited in claim 14, wherein the processor is further configured to receive a specification of a target condition on the target table.

16. The system recited in claim 15, wherein the processor is further configured to extract a seed subset of data from the target table based at least in part on the target condition.

17. The system recited in claim 16, wherein the table being visited is visited subsequent to extracting the seed subset of data from the target table, and wherein the subset of data extracted from the table being visited is determined based at least in part on at least a portion of the seed subset of data extracted from the target table.

18. The system recited in claim 13, wherein the subset of data extracted from the table being visited is based at least in part on one or more foreign key values that have been collected from the at least one neighboring table that is upstream of the table being visited.

19. A method, comprising:
receiving a set of source tables;
sorting the set of source tables based at least in part on dependency relationships among tables in the set of source tables;
determining a traversal order based at least in part on the sorting of the set of source tables; and
subsequent to determining the traversal order, executing the traversal order, wherein executing the traversal order comprises:
visiting a table in the set of source tables according to the determined traversal order; and
issuing a query to extract a subset of data from the table being visited;

wherein extracting the subset of data from the table being visited comprises determining whether to perform an upstream pass on the table being visited or a downstream pass on the table being visited; and wherein in response to determining that the downstream pass is to be performed on the table being visited, the subset of data extracted from the table being visited is determined based at least in part on data that has been collected from at least one neighboring table that is upstream of the table being visited, and wherein the at least one neighboring table that is upstream of the table being visited includes a foreign key that refers to a primary key in the table being visited.

20. The method of claim 19, further comprising receiving a specification of a target table.

21. The method of claim 20, further comprising receiving a specification of a target condition on the target table.

22. The method of claim 21, further comprising extracting a seed subset of data from the target table based at least in part on the target condition.

23. The method of claim 22, wherein the table being visited is visited subsequent to extracting the seed subset of data from the target table, and wherein the subset of data extracted from the table being visited is determined based at least in part on at least a portion of the seed subset of data extracted from the target table.

24. The method of claim 19, wherein the subset of data extracted from the table being visited is based at least in part on one or more foreign key values that have been collected from the at least one neighboring table that is upstream of the table being visited.

* * * * *